US012379563B2

(12) United States Patent
Wu et al.

(10) Patent No.: US 12,379,563 B2
(45) Date of Patent: Aug. 5, 2025

(54) OPTICAL ELEMENT DRIVING MECHANISM

(71) Applicant: TDK TAIWAN CORP., Taoyuan (TW)

(72) Inventors: Ya-Hsiu Wu, Taoyuan (TW); Yi-Ho Chen, Taoyuan (TW); Ying-Jen Wang, Taoyuan (TW); Chao-Chang Hu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 714 days.

(21) Appl. No.: 17/675,358

(22) Filed: Feb. 18, 2022

(65) Prior Publication Data

US 2022/0269030 A1 Aug. 25, 2022

Related U.S. Application Data

(60) Provisional application No. 63/209,750, filed on Jun. 11, 2021, provisional application No. 63/167,300, filed on Mar. 29, 2021, provisional application No. 63/157,095, filed on Mar. 5, 2021, provisional application No. 63/151,204, filed on Feb. 19, 2021.

(51) Int. Cl.
*G02B 7/02* (2021.01)

(52) U.S. Cl.
CPC ...................... *G02B 7/02* (2013.01)

(58) Field of Classification Search
CPC .......... G02B 7/02; G02B 7/1821; G02B 7/00; G02B 7/023; G02B 7/182; G03B 30/00; G03B 3/10; G03B 2205/0069

USPC .................................................. 359/819, 822
See application file for complete search history.

(56) References Cited

U.S. PATENT DOCUMENTS

| | | | |
|---|---|---|---|
| 2003/0011862 A1 | 1/2003 | Graefenhain | |
| 2006/0193067 A1 | 8/2006 | Kim et al. | |
| 2012/0250156 A1* | 10/2012 | Asakawa | G03B 5/00 359/554 |
| 2018/0284566 A1* | 10/2018 | Minamisawa | H04N 23/54 |
| 2019/0227199 A1* | 7/2019 | Kao | G02B 26/0883 |
| 2020/0209520 A1* | 7/2020 | Fu | G02B 26/0816 |
| 2020/0271895 A1* | 8/2020 | Fu | G02B 26/0816 |
| 2021/0041715 A1 | 2/2021 | Takei | |

FOREIGN PATENT DOCUMENTS

| | | |
|---|---|---|
| EP | 3518016 A2 | 7/2019 |
| JP | H06167666 A | 6/1994 |
| KR | 20200132626 A | 11/2020 |

\* cited by examiner

*Primary Examiner* — William R Alexander
*Assistant Examiner* — Mackenzi Waddell
(74) *Attorney, Agent, or Firm* — MUNCY, GEISSLER, OLDS & LOWE, P.C.

(57) ABSTRACT

An optical element driving mechanism, including a movable part, a fixed part, a driving assembly, and a first supporting assembly. The movable part is for connecting an optical element. The movable part is movable relative to the fixed part. The driving assembly is for driving the movable part to move relative to the fixed part. The movable part is movable relative to the fixed part through the support of the first supporting element. The first supporting assembly is at least partially located between the movable part and the fixed part.

20 Claims, 43 Drawing Sheets

1-1

OPTICAL ELEMENT DRIVING MECHANISM

CROSS REFERENCE TO RELATED APPLICATIONS

This application claims the benefit of U.S. Provisional Application No. 63/151,204, filed 19 Feb. 2021, U.S. Provisional Application No. 63/157,095, filed 5 Mar. 2021, U.S. Provisional Application No. 63/167,300, filed 29 Mar. 2021, and U.S. Provisional Application No. 63/209,750, filed 11 Jun. 2021, the entirety of which are incorporated by reference herein.

BACKGROUND OF THE INVENTION

Field of the Invention

The present disclosure relates to an optical element driving mechanism, and more particularly to an optical element driving mechanism in an electrical device.

Description of the Related Art

As the relevant technologies have developed, many electronic devices (such as computers and tablets) are equipped with the capability to record images and videos. However, when an optical element (such as a lens) having a long focal length is installed in an electronic device, this may increase the thickness of the electronic device, impeding the prospects for miniaturization of the electronic device. Therefore, how to design an optical element driving mechanism and an optical device that help to miniaturize the electronic device has become an important issue.

BRIEF SUMMARY OF THE INVENTION

To solve the problems of the prior art, an optical element driving mechanism, including a movable part, a fixed part, a driving assembly, and a first supporting assembly. The movable part is for connecting an optical element. The movable part is movable relative to the fixed part. The driving assembly is for driving the movable part to move relative to the fixed part. The movable part is movable relative to the fixed part through the support of the first supporting element. The first supporting assembly is at least partially located between the movable part and the fixed part.

In one of the embodiments of the present disclosure, the first supporting assembly includes: a first supporting element, having an elongated shape, and extending along a first axis; a first accommodating structure, having a recessed structure, and accommodating the first supporting element; a first intermediate element, corresponding to the first supporting element, wherein the first intermediate element is located in the first accommodating structure; and a first connecting element, in direct contact with the first intermediate element and a first intermediate element groove supporting surface. The first connecting element is disposed in the first accommodating structure. The first intermediate element is fixedly connected to the first intermediate element groove supporting surface. The first intermediate element has a curved surface structure. The first intermediate element has a spherical structure.

In one of the embodiments of the present disclosure, the first intermediate element is in direct contact with the first supporting element. The first supporting element is movable relative to the first intermediate element. In a second axis that is perpendicular to the first axis, the maximum dimension of the first intermediate element is different from the maximum dimension of the first supporting element. The second axis is perpendicular to the first intermediate element groove supporting surface. In the second axis, the maximum dimension of the first intermediate element is greater than the maximum dimension of the first supporting element. The first intermediate element does not overlap the first supporting element when viewed along the first axis.

In one of the embodiments of the present disclosure, the first supporting assembly further includes: a second intermediate element, corresponding to the first supporting element; a second intermediate element groove, wherein the second intermediate element is located in the second intermediate element groove; a second connecting element, in direct contact with the second intermediate element and a second intermediate element groove supporting surface of the second intermediate element groove; and a second intermediate element groove surface, formed in the second intermediate element groove and corresponding to the second intermediate element. The alignment direction of the center of the first intermediate element and the center of the second intermediate element is not parallel to the first axis. The alignment direction of the center of the first intermediate element and the center of the second intermediate element is perpendicular to the first axis. The second intermediate element groove has a recessed structure, and the second intermediate element groove is adjacent to the first accommodating structure. The second intermediate element groove is formed in the first accommodating structure. The second connecting element is disposed in the second intermediate element groove.

In one of the embodiments of the present disclosure, the first intermediate element groove supporting surface is not parallel to the second intermediate element groove supporting surface. The first intermediate element groove supporting surface with a planar structure is perpendicular to the second intermediate element groove supporting surface with a planar structure. The second intermediate element is fixedly connected to the second intermediate element groove supporting surface. The second intermediate element has a curved surface structure. The second intermediate element has a spherical structure. In the second axis, the maximum dimension of the second intermediate element is different from the maximum dimension of the first intermediate element. In the second axis, the maximum dimension of the second intermediate element is different from the maximum dimension of the first supporting element. In the second axis, the maximum dimension of the second intermediate element is greater than the maximum dimension of the first supporting element.

In one of the embodiments of the present disclosure, the second intermediate element is in direct contact with the first supporting element. The first supporting element is movable relative to the second intermediate element. The second intermediate element does not overlap the first supporting element when viewed along the first axis. The second intermediate element groove surface with a planar structure is not parallel to the second intermediate element groove supporting surface. The shortest distance between the second intermediate element and the second intermediate element groove surface is different from the shortest distance between the second intermediate element and the second intermediate element groove supporting surface.

In one of the embodiments of the present disclosure, the shortest distance between the second intermediate element and the second intermediate element groove surface is greater than the shortest distance between the second intermediate element and the second intermediate element groove supporting surface. The second intermediate element groove surface and the first intermediate element groove supporting surface are facing in the same direction.

In one of the embodiments of the present disclosure, the first supporting assembly further includes: a third intermediate element, corresponding to the first supporting element; a third intermediate element groove, wherein the third intermediate element is located in the third intermediate element groove; and a third connecting element, in direct contact with the third intermediate element and a third intermediate element groove supporting surface of the third intermediate element groove. The alignment direction of the center of the first intermediate element and the center of the third intermediate element is not parallel to the first axis. The alignment direction of the center of the first intermediate element and the center of the third intermediate element is perpendicular to the first axis. The alignment direction of the center of the first intermediate element and the center of the third intermediate element is not parallel to the alignment direction of the center of the second intermediate element and the center of the third intermediate element. The alignment direction of the center of the first intermediate element and the center of the third intermediate element is not perpendicular to the alignment direction of the center of the second intermediate element and the center of the third intermediate element. The shortest distance between the center of the first intermediate element and the center of the third intermediate element is different from the shortest distance between the center of the second intermediate element and the center of the third intermediate element.

In one of the embodiments of the present disclosure, the shortest distance between the center of the first intermediate element and the center of the third intermediate element is greater than the shortest distance between the center of the second intermediate element and the center of the third intermediate element. The third intermediate element groove has a recessed structure, and the third intermediate element groove is adjacent to the first accommodating structure. The third intermediate element groove is formed in the first accommodating structure. The third connecting element is disposed in the third intermediate element groove. The third intermediate element groove supporting surface is not parallel to the first intermediate element groove supporting surface. The third intermediate element groove supporting surface with a planar structure is perpendicular to the first intermediate element groove supporting surface. The third intermediate element groove supporting surface and the second intermediate element groove supporting surface are facing in opposite directions. The third intermediate element is fixedly connected to the third intermediate element groove supporting surface. The third intermediate element has a curved surface structure. The third intermediate element has a spherical structure. In the second axis, the maximum dimension of the third intermediate element is different from the maximum dimension of the first intermediate element. In the second axis, the maximum dimension of the third intermediate element is the same as the maximum dimension of the second intermediate element. The third intermediate element is in direct contact with the first supporting element. The first supporting element is movable relative to the third intermediate element. The third intermediate element does not overlap the first supporting element when viewed along the first axis.

In one of the embodiments of the present disclosure, the first supporting assembly further includes: a fourth intermediate element, corresponding to the first supporting element; a fourth intermediate element groove, wherein the fourth intermediate element is located in the fourth intermediate element groove; a fourth connecting element, in direct contact with the fourth intermediate element and a fourth intermediate element groove supporting surface of the fourth intermediate element groove; and a first stopping surface, corresponding to the first supporting element. The fourth intermediate element at least partially overlaps the first supporting element when viewed along the first axis. The fourth intermediate element groove has a recessed structure, and the fourth intermediate element groove is adjacent to the first accommodating structure. The fourth intermediate element groove is formed in the first accommodating structure. The fourth connecting element is disposed in the fourth intermediate element groove. The fourth intermediate element groove supporting surface is not parallel to the first intermediate element groove supporting surface. The fourth intermediate element groove supporting surface with a planar structure is perpendicular to the first intermediate element groove supporting surface. The fourth intermediate element groove supporting surface is not parallel to the second intermediate element groove supporting surface. The fourth intermediate element groove supporting surface is perpendicular to the second intermediate element groove supporting surface. The first stopping surface at least partially overlaps the first supporting element when viewed along the first axis. The first stopping surface is located between the first accommodating structure and the fourth intermediate element groove.

In one of the embodiments of the present disclosure, in the first axis, the shortest distance between the first stopping surface and the fourth intermediate element groove supporting surface is different from the maximum dimension of the fourth intermediate element. In the first axis, the shortest distance between the first stopping surface and the fourth intermediate element groove supporting surface is shorter than the maximum dimension of the fourth intermediate element. The fourth intermediate element is fixedly connected to the fourth intermediate element groove supporting surface. The fourth intermediate element has a curved surface structure. The fourth intermediate element has a spherical structure. In the second axis, the maximum dimension of the fourth intermediate element is different from the maximum dimension of the first intermediate element. In the second axis, the maximum dimension of the fourth intermediate element is different from the maximum dimension of the second intermediate element. The fourth intermediate element is in direct contact with the first supporting element. The first supporting element is movable relative to the fourth intermediate element.

In one of the embodiments of the present disclosure, the first supporting assembly further includes: a second accommodating structure, having a recessed structure, and accommodating the first supporting element; an eighth intermediate element, corresponding to the first supporting element; an eighth intermediate element groove, wherein the eighth intermediate element is located in the eighth intermediate element groove; an eighth connecting element, in direct contact with the eighth intermediate element and an eighth intermediate element groove supporting surface of the eighth intermediate element groove; and a second stopping surface, corresponding to the first supporting element. The first supporting element is located between the first accommodating structure and the second accommodating structure. The eighth intermediate element at least partially overlaps the first supporting element when viewed along the first axis.

In one of the embodiments of the present disclosure, the eighth intermediate element groove has a recessed structure, and the eighth intermediate element groove is adjacent to the second accommodating structure. The eighth intermediate element groove is formed in the second accommodating structure. The eighth connecting element is disposed in the eighth intermediate element groove. The eighth intermediate element groove supporting surface is not parallel to the first intermediate element groove supporting surface. The eighth intermediate element groove supporting surface with a planar structure is perpendicular to the first intermediate element groove supporting surface.

In one of the embodiments of the present disclosure, the eighth intermediate element groove supporting surface is not parallel to the second intermediate element groove supporting surface. The eighth intermediate element groove supporting surface is perpendicular to the second intermediate element groove supporting surface. The second stopping surface at least partially overlaps the first supporting element when viewed along the first axis. The second stopping surface is located between the second accommodating structure and the eighth intermediate element groove.

In one of the embodiments of the present disclosure, in the first axis, the shortest distance between the second stopping surface and the eighth intermediate element groove supporting surface is different from the maximum dimension of the eighth intermediate element. In the first axis, the shortest distance between the second stopping surface and the eighth intermediate element groove supporting surface is greater than the maximum dimension of the eighth intermediate element. In the first axis, the shortest distance between the second stopping surface and the eighth intermediate element groove supporting surface is different from the shortest distance between the first stopping surface and the fourth intermediate element groove supporting surface. In the first axis, the shortest distance between the second stopping surface and the eighth intermediate element groove supporting surface is greater than the shortest distance between the first stopping surface and the fourth intermediate element groove supporting surface. In the first axis, the shortest distance between the first supporting element and the fourth intermediate element groove supporting surface is 0.1 mm greater than the maximum dimension of the fourth intermediate element. In the first axis, the shortest distance between the first supporting element and the eighth intermediate element groove supporting surface is 0.1 mm greater than the maximum dimension of the eighth intermediate element.

In one of the embodiments of the present disclosure, the first supporting assembly further includes: a fourth intermediate element, corresponding to the first supporting element; a fourth intermediate element groove, wherein the fourth intermediate element is located in the fourth intermediate element groove; a fourth connecting element, in direct contact with the fourth intermediate element and a fourth intermediate element groove supporting surface of the fourth intermediate element groove; and a second intermediate element groove second supporting surface, formed in the second intermediate element groove and corresponding to the second intermediate element. The fourth intermediate element at least partially overlaps the first supporting element when viewed along the first axis. The fourth intermediate element groove has a recessed structure, and the fourth intermediate element groove is adjacent to the first accommodating structure. The fourth intermediate element groove is formed in the first accommodating structure. The fourth connecting element is disposed in the fourth intermediate element groove. The fourth intermediate element groove supporting surface is not parallel to the first intermediate element groove supporting surface. The fourth intermediate element groove supporting surface with a planar structure is perpendicular to the first intermediate element groove supporting surface. The fourth intermediate element groove supporting surface is not parallel to the second intermediate element groove supporting surface. The fourth intermediate element groove supporting surface is perpendicular to the second intermediate element groove supporting surface. The second intermediate element groove second supporting surface and the fourth intermediate element groove supporting surface are facing in the same direction.

In one of the embodiments of the present disclosure, in the first axis, the shortest distance between the second intermediate element groove second supporting surface and the fourth intermediate element groove supporting surface is greater than the maximum dimension of the fourth intermediate element. The fourth intermediate element is fixedly connected to the fourth intermediate element groove supporting surface. The fourth intermediate element has a curved surface structure. The fourth intermediate element has a spherical structure. In the second axis, the maximum dimension of the fourth intermediate element is the same as the maximum dimension of the first intermediate element. The fourth intermediate element is in direct contact with the first supporting element. The first supporting element is movable relative to the fourth intermediate element.

In one of the embodiments of the present disclosure, the first supporting assembly further includes: a second accommodating structure, having a recessed structure, and accommodating the first supporting element; an eighth intermediate element, corresponding to the first supporting element; an eighth intermediate element groove, wherein the eighth intermediate element is located in the eighth intermediate element groove; and an eighth connecting element, in direct contact with the eighth intermediate element and an eighth intermediate element groove supporting surface of the eighth intermediate element groove. The first supporting element is located between the first accommodating structure and the second accommodating structure. The eighth intermediate element at least partially overlaps the first supporting element when viewed along the first axis. The eighth intermediate element groove has a recessed structure, and the eighth intermediate element groove is adjacent to the second accommodating structure. The eighth intermediate element groove is formed in the second accommodating structure. The eighth connecting element is disposed in the groove of the eighth intermediate element.

In one of the embodiments of the present disclosure, the eighth intermediate element groove supporting surface is not parallel to the first intermediate element groove supporting surface. The eighth intermediate element groove supporting surface with a planar structure is perpendicular to the first intermediate element groove supporting surface. The eighth intermediate element groove supporting surface is not parallel to the second intermediate element groove supporting surface. The eighth intermediate element groove supporting surface is perpendicular to the second intermediate element groove supporting surface.

In one of the embodiments of the present disclosure, in the first axis, the shortest distance between the first supporting element and the fourth intermediate element groove supporting surface is 0.1 mm greater than the maximum dimension of the fourth intermediate element. In the first axis, the shortest distance between the first supporting element and the eighth intermediate element groove supporting surface is 0.1 mm greater than the maximum dimension of the eighth intermediate element.

BRIEF DESCRIPTION OF THE DRAWINGS

The present invention may be more fully understood by reading the subsequent detailed description and examples with references made to the accompanying drawings, wherein.

DETAILED DESCRIPTION OF THE INVENTION

The making and using of optical element driving mechanisms of embodiments of the present disclosure are discussed in detail below. It should be appreciated, however, that the embodiments provide many applicable inventive concepts that may be embodied in a wide variety of specific contexts. The specific embodiments discussed are merely illustrative of specific ways to make and use the embodiments and do not limit the scope of the disclosure.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The scale of the drawings in the present disclosure may be drawn according to the actual size. The scale of the same figure in the present disclosure can be used as the actual manufacturing scale of the devices, equipment, elements, etc. of the present disclosure. It should be noted that each figure may be drawn at different orientations, which may result in different size ratios among different figures. However, the size ratio shown in an individual figure is not affect by the different size ratios between different figures. People with ordinary skill in the art can understand that the size ratio of the figures in the present disclosure can be used as a distinguishing feature from the prior art.

Embodiment Group 1

Figure 1:
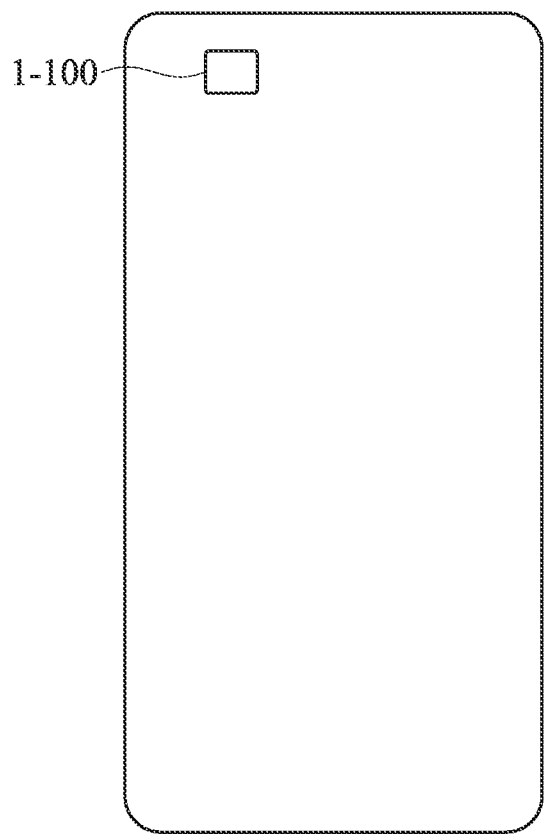
FIG. 1 is a schematic view of an electrical device according to some embodiment of the present disclosure.

Firstly, please refer to FIG. 1, FIG. 1 is a schematic view of an electrical device 1-1 according to some embodiment of the present disclosure. As shown in FIG. 1, an optical element driving mechanism 1-100 of some embodiment of the present disclosure may be mounted in an electrical device 1-1 for taking photos or videos, wherein the aforementioned electrical device 1-1 may, for example, be a smartphone or a digital camera, but the present disclosure is not limited to these. It should be noted that the position and the size between the optical element driving mechanism 1-100 and the electrical device 1-1 shown in FIG. 1 are only an example, which is not for limiting the position and the size between the optical element driving mechanism 1-100 and the electrical device 1-1. In fact, according to different needs, the optical element driving mechanism 1-100 may be mounted at different positions in the electrical device 1-1

Figure 2:
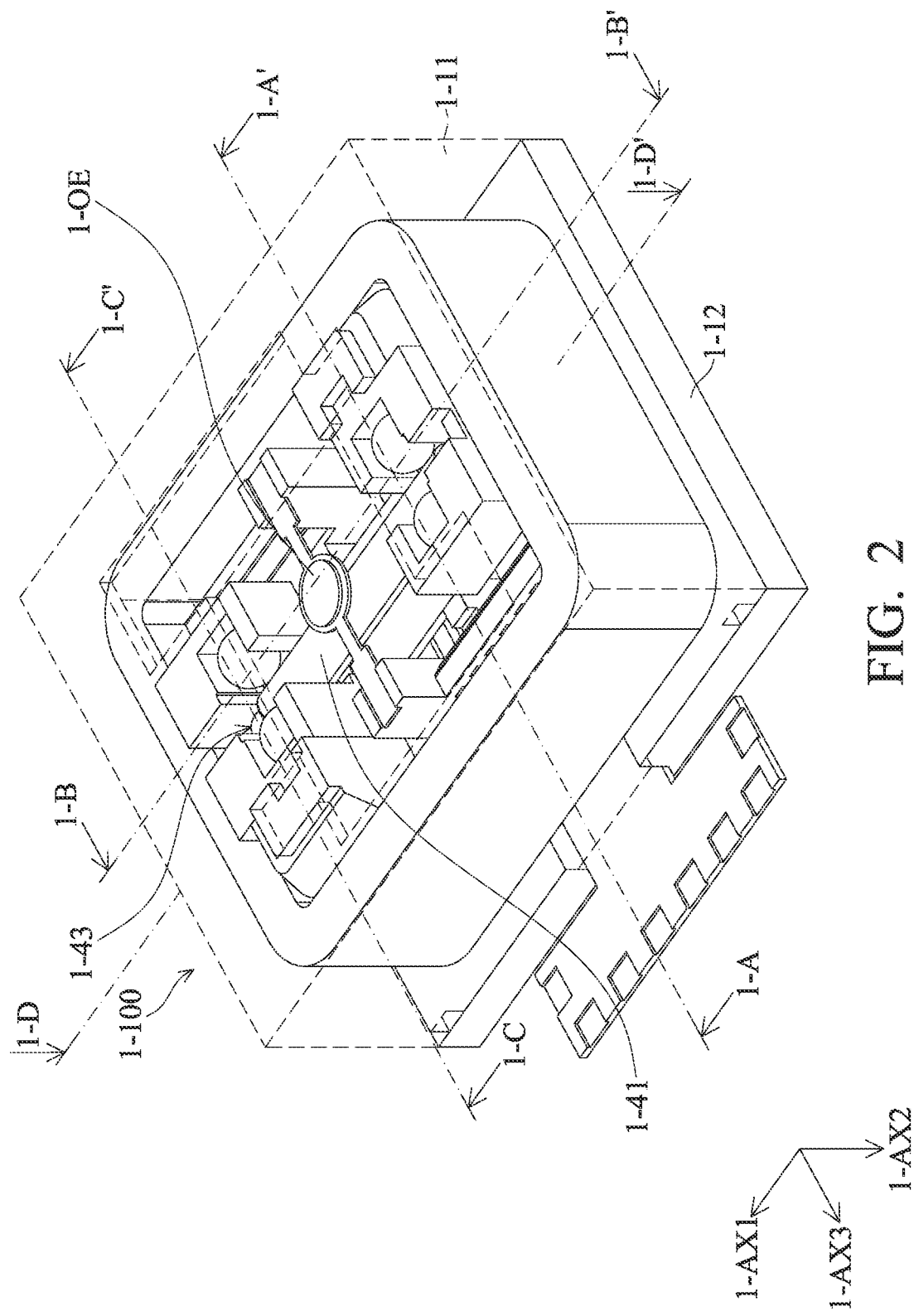
FIG. 2 is a schematic view of an optical element driving mechanism and an optical element according to some embodiments of the present disclosure, wherein an outer frame is shown as a dashed line.
Figure 3:
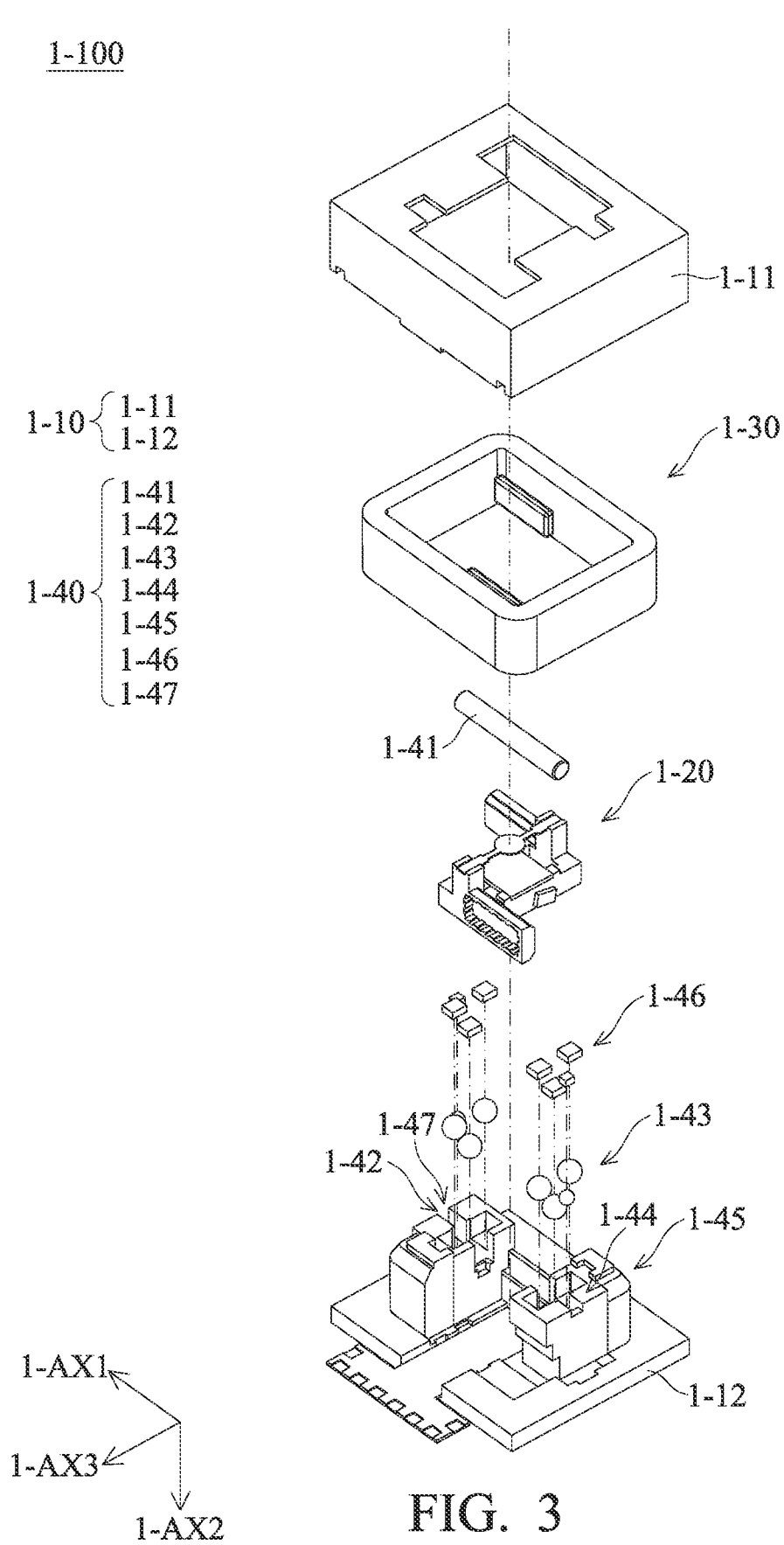
FIG. 3 is an exploded view of the optical element driving mechanism according to some embodiments of the present disclosure.

Please refer to FIG. 2. FIG. 2 is a schematic view of the optical element driving mechanism 1-100 and an optical element 1-OE according to some embodiments of the present disclosure, wherein the outer frame is shown as a dashed line. FIG. 3 is an exploded view of the optical element driving mechanism 1-100 according to some embodiments of the present disclosure.

As shown in FIG. 2 and FIG. 3, the optical element driving mechanism 100 may include a fixed part 10, a movable part 20, a driving assembly 30, and a first supporting assembly 1-40.

The movable part 1-20 is movable relative to the fixed part 1-10, and the driving assembly 1-30 may drive the movable part 1-20 to move relative to the fixed part 1-10. The movable part 1-20 may be connected to an optical element 1-OE, and the movable part 1-20 may move relative to the fixed part 1-10 through the support of the first supporting assembly 1-40. According to some embodiments of the present disclosure, the first supporting assembly 1-40 may be at least partially located between the movable part 1-20 and the fixed part 1-10.

The fixed part 1-10 may include an outer frame 1-11 and a base 1-12. The outer frame 1-11 may be disposed on the base 1-12 to form an inner space, and the inner space accommodates the elements of the optical element driving mechanism 1-100.

The first supporting assembly 1-40 may include a first supporting element 1-41, an accommodating structure 1-42, an intermediate element 1-43, an intermediate element groove 1-44, an intermediate element groove surface 1-45, a connecting element 1-46 and a stopping surface 1-47.

According to some embodiments of the present disclosure, the first supporting element 1-41 may have an elongated shape, and the first supporting element 1-41 may extend along a first axis 1-AX1.

According to some embodiments of the present disclosure, the accommodating structure 1-42 may correspond to the first supporting element 1-41, and the accommodating structure 1-42 may accommodate the first supporting element 1-41. As shown in FIG. 2 and FIG. 3, the accommodating structure 1-42 may include a first accommodating structure 1-421 and a second accommodating structure 1-422.

According to some embodiments of the present disclosure, the intermediate element 1-43 may correspond to the first supporting element 1-41, and the intermediate element 1-43 may be in contact with the first supporting element 1-41. According to some embodiments of the present disclosure, the intermediate element 1-43 may locate in the accommodating structure 1-42, and the intermediate element 1-43 may have a recessed structure.

According to some embodiments of the present disclosure, the intermediate element 1-43 may include a first intermediate element 1-431, a second intermediate element 1-432, a third intermediate element 1-433, a fourth intermediate element 1-434, a fifth intermediate element 1-435, a sixth intermediate element 1-436, a seventh intermediate element 1-437, and an eighth intermediate element 1-438.

According to some embodiments of the present disclosure, the intermediate element groove 1-44 may have a recessed structure, and the intermediate element groove 1-44 may be adjacent to the accommodating structure 1-42.

According to some embodiments of the present disclosure, the intermediate element groove 1-44 may include a first intermediate element groove 1-441, a second intermediate element groove 1-442, a third intermediate element groove 1-443, a fourth intermediate element groove 1-444, a fifth intermediate element groove 1-445, a sixth intermediate element groove 1-446, a seventh intermediate element groove 1-447, and an eighth intermediate element groove 1-448.

According to some embodiments of the present disclosure, the intermediate element groove surface 1-45 may be formed on the intermediate element groove 1-44, and the intermediate element groove surface 1-45 may correspond to the intermediate element 1-43.

According to some embodiments of the present disclosure, the intermediate element groove surface 1-45 may include a first intermediate element groove surface 1-451, a second intermediate element groove surface 1-452, and a third intermediate element groove surface 1-453, a fourth intermediate element groove surface 1-454, a fifth intermediate element groove surface 1-455, a sixth intermediate element groove surface 1-456, a seventh intermediate element groove surface 1-457, and an eighth intermediate element groove surface 1-458.

According to some embodiments of the present disclosure, the connecting element 1-46 may be in direct contact with the intermediate element 1-43 and the accommodating structure 1-42.

According to some embodiments of the present disclosure, the connecting element 1-46 may include a first connecting element 1-461, a second connecting element 1-462, a third connecting element 1-463, a fourth connecting element 1-464, a fifth connection element 1-465, a sixth connection element 1-466, a seventh connection element 1-467, and an eighth connection element 1-468.

According to some embodiments of the present disclosure, the connecting elements 1-46 may be glue for fixing or lubricating oil for facilitating rotation.

According to some embodiments of the present disclosure, the stopping surface 1-47 may include a first stopping surface 1-471 and a second stopping surface 1-472.

Figure 4:
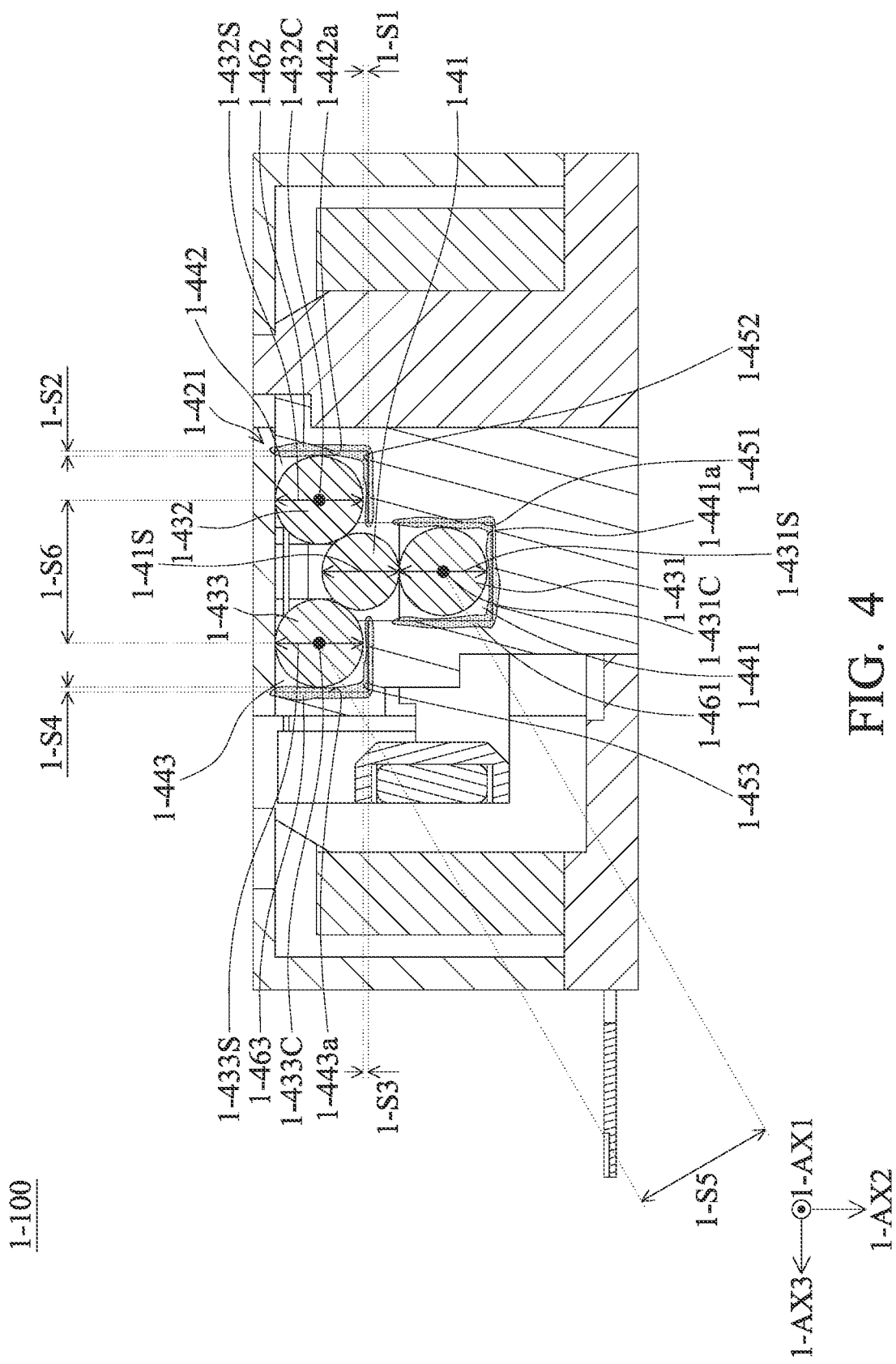
FIG. 4 is a cross-sectional view of the optical element driving mechanism along line 1-A-1-A' of FIG. 2, according to some embodiments of the present disclosure.
Figure 5:
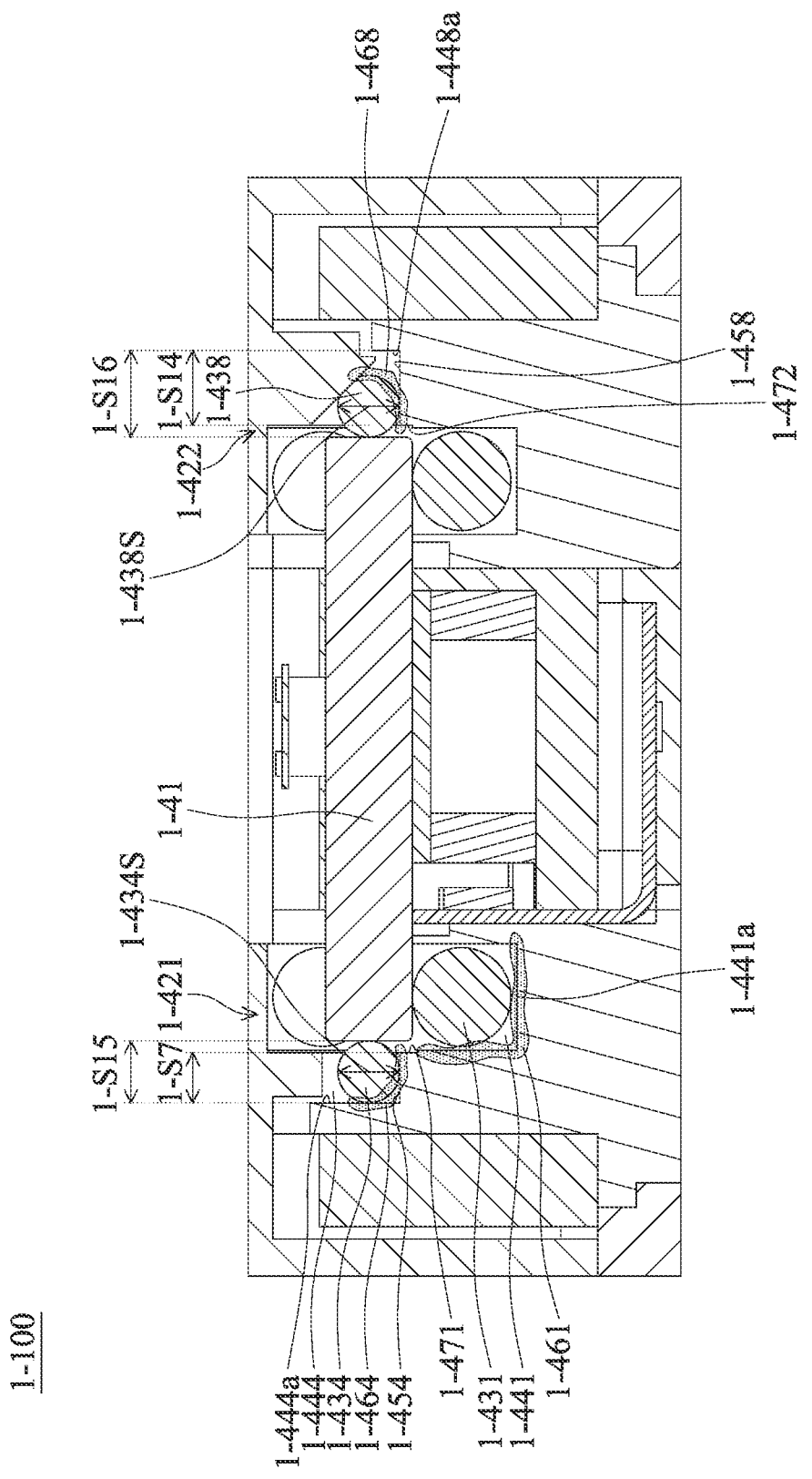
FIG. 5 is a cross-sectional view of the optical element driving mechanism along line 1-B-1-B' of FIG. 2, according to some embodiments of the present disclosure.

Please refer to FIG. 4 and FIG. 5, FIG. 4 is a cross-sectional view of the optical element driving mechanism 1-100 along line 1-A-1-A' of FIG. 2, according to some embodiments of the present disclosure; FIG. 5 is a cross-sectional view of the optical element driving mechanism 1-100 along line 1-B-1-B' of FIG. 2, according to some embodiments of the present disclosure.

As shown in FIG. 4 and FIG. 5, the first accommodating structure 1-421 may have a recessed structure, and the first accommodating structure 1-421 may accommodate the first supporting element 1-41.

According to some embodiments of the present disclosure, the first intermediate element groove 1-441 may have a recessed structure, and the first intermediate element groove 1-441 may be adjacent to the first accommodating structure 1-421. The first intermediate element 1-431 may be located in the first accommodating structure 1-421, and the first intermediate element 1-431 may correspond to the first supporting element 1-41.

To be more specific, the first intermediate element 1-431 may be located in the first intermediate element groove 1-441, and the first intermediate element groove 1-441 may be formed in the first accommodating structure 1-421.

The first connecting element 1-461 may be disposed in the first intermediate element groove 1-441. The first connecting element 1-461 may be in direct contact with the first intermediate element 1-431 and a first intermediate element groove supporting surface 1-441a of the first intermediate element groove 1-441.

That is, according to some embodiments of the present disclosure, the first connecting element 1-461 may be disposed in the first accommodating structure 1-421. According to some embodiments of the present disclosure, the first connecting element 1-461 may be disposed in the first intermediate element groove 1-441. According to some embodiments of the present disclosure, the first intermediate element 1-431 may be fixedly connected to the first intermediate element groove supporting surface 1-441a.

The first intermediate element groove surface 1-451 may be formed in the first intermediate element groove 1-441. According to some embodiments of the present disclosure, the first intermediate element groove surface 1-451 may be perpendicular to the first intermediate element groove supporting surface 1-441a.

According to some embodiments of the present disclosure, the first connecting element 1-461 may be in direct contact with the first intermediate element 1-431 and the first intermediate element groove surface 1-451. Therefore, according to some embodiments of the present disclosure, the first intermediate element 1-431 may be fixedly connected to the first intermediate element groove surface 1-451.

In this way, the first intermediate element 1-431 may be stably fixed in the first intermediate element groove 1-441.

According to some embodiments of the present disclosure, the first intermediate element 1-431 may have a curved surface structure. According to some embodiments of the present disclosure, the first intermediate element 1-431 may have a spherical structure.

As shown in FIG. 4 and FIG. 5, the first intermediate element 1-431 may be in direct contact with the first supporting element 1-41, so that the first supporting element 1-41 may move relative to the first intermediate element 1-431.

According to some embodiments of the present disclosure, the first intermediate element 1-431 may not overlap the first supporting element 1-41 when viewed along the first axis 1-AX1.

According to some embodiments of the present disclosure, in a second axis 1-AX2 and a third axis 1-AX3 that are perpendicular to the first axis 1-AX1, the maximum dimension 1-431S of the first intermediate element 1-431 may be different from the maximum dimension 1-41S of the first supporting element 1-41. According to some embodiments of the present disclosure, in the second axis 1-AX2, the maximum dimension 1-431S of the first intermediate element 1-431 may be greater than the maximum dimension 1-41S of the first supporting element 1-41.

In this way, the undesired movement of the first supporting element 1-41 may be effectively avoided, thereby the optical element driving mechanism 1-100 is more stable.

Please refer to FIG. 4, according to some embodiments of the present disclosure, the second intermediate element groove 1-442 may have a recessed structure, and the second intermediate element groove 1-442 may be adjacent to the first accommodating structure 1-421. The second intermediate element 1-432 may be located in the first accommodating structure 1-421, and the second intermediate element 1-432 may correspond to the first supporting element 1-41.

To be more specific, the second intermediate element 1-432 may be located in the second intermediate element groove 1-442, and the second intermediate element groove 1-442 may be formed in the first accommodating structure 1-421.

The second connecting element 1-462 may be disposed in the second intermediate element groove 1-442. The second connecting element 1-462 may be in direct contact with the second intermediate element 1-432 and a second intermediate element groove supporting surface 1-442*a* of the second intermediate element groove 1-442.

The second intermediate element groove surface 1-452 may be formed in the second intermediate element groove 1-442, and the second intermediate element groove surface 1-452 may correspond to the second intermediate element 1-432.

That is, according to some embodiments of the present disclosure, the second connecting element 1-462 may be disposed in the first accommodating structure 1-421. According to some embodiments of the present disclosure, the second connecting element 1-462 may be disposed in the second intermediate element groove 1-442. Therefore, according to some embodiments of the present disclosure, the second intermediate element 1-432 may be fixedly connected to the second intermediate element groove supporting surface 1-442*a*.

According to some embodiments of the present disclosure, the second intermediate element 1-432 may have a curved structure. According to some embodiments of the present disclosure, the second intermediate element 1-432 may have a spherical structure.

As shown in FIG. 4, the second intermediate element 1-432 may be in direct contact with the first supporting element 1-41, so that the first supporting element 1-41 may move relative to the second intermediate element 1-432.

According to some embodiments of the present disclosure, the second intermediate element 1-432 may not overlap the first supporting element 1-41 when viewed along the first axis 1-AX1.

According to some embodiments of the present disclosure, in the second axis 1-AX2, the maximum dimension 1-432S of the second intermediate element 1-432 may be different from the maximum dimension 1-41S of the first supporting element 1-41. According to some embodiments of the present disclosure, in the second axis 1-AX2, the maximum dimension 1-432S of the second intermediate element 1-432 may be greater than the maximum dimension 1-41S of the first supporting element 1-41.

In this way, the undesired movement of the first supporting element 1-41 may be effectively avoided, thereby the optical element driving mechanism 1-100 is more stable.

According to some embodiments of the present disclosure, the alignment direction of the center 1-431C of the first intermediate element 1-431 and the center 1-432C of the second intermediate element 1-432 may not be parallel to the first axis 1-AX1.

According to some embodiments of the present disclosure, the alignment direction of the center 1-431C of the first intermediate element 1-431 and the center 1-432C of the second intermediate element 1-432 may be perpendicular to the first axis 1-AX1.

In this way, the undesired movement of the first supporting element 1-41 may be effectively avoided, thereby the optical element driving mechanism 1-100 is more stable.

According to some embodiments of the present disclosure, the first intermediate element groove supporting surface 1-441*a* may have a planar structure. According to some embodiments of the present disclosure, the second intermediate element groove supporting surface 1-442*a* may have a planar structure.

According to some embodiments of the present disclosure, the first intermediate element groove supporting surface 1-441*a* may not be parallel to the second intermediate element groove supporting surface 1-442*a*. According to some embodiments of the present disclosure, the first intermediate element groove supporting surface 1-441*a* may be perpendicular to the second intermediate element groove supporting surface 1-442*a*.

According to some embodiments of the present disclosure, in the second axis 1-AX2, the maximum dimension 1-432S of the second intermediate element 1-432 may be different from the maximum dimension 1-431S of the first intermediate element 1-431.

In this way, the internal space of the optical element driving mechanism 1-100 may be effectively utilized.

According to some embodiments of the present disclosure, in the second axis 1-AX2, the maximum dimension 1-432S of the second intermediate element 1-432 may be the same as the maximum dimension 1-431S of the first intermediate element 1-431.

In this way, the optical element driving mechanism 1-100 may be more stable.

According to some embodiments of the present disclosure, the second intermediate element groove surface 1-452 may have a planar structure. According to some embodiments of the present disclosure, the second intermediate element groove surface 1-452 may not be parallel to the second intermediate element groove supporting surface 1-442*a*.

According to some embodiments of the present disclosure, the shortest distance 1-S1 between the second intermediate element 1-432 and the second intermediate element groove surface 1-452 may be different from the shortest distance 1-S2 between the second intermediate element 1-432 and the second intermediate element groove supporting surface 1-442*a*.

According to some embodiments of the present disclosure, the second intermediate element 1-432 may be not in contact with the second intermediate element groove surface 1-452.

For example, according to some embodiments of the present disclosure, the shortest distance 1-S1 between the second intermediate element 1-432 and the second intermediate element groove surface 1-452 may be greater than the shortest distance 1-S2 between the second intermediate element 1-432 and the second intermediate element groove supporting surface 1-442*a*.

In this way, the movement of the first supporting element 1-41 relative to the second intermediate element 1-432 may be smoother; thereby the optical element driving mechanism 1-100 is more stable.

According to some embodiments of the present disclosure, the second intermediate element groove surface 1-452 and the first intermediate element groove supporting surface 1-441*a* may be facing in the same direction.

Please refer to FIG. 4, according to some embodiments of the present disclosure, the third intermediate element groove 1-443 may have a recessed structure, and the third intermediate element groove 1-443 may be adjacent to the first accommodating structure 1-421. The third intermediate element 1-433 may be located in the first accommodating structure 1-421, and the third intermediate element 1-433 may correspond to the first supporting element 1-41.

To be more specific, the third intermediate element 1-433 may be located in the third intermediate element groove 1-443, and the third intermediate element groove 1-443 may be formed in the first accommodating structure 1-421.

The third connecting element 1-463 may be disposed in the third intermediate element groove 1-443. The third connecting element 1-463 may be in direct contact with the third intermediate element 1-433 and a third intermediate element groove supporting surface 1-443a of the third intermediate element groove 1-443.

The third intermediate element groove surface 1-453 may be formed in the third intermediate element groove 1-443, and the third intermediate element groove surface 1-453 may correspond to the third intermediate element 1-433.

That is, according to some embodiments of the present disclosure, the third connecting element 1-463 may be disposed in the first accommodating structure 1-421. According to some embodiments of the present disclosure, the third connecting element 1-463 may be disposed in the third intermediate element groove 1-443. Therefore, according to some embodiments of the present disclosure, the third intermediate element 1-433 may be fixedly connected to the third intermediate element groove supporting surface 1-443a.

According to some embodiments of the present disclosure, the third intermediate element 1-433 may have a curved structure. According to some embodiments of the present disclosure, the third intermediate element 1-433 may have a spherical structure.

As shown in FIG. 4, the third intermediate element 1-433 may be in direct contact with the first supporting element 1-41, so that the first supporting element 1-41 may move relative to the third intermediate element 1-433.

According to some embodiments of the present disclosure, the third intermediate element 1-433 may not overlap the first supporting element 1-41 when viewed along the first axis 1-AX1.

According to some embodiments of the present disclosure, in the second axis 1-AX2, the maximum dimension 1-433S of the third intermediate element 1-433 may be different from the maximum dimension 1-41S of the first supporting element 1-41. According to some embodiments of the present disclosure, in the second axis 1-AX2, the maximum dimension 1-433S of the third intermediate element 1-433 may be greater than the maximum dimension 1-41S of the first supporting element 1-41.

In this way, the undesired movement of the first supporting element 1-41 may be effectively avoided, thereby the optical element driving mechanism 1-100 is more stable.

According to some embodiments of the present disclosure, the alignment direction of the center 1-431C of the first intermediate element 1-431 and the center 1-433C of the third intermediate element 1-433 may not be parallel to the first axis 1-AX1.

According to some embodiments of the present disclosure, the alignment direction of the center 1-431C of the first intermediate element 1-431 and the center 1-433C of the third intermediate element 1-433 may be perpendicular to the first axis 1-AX1.

According to some embodiments of the present disclosure, the alignment direction of the center 1-431C of the first intermediate element 1-431 and the center 1-433C of the third intermediate element 1-433 may not be parallel to the alignment direction of the center 1-432C of the second intermediate element 1-432 and the center 1-433C of the third intermediate element 1-433.

According to some embodiments of the present disclosure, the alignment direction of the center 1-431C of the first intermediate element 1-431 and the center 1-433C of the third intermediate element 1-433 may not be perpendicular to the alignment direction of the center 1-432C of the second intermediate element 1-432 and the center 1-433C of the third intermediate element 1-433.

In this way, the undesired movement of the first supporting element 1-41 may be effectively avoided, thereby the optical element driving mechanism 1-100 is more stable.

According to some embodiments of the present disclosure, the third intermediate element groove supporting surface 1-443a may have a planar structure.

According to some embodiments of the present disclosure, the first intermediate element groove supporting surface 1-441a may not be parallel to the third intermediate element groove supporting surface 1-443a. According to some embodiments of the present disclosure, the first intermediate element groove supporting surface 1-441a may be perpendicular to the third intermediate element groove supporting surface 1-443a.

According to some embodiments of the present disclosure, the third intermediate element groove supporting surface 1-443a may be parallel to the second intermediate element groove supporting surface 1-442a.

According to some embodiments of the present disclosure, in the second axis 1-AX2, the maximum dimension 1-433S of the third intermediate element 1-433 may be different from the maximum dimension 1-431S of the first intermediate element 1-431.

In this way, the internal space of the optical element driving mechanism 1-100 may be effectively utilized.

According to some embodiments of the present disclosure, in the second axis 1-AX2, the maximum dimension 1-433S of the third intermediate element 1-433 may be the same as the maximum dimension 1-431S of the first intermediate element 1-431.

In this way, the optical element driving mechanism 1-100 may be more stable.

According to some embodiments of the present disclosure, in the second axis 1-AX2, the maximum dimension 1-433S of the third intermediate element 1-433 may be the same as the maximum dimension 1-432S of the second intermediate element 1-432.

According to some embodiments of the present disclosure, the third intermediate element groove surface 1-453 may have a planar structure. According to some embodiments of the present disclosure, the third intermediate element groove surface 1-453 may not be parallel to the third intermediate element groove supporting surface 1-443a.

According to some embodiments of the present disclosure, the shortest distance 1-S3 between the third intermediate element 1-433 and the third intermediate element groove surface 1-453 may be different from the shortest distance 1-S4 between the third intermediate element 1-433 and the third intermediate element groove supporting surface 1-443a.

According to some embodiments of the present disclosure, the third intermediate element 1-433 may not be in contact with the third intermediate element groove surface 1-453.

For example, according to some embodiments of the present disclosure, the shortest distance 1-S3 between the third intermediate element 1-433 and the third intermediate element groove surface 1-453 may be greater than the shortest distance 1-S4 between the third intermediate element 1-433 and the third intermediate element groove supporting surface 1-443a.

In this way, the movement of the first supporting element 1-41 relative to the third intermediate element 1-433 may be smoother; thereby the optical element driving mechanism 1-100 is more stable.

According to some embodiments of the present disclosure, the third intermediate element groove surface 1-453 and the first intermediate element groove supporting surface 1-441a may be facing in the same direction.

According to some embodiments of the present disclosure, the third intermediate element groove supporting surface 1-443a and the second intermediate element groove supporting surface 1-442a may be facing in opposite directions.

According to some embodiments of the present disclosure, the shortest distance 1-S5 between the center 1-431C of the first intermediate element 1-431 and the center 1-433C of the third intermediate element 1-433 may be different from the shortest distance 1-S6 between the center 1-432C of the second intermediate element 1-432 and the center 1-433C of the third intermediate element 1-433.

According to some embodiments of the present disclosure, the shortest distance 1-S5 between the center 1-431C of the first intermediate element 1-431 and the center 1-433C of the third intermediate element 1-433 may be greater than the shortest distance 1-S6 between the center 1-432C of the second intermediate element 1-432 and the center 1-433C of the third intermediate element 1-433.

Please refer to FIG. 5, according to some embodiments of the present disclosure, the fourth intermediate element groove 1-444 may have a recessed structure, and the fourth intermediate element groove 1-444 may be adjacent to the first accommodating structure 1-421. The fourth intermediate element 1-434 may be located in the first accommodating structure 1-421, and the fourth intermediate element 1-434 may correspond to the first supporting element 1-41.

To be more specific, the fourth intermediate element 1-434 may be located in the fourth intermediate element groove 1-444, and the fourth intermediate element groove 1-444 may be formed in the first accommodating structure 1-421.

The fourth connecting element 1-464 may be disposed in the fourth intermediate element groove 1-444. The fourth connecting element 1-464 may be in direct contact with the fourth intermediate element 1-434 and a fourth intermediate element groove supporting surface 1-444a of the fourth intermediate element groove 1-444.

The fourth intermediate element groove surface 1-454 may be formed in the fourth intermediate element groove 1-444, and the fourth intermediate element groove surface 1-454 may correspond to the fourth intermediate element 1-434.

That is, according to some embodiments of the present disclosure, the fourth connecting element 1-464 may be disposed in the first accommodating structure 1-421. According to some embodiments of the present disclosure, the fourth connecting element 1-464 may be disposed in the fourth intermediate element groove 1-444. Therefore, according to some embodiments of the present disclosure, the fourth intermediate element 1-434 may be fixedly connected to the fourth intermediate element groove supporting surface 1-444a.

According to some embodiments of the present disclosure, the fourth intermediate element 1-434 may have a curved structure. According to some embodiments of the present disclosure, the fourth intermediate element 1-434 may have a spherical structure.

As shown in FIG. 5, the fourth intermediate element 1-434 may be in direct contact with the first supporting element 1-41, so that the first supporting element 1-41 may move relative to the fourth intermediate element 1-434.

According to some embodiments of the present disclosure, the fourth intermediate element 1-434 may overlap the first supporting element 1-41 when viewed along the first axis 1-AX1.

According to some embodiments of the present disclosure, the fourth intermediate element groove supporting surface 1-444a may have a planar structure.

According to some embodiments of the present disclosure, the fourth intermediate element groove supporting surface 1-444a may not be parallel to the first intermediate element groove supporting surface 1-441a. According to some embodiments of the present disclosure, the fourth intermediate element groove supporting surface 1-444a may be perpendicular to the first intermediate element groove supporting surface 1-441a.

According to some embodiments of the present disclosure, the fourth intermediate element groove supporting surface 1-444a may not be parallel to the second intermediate element groove supporting surface 1-442a. According to some embodiments of the present disclosure, the fourth intermediate element groove supporting surface 1-444a may be perpendicular to the second intermediate element groove supporting surface 1-442a.

According to some embodiments of the present disclosure, the fourth intermediate element groove supporting surface 1-444a may not be parallel to the third intermediate element groove supporting surface 1-443a. According to some embodiments of the present disclosure, the fourth intermediate element groove supporting surface 1-444a may be perpendicular to the third intermediate element groove supporting surface 1-443a.

The first stopping surface 1-471 may correspond to the first supporting element 1-41. According to some embodiments of the present disclosure, the first stopping surface 1-471 may at least partially overlap the first supporting element 1-41 when viewed along the first axis 1-AX1.

According to some embodiments of the present disclosure, the first stopping surface 1-471 may be located between the first accommodating structure 1-421 and the fourth intermediate element groove 1-444.

According to some embodiments of the present disclosure, in the first axis 1-AX1, the shortest distance 1-S7 between the first stopping surface 1-471 and the fourth intermediate element groove supporting surface 1-444a may be different from the maximum dimension 1-434S of the fourth intermediate element 1-434.

According to some embodiments of the present disclosure, in the first axis 1-AX1, the shortest distance 1-S7 between the first stopping surface 1-471 and the fourth intermediate element groove supporting surface 1-444a may be shorter than the maximum dimension 1-434S of the fourth intermediate element 1-434.

In this way, the first supporting element 1-41 may be moved more smoothly relative to the fourth intermediate element 1-434, and the excessive movement of the first supporting element 1-41 along the first axis 1-AX1 may be avoided.

According to some embodiments of the present disclosure, in the second axis 1-AX2, the maximum dimension 1-434S of the fourth intermediate element 1-434 may be different from the maximum dimension 1-431S of the first intermediate element 1-431.

According to some embodiments of the present disclosure, in the second axis 1-AX2, the maximum dimension 1-434S of the fourth intermediate element 1-434 may be shorter than the maximum dimension 1-431S of the first intermediate element 1-431.

According to some embodiments of the present disclosure, in the second axis 1-AX2, the maximum dimension 1-434S of the fourth intermediate element 1-434 may be different from the maximum dimension 1-432S of the second intermediate element 1-432.

According to some embodiments of the present disclosure, in the second axis 1-AX2, the maximum dimension 1-434S of the fourth intermediate element 1-434 may be shorter than the maximum dimension 1-432S of the second intermediate element 1-432.

According to some embodiments of the present disclosure, in the second axis 1-AX2, the maximum dimension 1-434S of the fourth intermediate element 1-434 may be different from the maximum dimension 1-433S of the third intermediate element 1-433.

According to some embodiments of the present disclosure, in the second axis 1-AX2, the maximum dimension 1-434S of the fourth intermediate element 1-434 may be shorter than the maximum dimension 1-433S of the third intermediate element 1-433.

According to some embodiments of the present disclosure, the maximum dimension 1-434S of the fourth intermediate element 1-434 may be different from the maximum dimension 1-41S of the first supporting element 1-41 when viewed along the first axis 1-AX1.

According to some embodiments of the present disclosure, the maximum dimension 1-434S of the fourth intermediate element 1-434 may be shorter than the maximum dimension 1-41S of the first supporting element 1-41 when viewed along the first axis 1-AX1.

In this way, the internal space of the optical element driving mechanism 1-100 may be effectively utilized, thereby achieving the effect of miniaturization.

Figure 6:
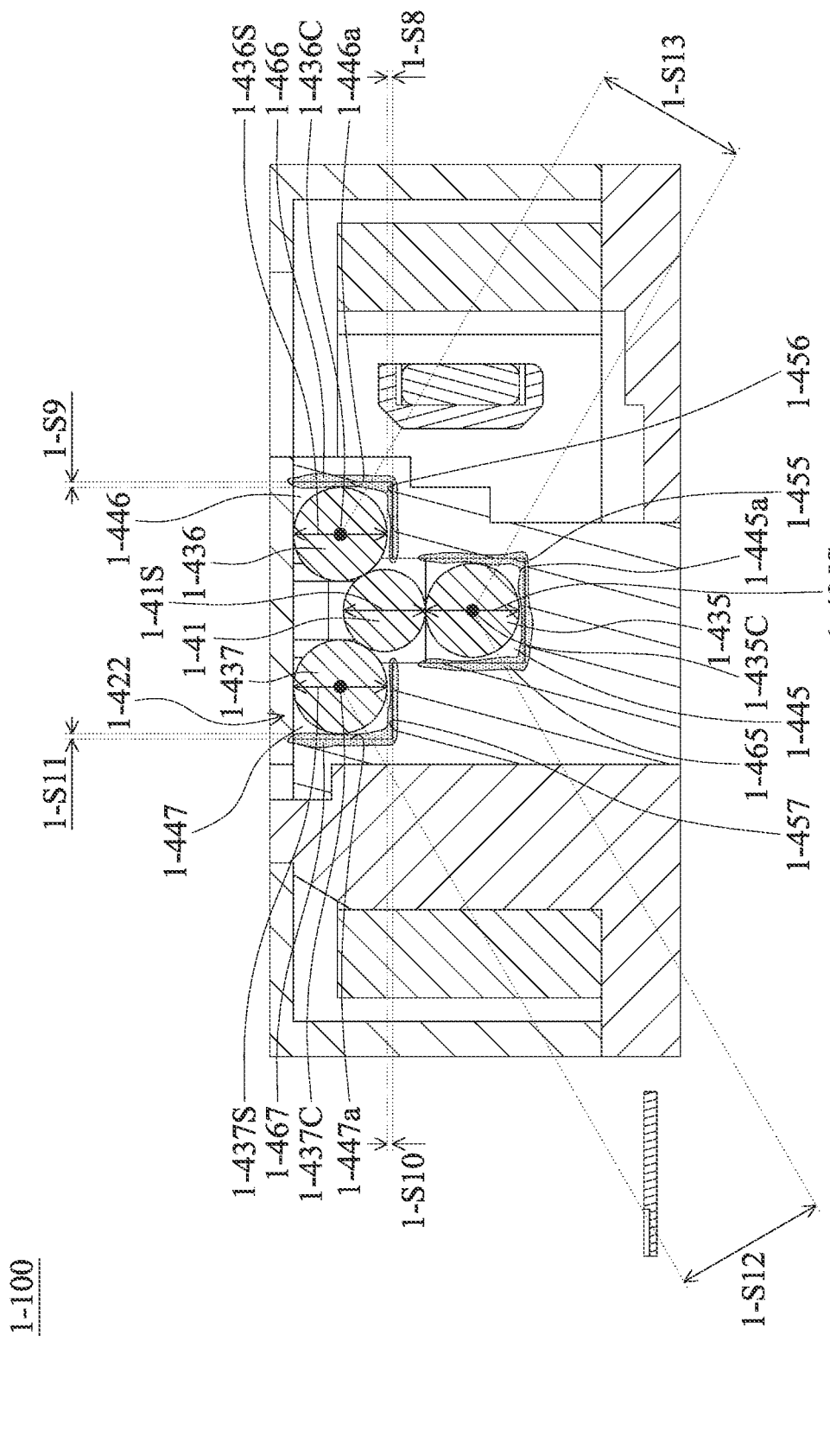
FIG. 6 is a cross-sectional view of the optical element driving mechanism along line 1-C-1-C' of FIG. 2, according to some embodiments of the present disclosure.

Please refer to FIG. 5 and FIG. 6, FIG. 6 is a cross-sectional view of the optical element driving mechanism 1-100 along line 1-C-1-C' of FIG. 2, according to some embodiments of the present disclosure.

As shown in FIG. 5 and FIG. 6, the second accommodating structure 1-422 may have a recessed structure, and the second accommodating structure 1-422 may accommodate the first supporting element 1-41. Also, the first supporting element 1-41 may be located between the first accommodating structure 1-421 and the second accommodating structure 1-422.

According to some embodiments of the present disclosure, the fifth intermediate element groove 1-445 may have a recessed structure, and the fifth intermediate element groove 1-445 may be adjacent to the second accommodating structure 1-422. The fifth intermediate element 1-435 may be located in the second accommodating structure 1-422, and the fifth intermediate element 1-435 may correspond to the first supporting element 1-41.

To be more specific, the fifth intermediate element 1-435 may be located in the fifth intermediate element groove 1-445, and the fifth intermediate element groove 1-445 may be formed in the second accommodating structure 1-422.

The fifth connecting element 1-465 may be disposed in the fifth intermediate element groove 1-445. The fifth connecting element 1-465 may be in direct contact with the fifth intermediate element 1-435 and a fifth intermediate element groove supporting surface 1-445a of the fifth intermediate element groove 1-445.

That is, according to some embodiments of the present disclosure, the fifth connecting element 1-465 may be disposed in the second accommodating structure 1-422. According to some embodiments of the present disclosure, the fifth connecting element 1-465 may be disposed in the fifth intermediate element groove 1-445. According to some embodiments of the present disclosure, the fifth intermediate element 1-435 may be fixedly connected to the fifth intermediate element groove supporting surface 1-445a.

The fifth intermediate element groove surface 1-455 may be formed in the fifth intermediate element groove 1-445. According to some embodiments of the present disclosure, the fifth intermediate element groove surface 1-455 may be perpendicular to the fifth intermediate element groove supporting surface 1-445a.

According to some embodiments of the present disclosure, the fifth intermediate element groove surface 1-455 may be in direct contact with the fifth intermediate element 1-435 and the fifth intermediate element groove surface 1-455. Therefore, according to some embodiments of the present disclosure, the fifth intermediate element 1-435 may be fixedly connected to the fifth intermediate element groove surface 1-455.

In this way, the fifth intermediate element 1-435 may be stably fixed in the fifth intermediate element groove 1-445.

According to some embodiments of the present disclosure, the fifth intermediate element groove supporting surface 1-445a may have a planar structure.

According to some embodiments of the present disclosure, the fifth intermediate element groove supporting surface 1-445a may be parallel to the first intermediate element groove supporting surface 1-441a. According to some embodiments of the present disclosure, the fifth intermediate element groove supporting surface 1-445a and the first intermediate element groove supporting surface 1-441a may be facing in the same direction.

According to some embodiments of the present disclosure, the fifth intermediate element groove supporting surface 1-445a may not be parallel to the second intermediate element groove supporting surface 1-442a. According to some embodiments of the present disclosure, the fifth intermediate element groove supporting surface 1-445a may be perpendicular to the second intermediate element groove supporting surface 1-442a.

According to some embodiments of the present disclosure, the fifth intermediate element groove supporting surface 1-445a may not be parallel to the third intermediate element groove supporting surface 1-443a. According to some embodiments of the present disclosure, the fifth intermediate element groove supporting surface 1-445a may be perpendicular to the third intermediate element groove supporting surface 1-443a.

According to some embodiments of the present disclosure, the fifth intermediate element groove supporting surface 1-445a may not be parallel to the fourth intermediate element groove supporting surface 1-444a. According to some embodiments of the present disclosure, the fifth intermediate element groove supporting surface 1-445a may be perpendicular to the fourth intermediate element groove supporting surface 1-444a.

According to some embodiments of the present disclosure, the fifth intermediate element 1-435 may have a curved surface structure. According to some embodiments of the present disclosure, the fifth intermediate element 1-435 may have a spherical structure.

As shown in FIG. 5 and FIG. 6, the fifth intermediate element 1-435 may be in direct contact with the first supporting element 1-41, so that the first supporting element 1-41 may move relative to the fifth intermediate element 1-435.

According to some embodiments of the present disclosure, the fifth intermediate element 1-435 may not overlap the first supporting element 1-41 when viewed along the first axis 1-AX1.

According to some embodiments of the present disclosure, in the second axis 1-AX2 that is perpendicular to the first axis 1-AX1, the maximum dimension 1-435S of the fifth intermediate element 1-435 may be different from the maximum dimension 1-41S of the first supporting element 1-41. According to some embodiments of the present disclosure, in the second axis 1-AX2, the maximum dimension 1-435S of the fifth intermediate element 1-435 may be greater than the maximum dimension 1-41S of the first supporting element 1-41.

In this way, the undesired movement of the first supporting element 1-41 may be effectively avoided, thereby the optical element driving mechanism 1-100 is more stable.

Please refer to FIG. 6, according to some embodiments of the present disclosure, the sixth intermediate element groove 1-446 may have a recessed structure, and the sixth intermediate element groove 1-446 may be adjacent to the second accommodating structure 1-422. The sixth intermediate element 1-436 may be located in the second accommodating structure 1-422, and the sixth intermediate element 1-436 may correspond to the first supporting element 1-41.

To be more specific, the sixth intermediate element 1-436 may be located in the sixth intermediate element groove 1-446, and the sixth intermediate element groove 1-446 may be formed in the second accommodating structure 1-422.

The sixth connecting element 1-466 may be disposed in the sixth intermediate element groove 1-446. The sixth connecting element 1-466 may be in direct contact with the sixth intermediate element 1-436 and a sixth intermediate element groove supporting surface 1-446a of the sixth intermediate element groove 1-446.

The sixth intermediate element groove surface 1-456 may be formed in the sixth intermediate element groove 1-446, and the sixth intermediate element groove surface 1-456 may correspond to the sixth intermediate element 1-436.

That is, according to some embodiments of the present disclosure, the sixth connecting element 1-466 may be disposed in the second accommodating structure 1-422. According to some embodiments of the present disclosure, the sixth connecting element 1-466 may be disposed in the sixth intermediate element groove 1-446. Therefore, according to some embodiments of the present disclosure, the sixth intermediate element 1-436 may be fixedly connected to the sixth intermediate element groove supporting surface 1-446a.

According to some embodiments of the present disclosure, the sixth intermediate element 1-436 may have a curved structure. According to some embodiments of the present disclosure, the sixth intermediate element 1-436 may have a spherical structure.

As shown in FIG. 6, the sixth intermediate element 1-436 may be in direct contact with the first supporting element 1-41, so that the first supporting element 1-41 may move relative to the sixth intermediate element 1-436.

According to some embodiments of the present disclosure, the sixth intermediate element 1-436 may not overlap the first supporting element 1-41 when viewed along the first axis 1-AX1.

According to some embodiments of the present disclosure, in the second axis 1-AX2, the maximum dimension 1-436S of the sixth intermediate element 1-436 may be different from the maximum dimension 1-41S of the first supporting element 1-41. According to some embodiments of the present disclosure, in the second axis 1-AX2, the maximum dimension 1-436S of the sixth intermediate element 1-436 may be greater than the maximum dimension 1-41S of the first supporting element 1-41.

In this way, the undesired movement of the first supporting element 1-41 may be effectively avoided, thereby the optical element driving mechanism 1-100 is more stable.

According to some embodiments of the present disclosure, the alignment direction of the center 1-435C of the fifth intermediate element 1-435 and the center 1-436C of the sixth intermediate element 1-436 may not be parallel to the first axis 1-AX1.

According to some embodiments of the present disclosure, the alignment direction of the center 1-435C of the fifth intermediate element 1-435 and the center 1-436C of the sixth intermediate element 1-436 may be perpendicular to the first axis 1-AX1.

In this way, the undesired movement of the first supporting element 1-41 may be effectively avoided, thereby the optical element driving mechanism 1-100 is more stable.

According to some embodiments of the present disclosure, the sixth intermediate element groove supporting surface 1-446a may have a planar structure.

According to some embodiments of the present disclosure, the sixth intermediate element groove supporting surface 1-446a may not be parallel to the first intermediate element groove supporting surface 1-441a. According to some embodiments of the present disclosure, the sixth intermediate element groove supporting surface 1-446a may be perpendicular to the first intermediate element groove supporting surface 1-441a.

According to some embodiments of the present disclosure, the sixth intermediate element groove supporting surface 1-446a may be parallel to the second intermediate element groove supporting surface 1-442a. According to some embodiments of the present disclosure, the sixth intermediate element groove supporting surface 1-446a and the second intermediate element groove supporting surface 1-442a may be facing in the same direction.

According to some embodiments of the present disclosure, the sixth intermediate element groove supporting surface 1-446a may be parallel to the third intermediate element groove supporting surface 1-443a. According to some embodiments of the present disclosure, the sixth intermediate element groove supporting surface 1-446a and the third intermediate element groove supporting surface 1-443a may be facing in opposite directions.

According to some embodiments of the present disclosure, the sixth intermediate element groove supporting surface 1-446a may not be parallel to the fourth intermediate element groove supporting surface 1-444a. According to some embodiments of the present disclosure, the sixth intermediate element groove supporting surface 1-446a may be perpendicular to the fourth intermediate element groove supporting surface 1-444a.

According to some embodiments of the present disclosure, the fifth intermediate element groove supporting surface 1-445a may not be parallel to the sixth intermediate element groove supporting surface 1-446*a*. According to some embodiments of the present disclosure, the fifth intermediate element groove supporting surface 1-445*a* may be perpendicular to the sixth intermediate element groove supporting surface 1-446*a*.

According to some embodiments of the present disclosure, in the second axis 1-AX2, the maximum dimension 1-436S of the sixth intermediate element 1-436 may be different from the maximum dimension 1-435S of the fifth intermediate element 1-435.

In this way, the internal space of the optical element driving mechanism 1-100 may be effectively utilized.

According to some embodiments of the present disclosure, in the second axis 1-AX2, the maximum dimension 1-436S of the sixth intermediate element 1-436 may be the same as the maximum dimension 1-435S of the fifth intermediate element 1-435.

In this way, the optical element driving mechanism 1-100 may be more stable.

According to some embodiments of the present disclosure, the sixth intermediate element groove surface 1-456 may have a planar structure. According to some embodiments of the present disclosure, the sixth intermediate element groove surface 1-456 may not be parallel to the sixth intermediate element groove supporting surface 1-446*a*.

According to some embodiments of the present disclosure, the shortest distance 1-S8 between the sixth intermediate element 1-436 and the sixth intermediate element groove surface 1-456 may be different from the shortest distance 1-S9 between the sixth intermediate element 1-436 and the sixth intermediate element groove supporting surface 1-446*a*.

According to some embodiments of the present disclosure, the sixth intermediate element 1-436 may not be in contact with the sixth intermediate element groove surface 1-456.

For example, according to some embodiments of the present disclosure, the shortest distance 1-S8 between the sixth intermediate element 1-436 and the sixth intermediate element groove surface 1-456 may be greater than the shortest distance 1-S9 between the sixth intermediate element 1-436 and the sixth intermediate element groove supporting surface 1-446*a*.

In this way, the movement of the first supporting element 1-41 relative to the sixth intermediate element 1-436 may be smoother; thereby the optical element driving mechanism 1-100 is more stable.

According to some embodiments of the present disclosure, the sixth intermediate element groove surface 1-456 and the fifth intermediate element groove supporting surface 1-445*a* may be facing in the same direction.

Please refer to FIG. 6, according to some embodiments of the present disclosure, the seventh intermediate element groove 1-447 may have a recessed structure, and the seventh intermediate element groove 1-447 may be adjacent to the second accommodating structure 1-422. The seventh intermediate element 1-437 may be located in the second accommodating structure 1-422, and the seventh intermediate element 1-437 may correspond to the first supporting element 1-41.

To be more specific, the seventh intermediate element 1-437 may be located in the seventh intermediate element groove 1-447, and the seventh intermediate element groove 1-447 may be formed in the second accommodating structure 1-422.

The seventh connecting element 1-467 may be disposed in the seventh intermediate element groove 1-447. The seventh connecting element 1-467 may be in direct contact with the seventh intermediate element 1-437 and a seventh intermediate element groove supporting surface 1-447*a* of the seventh intermediate element groove 1-447.

The seventh intermediate element groove surface 1-457 may be formed in the seventh intermediate element groove 1-447, and the seventh intermediate element groove surface 1-457 may correspond to the seventh intermediate element 1-437.

That is, according to some embodiments of the present disclosure, the seventh connecting element 1-467 may be disposed in the second accommodating structure 1-422. According to some embodiments of the present disclosure, the seventh connecting element 1-467 may be disposed in the seventh intermediate element groove 1-447. Therefore, according to some embodiments of the present disclosure, the seventh intermediate element 1-437 may be fixedly connected to the seventh intermediate element groove supporting surface 1-447*a*.

According to some embodiments of the present disclosure, the seventh intermediate element 1-437 may have a curved surface structure. According to some embodiments of the present disclosure, the seventh intermediate element 1-437 may have a spherical structure.

As shown in FIG. 6, the seventh intermediate element 1-437 may be in direct contact with the first supporting element 1-41, so that the first supporting element 1-41 may move relative to the seventh intermediate element 1-437.

According to some embodiments of the present disclosure, the seventh intermediate element 1-437 may not overlap the first supporting element 1-41 when viewed along the first axis 1-AX1.

According to some embodiments of the present disclosure, in the second axis 1-AX2, the maximum dimension 1-437S of the seventh intermediate element 1-437 may be different from the maximum dimension 1-41S of the first supporting element 1-41. According to some embodiments of the present disclosure, in the second axis 1-AX2, the maximum dimension 1-437S of the seventh intermediate element 1-437 may be greater than the maximum dimension 1-41S of the first supporting element 1-41.

In this way, the undesired movement of the first supporting element 1-41 may be effectively avoided, thereby the optical element driving mechanism 1-100 is more stable.

According to some embodiments of the present disclosure, the alignment direction of the center 1-435C of the fifth intermediate element 1-435 and the center 1-437C of the seventh intermediate element 1-437 may not be parallel to the first axis 1-AX1.

According to some embodiments of the present disclosure, the alignment direction of the center 1-435C of the fifth intermediate element 1-435 and the center 1-437C of the seventh intermediate element 1-437 may be perpendicular to the first axis 1-AX1.

According to some embodiments of the present disclosure, the alignment direction of the center 1-435C of the fifth intermediate element 1-435 and the center 1-437C of the seventh intermediate element 1-437 may not be parallel to the alignment direction of the center 1-436C of the sixth intermediate element 1-436 and the center 1-437C of the seven intermediate elements 1-437.

According to some embodiments of the present disclosure, the alignment direction of the center 1-435C of the fifth intermediate element 1-435 and the center 1-437C of the seventh intermediate element 1-437 may not be perpendicular to the alignment direction of the center 1-436C of the sixth intermediate element 1-436 and the center 1-437C of the seven intermediate element 1-437.

In this way, the undesired movement of the first supporting element 1-41 may be effectively avoided, thereby the optical element driving mechanism 1-100 is more stable.

According to some embodiments of the present disclosure, the seventh intermediate element groove supporting surface 1-447*a* may have a planar structure.

According to some embodiments of the present disclosure, the seventh intermediate element groove supporting surface 1-447*a* may not be parallel to the first intermediate element groove supporting surface 1-441*a*. According to some embodiments of the present disclosure, the seventh intermediate element groove supporting surface 1-447*a* may be perpendicular to the first intermediate element groove supporting surface 1-441*a*.

According to some embodiments of the present disclosure, the seventh intermediate element groove supporting surface 1-447*a* may be parallel to the second intermediate element groove supporting surface 1-442*a*. According to some embodiments of the present disclosure, the seventh intermediate element groove supporting surface 1-447*a* and the second intermediate element groove supporting surface 1-442*a* may be facing in opposite directions.

According to some embodiments of the present disclosure, the seventh intermediate element groove supporting surface 1-447*a* may be parallel to the third intermediate element groove supporting surface 1-443*a*. According to some embodiments of the present disclosure, the seventh intermediate element groove supporting surface 1-447*a* and the third intermediate element groove supporting surface 1-443*a* may be facing in the same direction.

According to some embodiments of the present disclosure, the seventh intermediate element groove supporting surface 1-447*a* may not be parallel to the fourth intermediate element groove supporting surface 1-444*a*. According to some embodiments of the present disclosure, the seventh intermediate element groove supporting surface 1-447*a* may be perpendicular to the fourth intermediate element groove supporting surface 1-444*a*.

According to some embodiments of the present disclosure, the fifth intermediate element groove supporting surface 1-445*a* may not be parallel to the seventh intermediate element groove supporting surface 1-447*a*. According to some embodiments of the present disclosure, the fifth intermediate element groove supporting surface 1-445*a* may be perpendicular to the seventh intermediate element groove supporting surface 1-447*a*.

According to some embodiments of the present disclosure, the seventh intermediate element groove supporting surface 1-447*a* may be parallel to the sixth intermediate element groove supporting surface 1-446*a*. According to some embodiments of the present disclosure, the seventh intermediate element groove supporting surface 1-447*a* and the sixth intermediate element groove supporting surface 1-446*a* may be facing in opposite directions.

According to some embodiments of the present disclosure, in the second axis 1-AX2, the maximum dimension 1-437S of the seventh intermediate element 1-437 may be different from the maximum dimension 1-435S of the fifth intermediate element 1-435.

In this way, the internal space of the optical element driving mechanism 1-100 may be effectively utilized.

According to some embodiments of the present disclosure, in the second axis 1-AX2, the maximum dimension 1-437S of the seventh intermediate element 1-437 may be the same as the maximum dimension 1-435S of the fifth intermediate element 1-435.

In this way, the optical element driving mechanism 1-100 may be more stable.

According to some embodiments of the present disclosure, in the second axis 1-AX2, the maximum dimension 1-437S of the seventh intermediate element 1-437 may be the same as the maximum dimension 1-436S of the sixth intermediate element 1-436.

According to some embodiments of the present disclosure, the seventh intermediate element groove surface 1-457 may have a planar structure. According to some embodiments of the present disclosure, the seventh intermediate element groove surface 1-457 may not be parallel to the seventh intermediate element groove supporting surface 1-447*a*.

According to some embodiments of the present disclosure, the shortest distance 1-S10 between the seventh intermediate element 1-437 and the seventh intermediate element groove surface 1-457 may be different from the shortest distance 1-S11 between the seventh intermediate element 1-437 and the seventh intermediate element groove supporting surface 1-447*a*.

According to some embodiments of the present disclosure, the seventh intermediate element 1-437 may not be in contact with the groove surface 1-457 of the seventh intermediate element.

For example, according to some embodiments of the present disclosure, the shortest distance 1-S10 between the seventh intermediate element 1-437 and the seventh intermediate element groove surface 1-457 may be greater than the shortest distance 1-S11 between the seventh intermediate element 1-437 and the seventh intermediate element groove supporting surface 1-447*a*.

In this way, the movement of the first supporting element 1-41 relative to the seventh intermediate element 1-437 may be smoother; thereby the optical element driving mechanism 1-100 is more stable.

According to some embodiments of the present disclosure, the seventh intermediate element groove surface 1-457 and the fifth intermediate element groove supporting surface 1-445*a* may be facing in the same direction.

According to some embodiments of the present disclosure, the seventh intermediate element groove supporting surface 1-447*a* and the sixth intermediate element groove supporting surface 1-446*a* may be facing in opposite directions.

According to some embodiments of the present disclosure, the shortest distance 1-S12 between the center 1-435C of the fifth intermediate element 1-435 and the center 1-437C of the seventh intermediate element 1-437 may be different from the shortest distance 1-S13 between the center 1-436C of the sixth intermediate element 1-436 and the center 1-437C of the seventh intermediate element 1-437.

According to some embodiments of the present disclosure, the shortest distance 1-S12 between the center 1-435C of the fifth intermediate element 1-435 and the center 1-437C of the seventh intermediate element 1-437 may be greater than the shortest distance 1-S13 between the center 1-436C of the sixth intermediate element 1-436 and the center 1-437C of the seventh intermediate element 1-437.

Please refer to FIG. 5, according to some embodiments of the present disclosure, the eighth intermediate element groove 1-448 may have a recessed structure, and the eighth intermediate element groove 1-448 may be adjacent to the second accommodating structure 1-422. The eighth intermediate element 1-438 may be located in the second accommodating structure 1-422, and the eighth intermediate element 1-438 may correspond to the first supporting element 1-41.

To be more specific, the eighth intermediate element 1-438 may be located in the eighth intermediate element groove 1-448, and the eighth intermediate element groove 1-448 may be formed in the second accommodating structure 1-422.

The eighth connecting element 1-468 may be disposed in the eighth intermediate element groove 1-448. The eighth connecting element 1-468 may be in direct contact with the eighth intermediate element 1-438 and an eighth intermediate element groove supporting surface 1-448a of the eighth intermediate element groove 1-448.

The eighth intermediate element groove surface 1-458 may be formed in the eighth intermediate element groove 1-448, and the eighth intermediate element groove surface 1-458 may correspond to the eighth intermediate element 1-438.

That is, according to some embodiments of the present disclosure, the eighth connecting element 1-468 may be disposed in the second accommodating structure 1-422. According to some embodiments of the present disclosure, the eighth connecting element 1-468 may be disposed in the eighth intermediate element groove 1-448. Therefore, according to some embodiments of the present disclosure, the eighth intermediate element 1-438 may be fixedly connected to the eighth intermediate element groove supporting surface 1-448a.

According to some embodiments of the present disclosure, the eighth intermediate element 1-438 may have a curved structure. According to some embodiments of the present disclosure, the eighth intermediate element 1-438 may have a spherical structure.

As shown in FIG. 5, the eighth intermediate element 1-438 may be in direct contact with the first supporting element 1-41, so that the first supporting element 1-41 may move relative to the eighth intermediate element 1-438.

According to some embodiments of the present disclosure, the eighth intermediate element 1-438 may overlap the first supporting element 1-41 when viewed along the first axis 1-AX1.

According to some embodiments of the present disclosure, the eighth intermediate element groove supporting surface 1-448a may have a planar structure. According to some embodiments of the present disclosure, the eighth intermediate element groove supporting surface 1-448a may not be parallel to the first intermediate element groove supporting surface 1-441a. According to some embodiments of the present disclosure, the eighth intermediate element groove supporting surface 1-448a may be perpendicular to the first intermediate element groove supporting surface 1-441a.

According to some embodiments of the present disclosure, the eighth intermediate element groove supporting surface 1-448a may not be parallel to the second intermediate element groove supporting surface 1-442a. According to some embodiments of the present disclosure, the eighth intermediate element groove supporting surface 1-448a may be perpendicular to the second intermediate element groove supporting surface 1-442a.

According to some embodiments of the present disclosure, the eighth intermediate element groove supporting surface 1-448a may not be parallel to the third intermediate element groove supporting surface 1-443a. According to some embodiments of the present disclosure, the eighth intermediate element groove supporting surface 1-448a may be perpendicular to the third intermediate element groove supporting surface 1-443a.

According to some embodiments of the present disclosure, the eighth intermediate element groove supporting surface 1-448a may be parallel to the fourth intermediate element groove supporting surface 1-444a. According to some embodiments of the present disclosure, the eighth intermediate element groove supporting surface 1-448a and the fourth intermediate element groove supporting surface 1-444a may be facing in opposite directions.

According to some embodiments of the present disclosure, the eighth intermediate element groove supporting surface 1-448a may have a planar structure. According to some embodiments of the present disclosure, the eighth intermediate element groove supporting surface 1-448a may not be parallel to the fifth intermediate element groove supporting surface 1-445a. According to some embodiments of the present disclosure, the eighth intermediate element groove supporting surface 1-448a may be perpendicular to the fifth intermediate element groove supporting surface 1-445a.

According to some embodiments of the present disclosure, the eighth intermediate element groove supporting surface 1-448a may not be parallel to the sixth intermediate element groove supporting surface 1-446a. According to some embodiments of the present disclosure, the eighth intermediate element groove supporting surface 1-448a may be perpendicular to the sixth intermediate element groove supporting surface 1-446a.

According to some embodiments of the present disclosure, the eighth intermediate element groove supporting surface 1-448a may not be parallel to the seventh intermediate element groove supporting surface 1-447a. According to some embodiments of the present disclosure, the eighth intermediate element groove supporting surface 1-448a may be perpendicular to the seventh intermediate element groove supporting surface 1-447a.

The second stopping surface 1-472 may correspond to the first supporting element 1-41. According to some embodiments of the present disclosure, the second stopping surface 1-472 may at least partially overlap the first supporting element 1-41 when viewed along the first axis 1-AX1.

According to some embodiments of the present disclosure, the second stopping surface 1-472 may be located between the second accommodating structure 1-422 and the eighth intermediate element groove 1-448.

According to some embodiments of the present disclosure, in the first axis 1-AX1, the shortest distance 1-S14 between the second stopping surface 1-472 and the eighth intermediate element groove supporting surface 1-448a may be different from the maximum dimension 1-438S of the eighth intermediate element 1-438.

According to some embodiments of the present disclosure, in the first axis 1-AX1, the shortest distance 1-S14 between the second stopping surface 1-472 and the eighth intermediate element groove supporting surface 1-448a may be shorter than the maximum dimension 1-438S of the eighth intermediate element 1-438.

In this way, the first supporting element 1-41 may be moved more smoothly relative to the eighth intermediate element 1-438, and the excessive movement of the first supporting element 1-41 along the first axis 1-AX1 may be avoided.

According to some embodiments of the present disclosure, in the second axis 1-AX2, the maximum dimension 1-438S of the eighth intermediate element 1-438 may be different from the maximum dimension 1-435S of the fifth intermediate element 1-435.

According to some embodiments of the present disclosure, in the second axis 1-AX2, the maximum dimension 1-438S of the eighth intermediate element 1-438 may be shorter than the maximum dimension 1-435S of the fifth intermediate element 1-435.

According to some embodiments of the present disclosure, in the second axis 1-AX2, the maximum dimension 1-438S of the eighth intermediate element 1-438 may be different from the maximum dimension 1-436S of the sixth intermediate element 1-436.

According to some embodiments of the present disclosure, in the second axis 1-AX2, the maximum dimension 1-438S of the eighth intermediate element 1-438 may be shorter than the maximum dimension 1-436S of the sixth intermediate element 1-436.

According to some embodiments of the present disclosure, in the second axis 1-AX2, the maximum dimension 1-438S of the eighth intermediate element 1-438 may be different from the maximum dimension 1-437S of the seventh intermediate element 1-437.

According to some embodiments of the present disclosure, in the second axis 1-AX2, the maximum dimension 1-438S of the eighth intermediate element 1-438 may be shorter than the maximum dimension 1-437S of the seventh intermediate element 1-437.

According to some embodiments of the present disclosure, the maximum dimension 1-438S of the eighth intermediate element 1-438 may be different from the maximum dimension 1-41S of the first supporting element 1-41 when viewed along the first axis 1-AX1.

According to some embodiments of the present disclosure, the maximum dimension 1-438S of the eighth intermediate element 1-438 may be shorter than the maximum dimension 1-41S of the first supporting element 1-41 when viewed along the first axis 1-AX1.

In this way, the internal space of the optical element driving mechanism 1-100 may be effectively utilized, thereby achieving the effect of miniaturization.

According to some embodiments of the present disclosure, in the first axis 1-AX1, the shortest distance 1-S14 between the second stopping surface 1-472 and the eighth intermediate element groove supporting surface 1-448a may be different from the shortest distance 1-S7 between the first stopping surface 1-471 and the fourth intermediate element groove supporting surface 1-444a.

According to some embodiments of the present disclosure, the shortest distance 1-S14 between the second stopping surface 1-472 and the eighth intermediate element groove supporting surface 1-448a may be greater than the shortest distance 1-S7 between the first stopping surface 1-471 and the fourth intermediate element groove supporting surface 1-444a.

In this way, the assembly of the optical element driving mechanism 1-100 may be facilitated, thereby reducing the manufacturing cost of the optical element driving mechanism 1-100.

According to some embodiments of the present disclosure, in the first axis 1-AX1, the shortest distance 1-S15 between the first supporting element 1-41 and the fourth intermediate element groove supporting surface 1-444a may be 0.1 mm (millimeter) greater than the maximum size of 1-434S of the fourth intermediate element 1-434.

According to some embodiments of the present disclosure, in the first axis 1-AX1, the shortest distance 1-S16 between the first supporting element 1-41 and the eighth intermediate element groove supporting surface 1-448a may be 0.1 mm greater than the maximum size of 1-438S of the eighth intermediate element 1-438.

In this way, the assembly of the optical element driving mechanism 1-100 may be facilitated, thereby reducing the manufacturing cost of the optical element driving mechanism 1-100.

In this way, the undesired movement of the first supporting element 1-41 may be avoided, thereby the optical element driving mechanism 1-100 is more stable.

Figure 7:
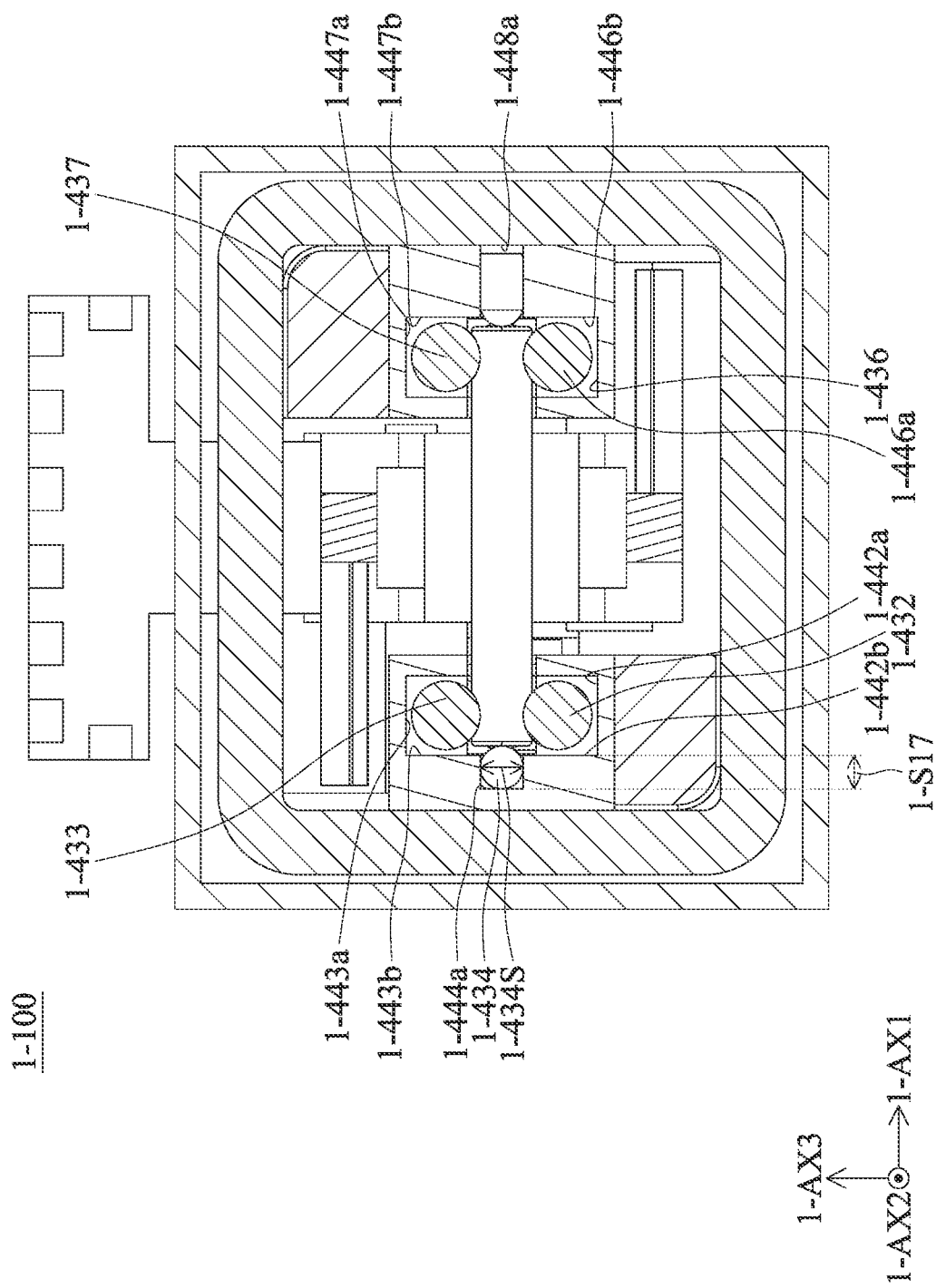
FIG. 7 is a cross-sectional view of the optical element driving mechanism along line 1-D-1-D' of FIG. 2, according to some embodiments of the present disclosure.

Please refer to FIG. 7, FIG. 7 is a cross-sectional view of the optical element driving mechanism 1-100 along line 1-D-1-D' of FIG. 2, according to some embodiments of the present disclosure.

According to some embodiments of the present disclosure, the second intermediate element groove 1-442 may further include a second intermediate element groove second supporting surface 1-442b.

The second intermediate element groove second supporting surface 1-442b may be formed in the second intermediate element groove 1-442, and the second intermediate element groove second supporting surface 1-442b may correspond to the second intermediate element 1-432.

According to some embodiments of the present disclosure, the second intermediate element groove second supporting surface 1-442b may face the second intermediate element 1-432. According to some embodiments of the present disclosure, the second intermediate element 1-432 may be in contact with the second intermediate element groove second supporting surface 1-442b.

According to some embodiments of the present disclosure, the second intermediate element groove second supporting surface 1-442b and the fourth intermediate element groove supporting surface 1-444a may be facing in the same direction.

According to some embodiments of the present disclosure, the third intermediate element groove 1-443 may further include a third intermediate element groove second supporting surface 1-443b.

The third intermediate element groove second supporting surface 1-443b may be formed in the third intermediate element groove 1-443, and the third intermediate element groove second supporting surface 1-443b may correspond to the third intermediate element 1-433.

According to some embodiments of the present disclosure, the third intermediate element groove second supporting surface 1-443b may face the third intermediate element 1-433. According to some embodiments of the present disclosure, the third intermediate element 1-433 may be in contact with the third intermediate element groove second supporting surface 1-443b.

According to some embodiments of the present disclosure, the third intermediate element groove second supporting surface 1-443b and the second intermediate element groove second supporting surface 1-442b may be facing in the same direction.

According to some embodiments of the present disclosure, the third intermediate element groove second supporting surface 1-443b and the second intermediate element groove second supporting surface 1-442b may be facing in the same direction.

According to some embodiments of the present disclosure, the sixth intermediate element groove 1-446 may further include a sixth intermediate element groove second supporting surface 1-446b.

The sixth intermediate element groove second supporting surface 1-446b may be formed in the sixth intermediate element groove 1-446, and the sixth intermediate element groove second supporting surface 1-446b may correspond to the sixth intermediate element 1-436.

According to some embodiments of the present disclosure, the sixth intermediate element groove second supporting surface 1-446b may face the sixth intermediate element 1-436. According to some embodiments of the present disclosure, the sixth intermediate element 1-436 may be in contact with the sixth intermediate element groove second supporting surface 1-446b.

According to some embodiments of the present disclosure, the sixth intermediate element groove second supporting surface 1-446b and the second intermediate element groove second supporting surface 1-442b may be facing in opposite directions.

According to some embodiments of the present disclosure, the sixth intermediate element groove second supporting surface 1-446b and the third intermediate element groove second supporting surface 1-443b may be facing in opposite directions.

According to some embodiments of the present disclosure, the sixth intermediate element groove second supporting surface 1-446b and the fourth intermediate element groove supporting surface 1-444a may be facing in opposite directions.

According to some embodiments of the present disclosure, the sixth intermediate element groove second supporting surface 1-446b and the eighth intermediate element groove supporting surface 1-448a may be facing in the same direction.

According to some embodiments of the present disclosure, the seventh intermediate element groove 1-447 may further include a seventh intermediate element groove second supporting surface 1-447b.

The seventh intermediate element groove second supporting surface 1-447b may be formed in the seventh intermediate element groove 1-447, and the seventh intermediate element groove second supporting surface 1-447b may correspond to the seventh intermediate element 1-437.

According to some embodiments of the present disclosure, the seventh intermediate element groove second supporting surface 1-447b may face the seventh intermediate element 1-437. According to some embodiments of the present disclosure, the seventh intermediate element 1-437 may be in contact with the seventh intermediate element groove second supporting surface 1-447b.

According to some embodiments of the present disclosure, the seventh intermediate element groove second supporting surface 1-447b and the second intermediate element groove second supporting surface 1-442b may be facing in opposite directions.

According to some embodiments of the present disclosure, the seventh intermediate element groove second supporting surface 1-447b and the third intermediate element groove second supporting surface 1-443b may be facing in opposite directions.

According to some embodiments of the present disclosure, the seventh intermediate element groove second supporting surface 1-447b and the fourth intermediate element groove supporting surface 1-444a may be facing in opposite directions.

According to some embodiments of the present disclosure, the seventh intermediate element groove second supporting surface 1-447b and the eighth intermediate element groove supporting surface 1-448a may be facing in the same direction.

In this way, the undesired movement of the first supporting element 1-41 may be avoided, thereby the optical element driving mechanism 1-100 is more stable.

According to some embodiments of the present disclosure, in the first axis 1-AX1, the shortest distance 1-S17 between the second intermediate element groove second supporting surface 1-442b and the fourth intermediate element groove supporting surface 1-444a may be greater than the maximum size 1-434S of the fourth intermediate element 1-434.

In this way, the internal space of the optical element driving mechanism 1-100 may be effectively utilized, and the optical element driving mechanism 1-100 may be miniaturized.

Figure 8:
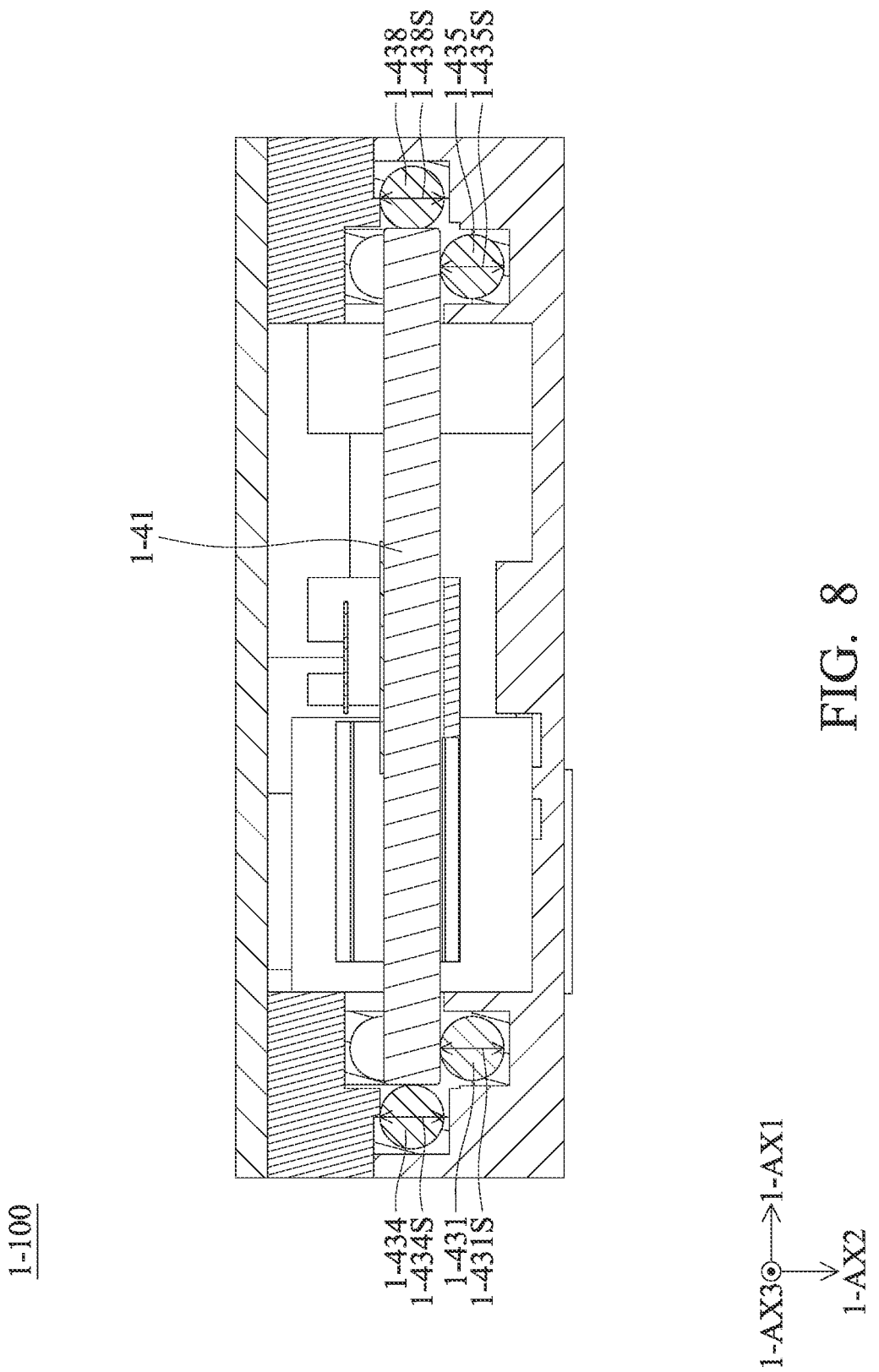
FIG. 8 is a schematic view of a modified embodiment of the optical element driving mechanism according to FIG. 5.

Please refer to FIG. 8, FIG. 8 is a schematic view of a modified embodiment of the optical element driving mechanism 1-100 according to FIG. 5. As shown in FIG. 8, according to some embodiments of the present disclosure, in the second axis 1-AX2, the maximum dimension 1-434S of the fourth intermediate element 1-434 may be the same as the maximum dimension 1-431S of the first intermediate element 1-431.

According to some embodiments of the present disclosure, in the second axis 1-AX2, the maximum dimension 1-438S of the eighth intermediate element 1-438 may be the same as the maximum dimension 1-435S of the fifth intermediate element 1-435.

In this way, the undesired movement of the first supporting element 1-41 may be avoided, thereby the optical element driving mechanism 1-100 is more stable.

In general, the first supporting assembly of the optical element driving mechanism of the embodiments of the present disclosure may stably move the first supporting element within a desired range. Moreover, the optical element driving mechanism of the embodiments of the present disclosure may be helpful to reduce the difficulty of assembly, thereby reducing the manufacturing cost. Furthermore, the optical element driving mechanism of the embodiments of the present disclosure may achieve the effect of miniaturization.

Embodiment Group 2

Figure 9:
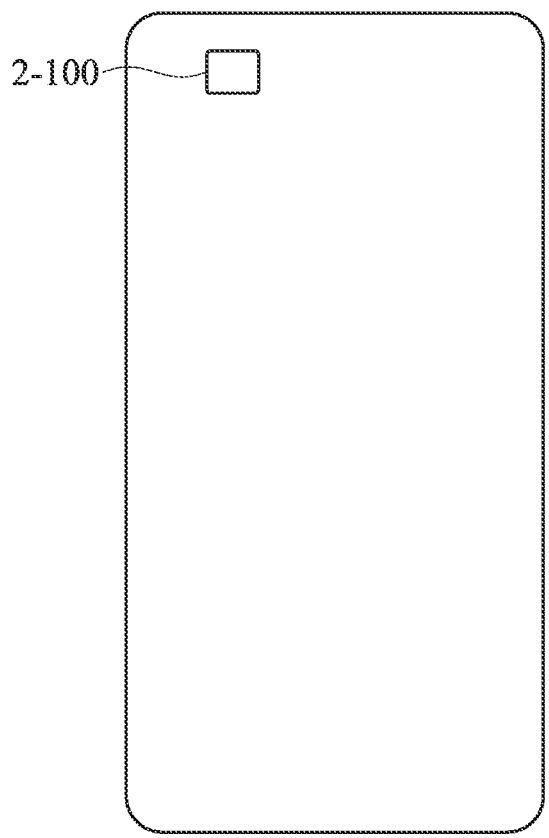
FIG. 9 is a schematic view of an electrical device according to some embodiment of the present disclosure.

Firstly, please refer to FIG. 9, FIG. 9 is a schematic view of an electrical device 2-1 according to some embodiment of the present disclosure. As shown in FIG. 9, an optical element driving mechanism 2-100 of some embodiment of the present disclosure may be mounted in an electrical device 2-1 for taking photos or videos, wherein the aforementioned electrical device 2-1 may, for example, be a smartphone or a digital camera, but the present disclosure is not limited to these. It should be noted that the position and the size between the optical element driving mechanism 2-100 and the electrical device 2-1 shown in FIG. 9 are only an example, which is not for limiting the position and the size between the optical element driving mechanism 2-100 and the electrical device 2-1. In fact, according to different needs, the optical element driving mechanism 2-100 may be mounted at different positions in the electrical device 2-1

Figure 10:
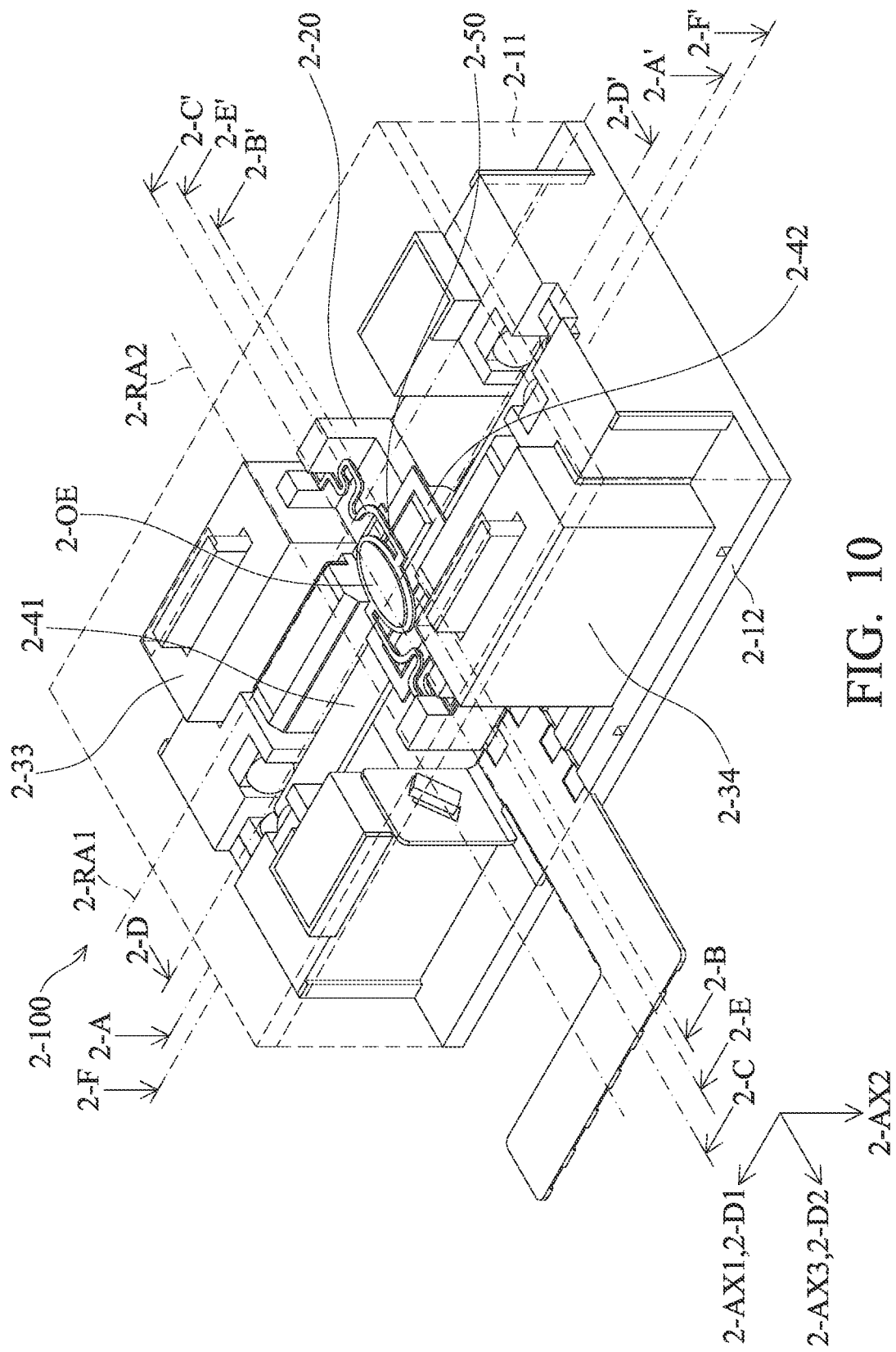
FIG. 10 is a schematic view of an optical element driving mechanism and an optical element according to some embodiments of the present disclosure, wherein an outer frame is shown as a dashed line.
Figure 11:
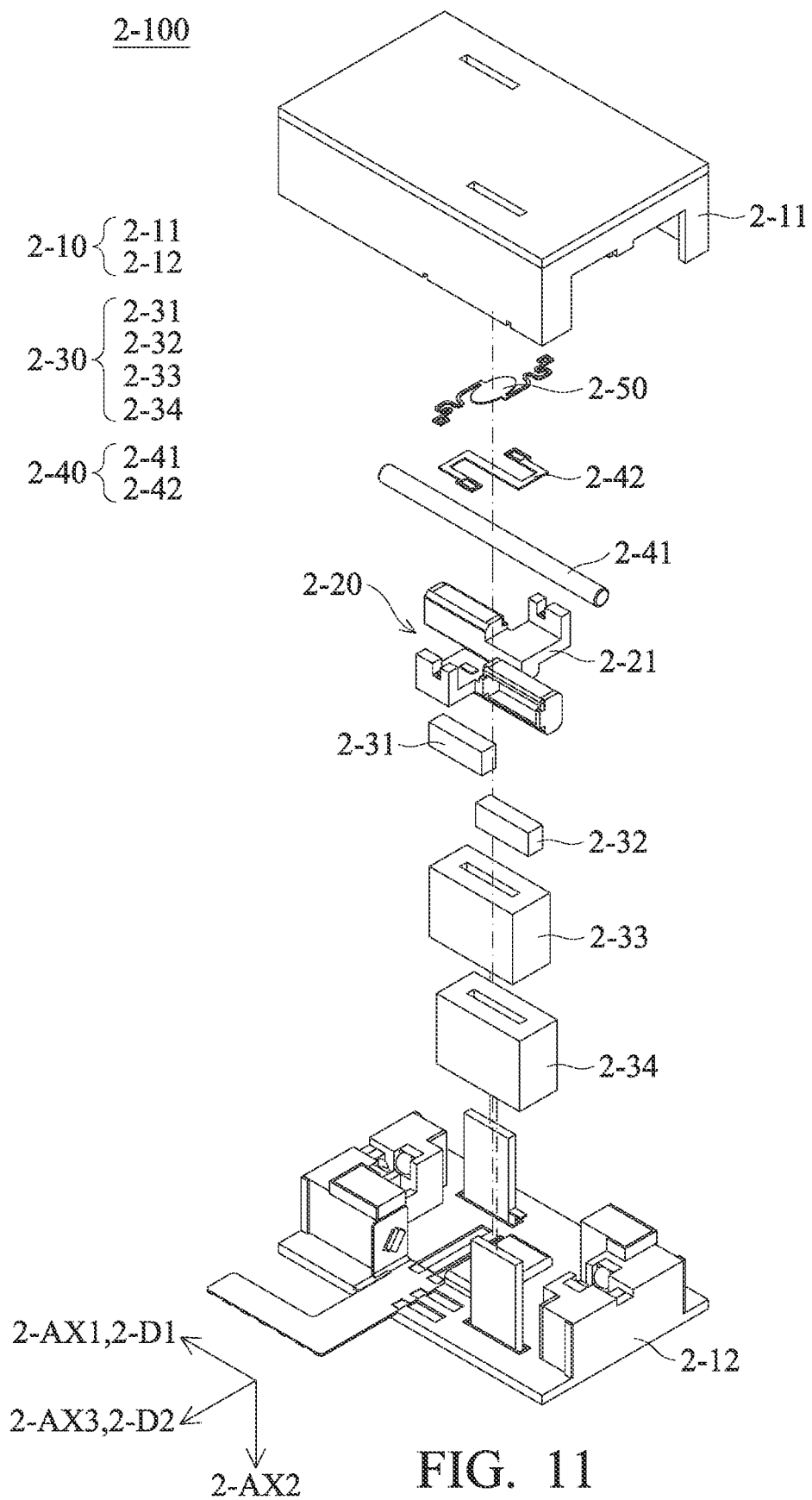
FIG. 11 is an exploded view of the optical element driving mechanism according to some embodiments of the present disclosure.

Please refer to FIG. 10. FIG. 10 is a schematic view of the optical element driving mechanism 2-100 and an optical element 2-OE according to some embodiments of the present disclosure, wherein the outer frame is shown as a dashed line. FIG. 11 is an exploded view of the optical element driving mechanism 2-100 according to some embodiments of the present disclosure.

As shown in FIG. 10 and FIG. 11, the optical element driving mechanism 2-100 may include a fixed part 2-10, a movable part 2-20, a driving assembly 2-30, a first supporting assembly 2-40, and a second supporting assembly 2-50.

According to some embodiments of the present disclosure, there may be a gap between the movable part 2-20 and the fixed part 2-10, so that the movable part 2-20 may move relative to the fixed part 2-10. The driving assembly 2-30 may drive the movable part 2-20 to move relative to the fixed part 2-10.

According to some embodiments of the present disclosure, the driving assembly 2-30 may be used to drive the movable part 2-20 to move in a first dimension 2-D1. According to some embodiments of the present disclosure, the first dimension 2-D1 may be the rotation about a first rotation axis 2-RA1, and the first rotation axis 2-RA1 may be parallel to a first axis 2-AX1.

According to some embodiments of the present disclosure, the movable part 2-20 may be connected to the optical element 2-OE, and the movable part 2-20 may be moved relative to the fixed part 2-10 through the support of the first supporting assembly 2-40.

According to some embodiments of the present disclosure, the first supporting assembly 2-40 may be at least partially located between the movable part 2-20 and the fixed part 2-10. According to some embodiments of the present disclosure, the optical element 2-OE may move relative to the movable part 2-20 through the second supporting assembly 2-50.

The fixed part 2-10 may include an outer frame 2-11 and a base 2-12. The outer frame 2-11 may be disposed on the base 2-12 to form an inner space and accommodate the elements of the optical element driving mechanism 2-100.

The movable part 2-20 may include a movable part frame 2-21. The driving assembly 2-30 may include a first driving magnetic element 2-31, a second driving magnetic element 2-32, a first driving coil 2-33, and a second driving coil 2-34. The first supporting assembly 2-40 may include a first supporting element 2-41 and a positioning element 2-42.

According to some embodiments of the present disclosure, the first supporting element 2-41 may move relative to the fixed part 2-10. According to some embodiments of the present disclosure, the first supporting element 2-41 may move the movable part 2-20.

Figure 12:
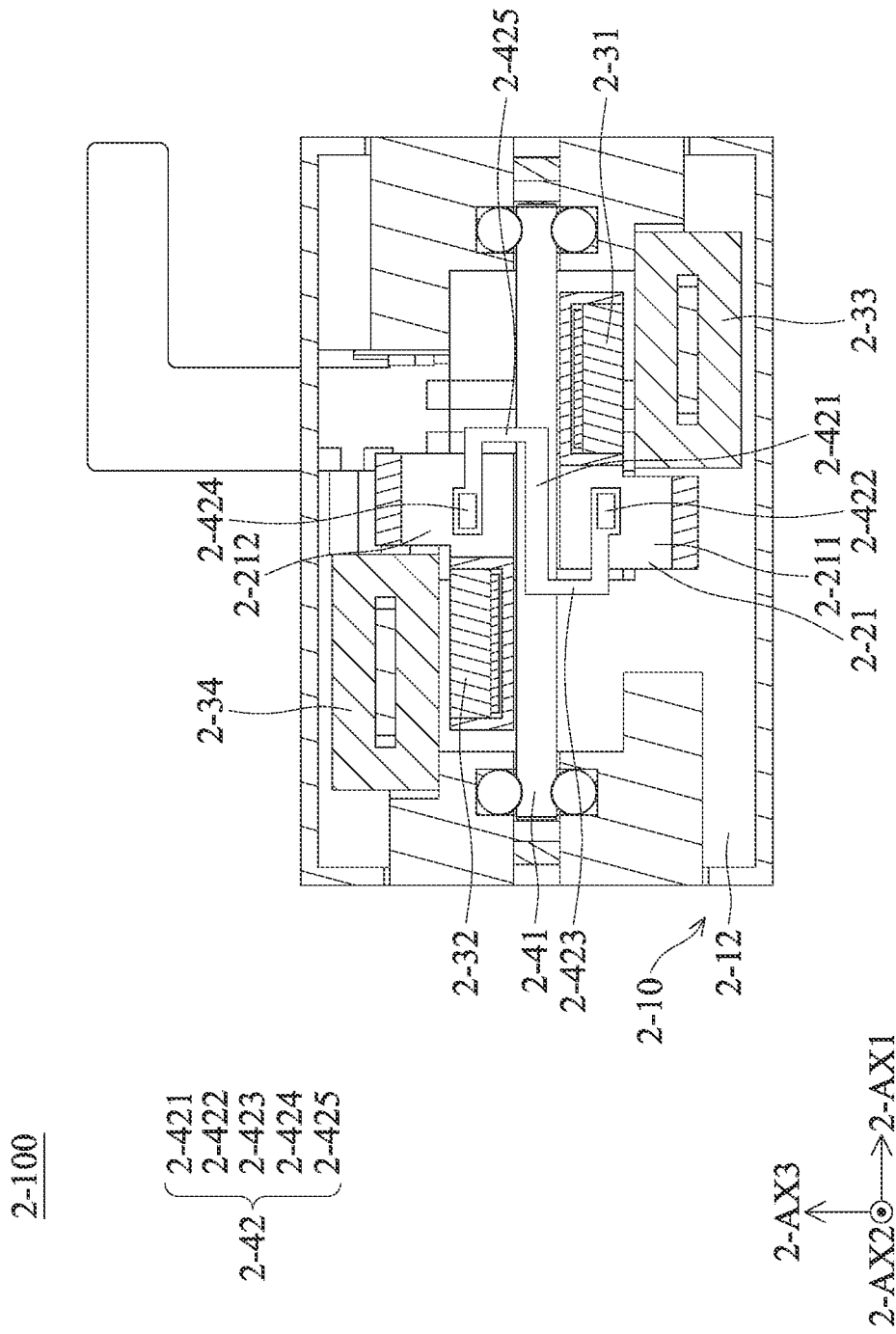
FIG. 12 is a cross-sectional view of the optical element driving mechanism along line 2-A-2-A' of FIG. 10, according to some embodiments of the present disclosure.

Please refer to FIG. 12, FIG. 12 is a cross-sectional view of the optical element driving mechanism 2-100 along line 2-A-2-A' of FIG. 10, according to some embodiments of the present disclosure.

As shown in FIG. 12, the first driving coil 2-33 may correspond to the first driving magnetic element 2-31. The second driving coil 2-34 may correspond to the second driving magnetic element 2-32.

According to some embodiments of the present disclosure, the optical element driving mechanism 2-100 may have an elongated structure when viewed along a second axis 2-AX2 that is perpendicular to the first axis 2-AX1. According to some embodiments of the present disclosure, the optical element driving mechanism 2-100 may extend along the first axis 2-AX1 when viewed along the second axis 2-AX2.

Please refer to FIG. 12, according to some embodiments of the present disclosure, the first driving magnetic element 2-31 may have an elongated structure when viewed along the second axis 2-AX2. According to some embodiments of the present disclosure, the second driving magnetic element 2-32 may have an elongated structure when viewed along the second axis 2-AX2.

According to some embodiments of the present disclosure, the first driving magnetic element 2-31 may extend along the first axis 2-AX1 when viewed along the second axis 2-AX2. According to some embodiments of the present disclosure, the second driving magnetic element 2-32 may extend along the first axis 2-AX1 when viewed along the second axis 2-AX2.

According to some embodiments of the present disclosure, the first driving magnetic element 2-31 may be fixedly disposed on the movable part frame 2-21. According to some embodiments of the present disclosure, the second driving magnetic element 2-32 may be fixedly disposed on the movable part frame 2-21.

As shown in FIG. 12, according to some embodiments of the present disclosure, the first driving coil 2-33 may be fixedly disposed on the fixed part 2-10. According to some embodiments of the present disclosure, the second driving coil 2-34 may be fixedly disposed on the fixed part 2-10.

According to some embodiments of the present disclosure, the first driving coil 2-33 may be fixedly disposed on the base 2-12 of the fixed part 2-10. According to some embodiments of the present disclosure, the second driving coil 2-34 may be fixedly disposed on the base 2-12 of the fixed part 2-10.

Please refer to FIG. 12, according to some embodiments of the present disclosure, the first driving coil 2-33 may not overlap the second driving coil 2-34 when viewed along the first axis 2-AX1. According to some embodiments of the present disclosure, the first driving coil 2-33 may not overlap the first driving magnetic element 2-31 when viewed along the first axis 2-AX1. According to some embodiments of the present disclosure, the first driving coil 2-33 may not overlap the second driving magnetic element 2-32 when viewed along the first axis 2-AX1.

According to some embodiments of the present disclosure, the first driving coil 2-33 may not overlap the second driving coil 2-34 when viewed along a third axis 2-AX3. According to some embodiments of the present disclosure, the first driving coil 2-33 may not overlap the second driving magnetic element 2-32 when viewed along the third axis 2-AX3. It should be noted that, according to some embodiments of the present disclosure, the third axis 2-AX3 may be perpendicular to the first axis 2-AX1 and the second axis 2-AX2.

According to some embodiments of the present disclosure, the second driving coil 2-34 may not overlap the first driving magnetic element 2-31 when viewed along the first axis 2-AX1. According to some embodiments of the present disclosure, the second driving coil 2-34 may not overlap the second driving magnetic element 2-32 when viewed along the first axis 2-AX1. According to some embodiments of the present disclosure, the second driving coil 2-34 may not overlap the first driving magnetic element 2-31 when viewed along the third axis 2-AX3.

As shown in FIG. 12, according to some embodiments of the present disclosure, the first driving coil 2-33 may not overlap the first supporting element 2-41 when viewed along the first axis 2-AX1. According to some embodiments of the present disclosure, the second driving coil 2-34 may not overlap the first supporting element 2-41 when viewed along the first axis 2-AX1.

According to some embodiments of the present disclosure, the first driving magnetic element 2-31 may not overlap the first supporting element 2-41 when viewed along the first axis 2-AX1. According to some embodiments of the present disclosure, the second driving magnetic element 2-32 may not overlap the first supporting element 2-41 when viewed along the first axis 2-AX1.

Please refer to FIG. 12, according to some embodiments of the present disclosure, the first driving coil 2-33 may overlap the first driving magnetic element 2-31 when viewed along the third axis 2-AX3. According to some embodiments of the present disclosure, the second driving coil 2-34 may overlap the second driving magnetic element 2-32 when viewed along the third axis 2-AX3.

According to some embodiments of the present disclosure, the first driving coil 2-33 may overlap the first supporting element 2-41 when viewed along the third axis 2-AX3. According to some embodiments of the present disclosure, the second driving coil 2-34 may overlap the first supporting element 2-41 when viewed along the third axis 2-AX3.

According to some embodiments of the present disclosure, the first driving magnetic element 2-31 may overlap the first supporting element 2-41 when viewed along the third axis 2-AX3. According to some embodiments of the present disclosure, the second driving magnetic element 2-32 may overlap the first supporting element 2-41 when viewed along the third axis 2-AX3.

As shown in FIG. 12, the first supporting element 2-41 may have an elongated structure, and the first supporting element 2-41 may extend along the first axis 2-AX1. The positioning element 2-42 may be used to position the first supporting element 2-41. According to some embodiments of the present disclosure, the positioning element 2-42 may be in direct contact with the first supporting element 2-41.

According to some embodiments of the present disclosure, the positioning element 2-42 may have a plate-like structure. According to some embodiments of the present disclosure, the positioning element 2-42 may be made of metal material. According to some embodiments of the present disclosure, the positioning element 2-42 may include materials with low magnetic-permeability.

Please refer to FIG. 12, the positioning element 2-42 may include a positioning element positioning portion 2-421, a positioning element first movable part frame fixing end 2-422, a positioning element first elastic portion 2-423, a positioning element second movable part frame fixing end 2-424, and a positioning element second elastic portion 2-425.

According to some embodiments of the present disclosure, the positioning element positioning portion 2-421 may correspond to the first supporting element 2-41. According to some embodiments of the present disclosure, the positioning element first movable part frame fixing end 2-422 may be fixedly connected to a movable part frame first surface 2-211 of the movable part frame 2-21 of the movable part 2-20.

According to some embodiments of the present disclosure, the positioning element first elastic portion 2-423 may be flexible. According to some embodiments of the present disclosure, the positioning element second movable part frame fixing end 2-424 may be fixedly connected to a movable part frame second surface 2-212 of the movable part frame 2-21. According to some embodiments of the present disclosure, the positioning element second elastic portion 2-425 may be flexible.

According to some embodiments of the present disclosure, the positioning element positioning portion 2-421 may be movably connected to the positioning element first movable part frame fixing end 2-422 through the positioning element first elastic portion 2-423. According to some embodiments of the present disclosure, the positioning element positioning portion 2-421 may be connected to the positioning element second movable part frame fixing end 2-424 through the positioning element second elastic portion 2-425.

According to some embodiments of the present disclosure, the positioning element positioning portion 2-421 may be in direct contact with the first supporting element 2-41.

As shown in FIG. 12, according to some embodiments of the present disclosure, there may be a gap between the movable part frame first surface 2-211 and the movable part frame second surface 2-212. According to some embodiments of the present disclosure, the first supporting element 2-41 may be disposed in the gap between the movable part frame first surface 2-211 and the movable part frame second surface 2-212.

According to some embodiments of the present disclosure, the movable part frame first surface 2-211 may be perpendicular to the second axis 2-AX2. According to some embodiments of the present disclosure, the movable part frame first surface 2-211 may be parallel to the first axis 2-AX1. According to some embodiments of the present disclosure, the movable part frame first surface 2-211 may be parallel to the third axis 2-AX3.

According to some embodiments of the present disclosure, the movable part frame second surface 2-212 may be perpendicular to the second axis 2-AX2. According to some embodiments of the present disclosure, the movable part frame second surface 2-212 may be parallel to the first axis 2-AX1. According to some embodiments of the present disclosure, the movable part frame second surface 2-212 may be parallel to the third axis 2-AX3.

According to some embodiments of the present disclosure, the movable part frame first surface 2-211 may at least partially overlap the positioning element 2-42 when viewed along the second axis 2-AX2. According to some embodiments of the present disclosure, the movable part frame second surface 2-212 may at least partially overlap the positioning element 2-42 when viewed along the second axis 2-AX2.

According to some embodiments of the present disclosure, the movable part frame first surface 2-211 may at least partially overlap the first supporting element 2-41 when viewed along the third axis 2-AX3. According to some embodiments of the present disclosure, the movable part frame second surface 2-212 may at least partially overlap the first supporting element 2-41 when viewed along the third axis 2-AX3.

In this way, the internal space of the optical element driving mechanism 2-100 may be effectively utilized, and the effect of miniaturizing the optical element driving mechanism 2-100 may be achieved.

According to some embodiments of the present disclosure, the movable part frame first surface 2-211 may not overlap the first supporting element 2-41 when viewed along the second axis 2-AX2. According to some embodiments of the present disclosure, the movable part frame second surface 2-212 may not overlap the first supporting element 2-41 when viewed along the second axis 2-AX2.

In this way, the undesired movement of the first supporting element 2-41 may be avoided; thereby the optical element driving mechanism 2-100 is more stable.

As shown in FIG. 12, according to some embodiments of the present disclosure, the first driving magnetic element 2-31 may not overlap the positioning element 2-42 when viewed along the second axis 2-AX2.

According to some embodiments of the present disclosure, the first driving coil 2-33 may not overlap the positioning element 2-42 when viewed along the second axis 2-AX2.

According to some embodiments of the present disclosure, the second driving magnetic element 2-32 may not overlap the positioning element 2-42 when viewed along the second axis 2-AX2.

According to some embodiments of the present disclosure, the second driving coil 2-34 may not overlap the positioning element 2-42 when viewed along the second axis 2-AX2.

That is, according to some embodiments of the present disclosure, the driving assembly 2-30 may not overlap the positioning element 2-42 when viewed along the second axis 2-AX2.

In this way, magnetic interference may be effectively avoided, thereby increasing the manipulation accuracy of the optical element driving mechanism 2-100.

Figure 13:
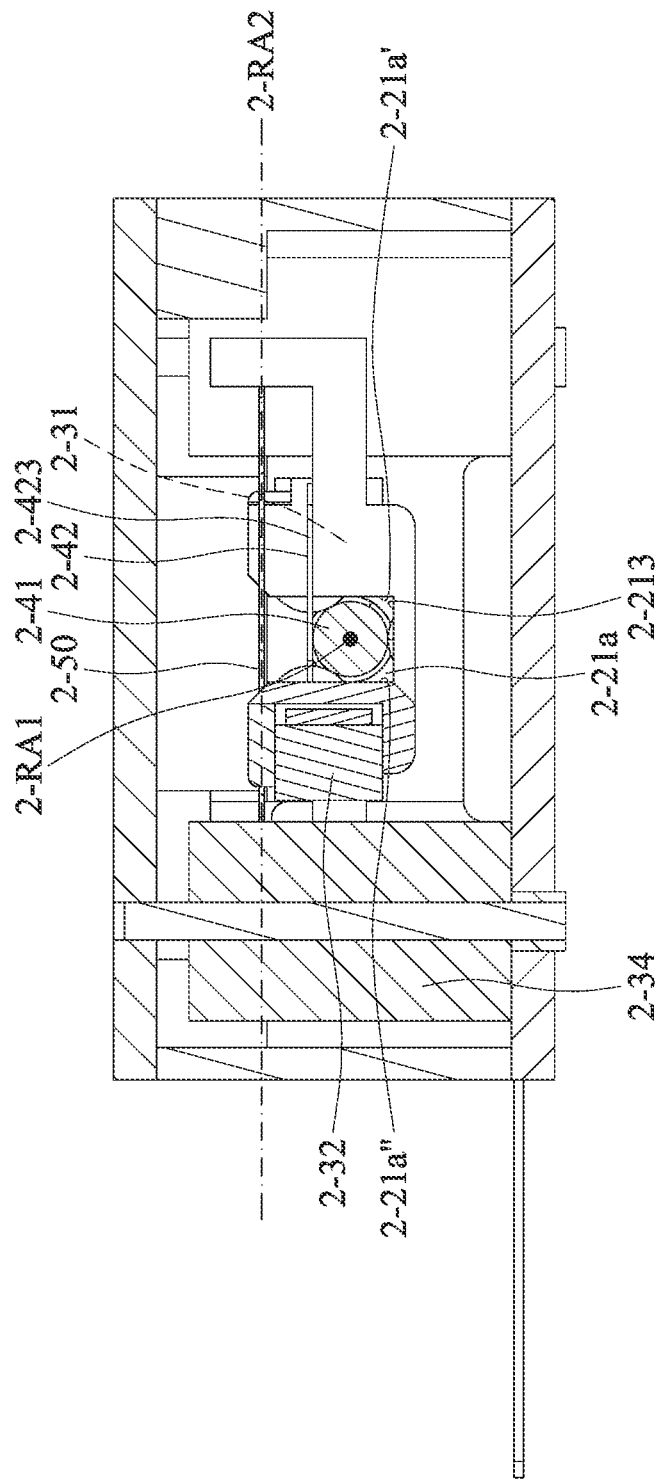
FIG. 13 is a cross-sectional view of the optical element driving mechanism along line 2-B-2-B' of FIG. 10, according to some embodiments of the present disclosure.
Figure 14:
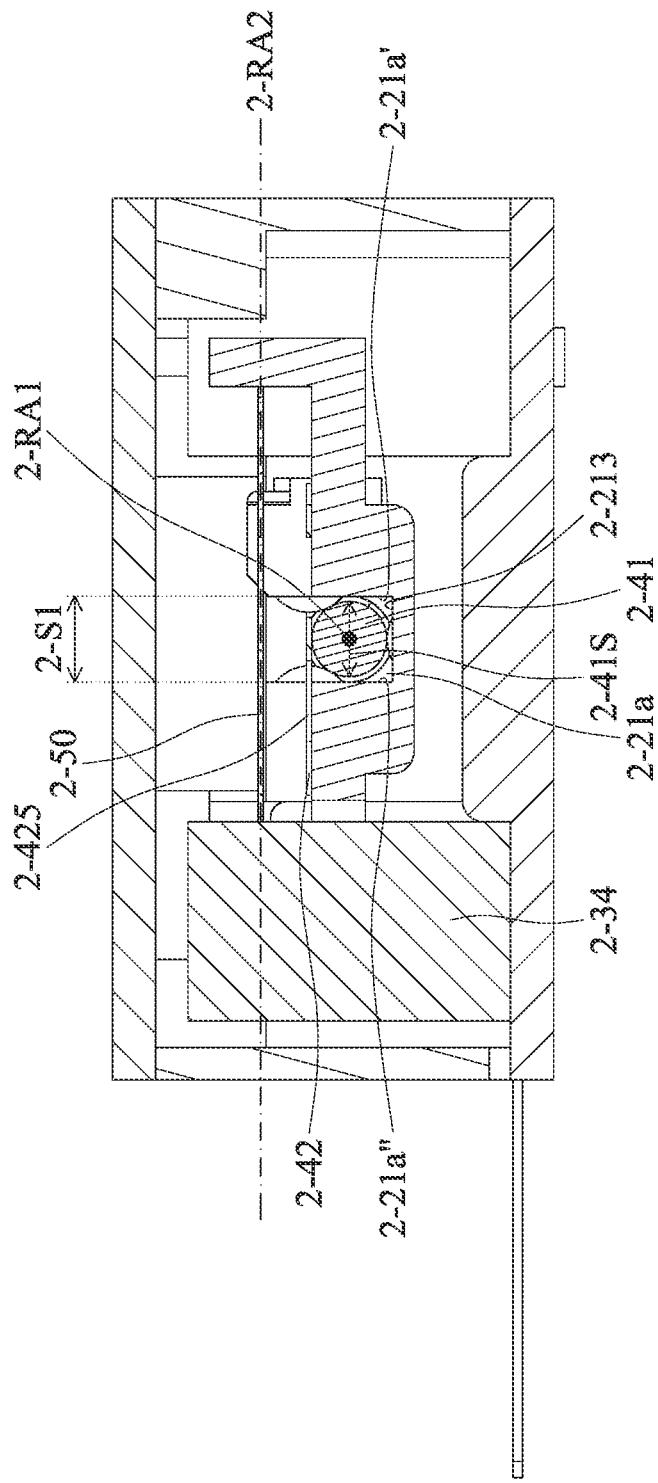
FIG. 14 is a cross-sectional view of the optical element driving mechanism along line 2-C-2-C' of FIG. 10, according to some embodiments of the present disclosure.

Please refer to FIG. 13 and FIG. 14, FIG. 13 is a cross-sectional view of the optical element driving mechanism 2-100 along line 2-B-2-B' of FIG. 10, according to some embodiments of the present disclosure; FIG. 14 is a cross-sectional view of the optical element driving mechanism 2-100 along line 2-C-2-C' of FIG. 10, according to some embodiments of the present disclosure.

According to some embodiments of the present disclosure, the driving assembly 2-30 may partially overlap the positioning element 2-42 when viewed along the first axis 2-AX1.

According to some embodiments of the present disclosure, the first driving magnetic element 2-31 may partially overlap the positioning element 2-42 when viewed along the first axis 2-AX1.

According to some embodiments of the present disclosure, the first driving magnetic element 2-31 may partially overlap the positioning element first elastic portion 2-423 when viewed along the first axis 2-AX1.

According to some embodiments of the present disclosure, the second driving magnetic element 2-32 may partially overlap the positioning element 2-42 when viewed along the first axis 2-AX1.

According to some embodiments of the present disclosure, the second driving magnetic element 2-32 may partially overlap the positioning element second elastic portion 2-425 when viewed along the first axis 2-AX1.

In this way, the internal space of the optical element driving mechanism 2-100 may be effectively utilized, and the effect of miniaturizing the optical element driving mechanism 2-100 may be achieved.

As shown in FIG. 14, the first supporting element 2-41 may at least partially overlap a movable part frame third surface 2-213 of the movable part frame 2-21 when viewed along the second axis 2-AX2.

The first supporting element 2-41 may be disposed in a movable part frame recess 2-21a of the movable part frame 2-21. The movable part frame recess 2-21a may include a movable part frame recess first surface 2-21a', and a movable part frame recess second surface 2-21a".

The first supporting element 2-41 may be disposed between the movable part frame recess first surface 2-21a and the movable part frame recess second surface 2-21a".

In this way, the undesired movement of the first supporting element 2-41 may be avoided; thereby the optical element driving mechanism 2-100 is more stable.

Please refer back to FIG. 12, according to some embodiments of the present disclosure, the first driving coil 2-33 may not overlap the positioning element 2-42 when viewed along the first axis 2-AX1.

According to some embodiments of the present disclosure, the first driving magnetic element 2-31 may not overlap the positioning element second elastic portion 2-425 when viewed along the first axis 2-AX1.

Please refer to FIG. 12, according to some embodiments of the present disclosure, the first driving coil 2-33 may not overlap the positioning element first elastic portion 2-423 when viewed along the first axis 2-AX1.

According to some embodiments of the present disclosure, the first driving coil 2-33 may not overlap the positioning element second elastic portion 2-425 when viewed along the first axis 2-AX1.

In this way, magnetic interference may be effectively avoided, thereby increasing the manipulation accuracy of the optical element driving mechanism 2-100.

According to some embodiments of the present disclosure, the second driving magnetic element 2-32 may not overlap the positioning element first elastic portion 2-423 when viewed along the first axis 2-AX1.

As shown in FIG. 12, according to some embodiments of the present disclosure, the second driving coil 2-34 may not overlap the positioning element first elastic portion 2-423 when viewed along the first axis 2-AX1.

According to some embodiments of the present disclosure, the second driving coil 2-34 may not overlap the positioning element second elastic portion 2-425 when viewed along the first axis 2-AX1.

According to some embodiments of the present disclosure, the second driving coil 2-34 may not overlap the positioning element 2-42 when viewed along the first axis 2-AX1.

Please refer to FIG. 12, according to some embodiments of the present disclosure, the first driving coil 2-33 may not overlap the positioning element first elastic portion 2-423 when viewed along the third axis 2-AX3.

According to some embodiments of the present disclosure, the first driving magnetic element 2-31 may not overlap the positioning element first elastic portion 2-423 when viewed along the third axis 2-AX3.

As shown in FIG. 12, according to some embodiments of the present disclosure, the second driving coil 2-34 may not overlap the positioning element second elastic portion 2-425 when viewed along the third axis 2-AX3.

According to some embodiments of the present disclosure, the second driving magnetic element 2-32 may not overlap the positioning element second elastic portion 2-425 when viewed along the third axis 2-AX3.

In this way, magnetic interference may be effectively avoided, thereby increasing the manipulation accuracy of the optical element driving mechanism 2-100.

Figure 15:
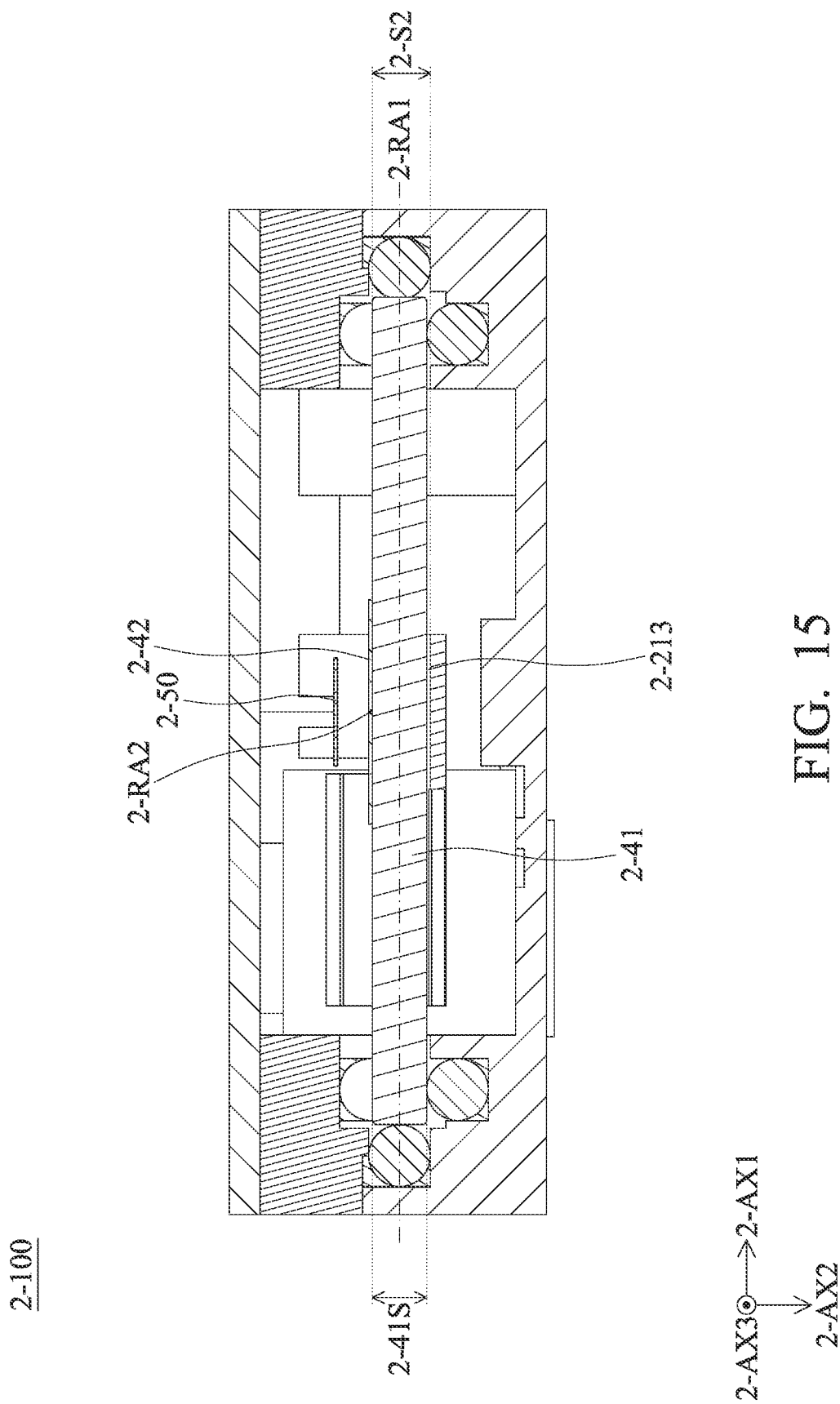
FIG. 15 is a cross-sectional view of the optical element driving mechanism along line 2-D-2-D' of FIG. 10, according to some embodiments of the present disclosure.
Figure 16:
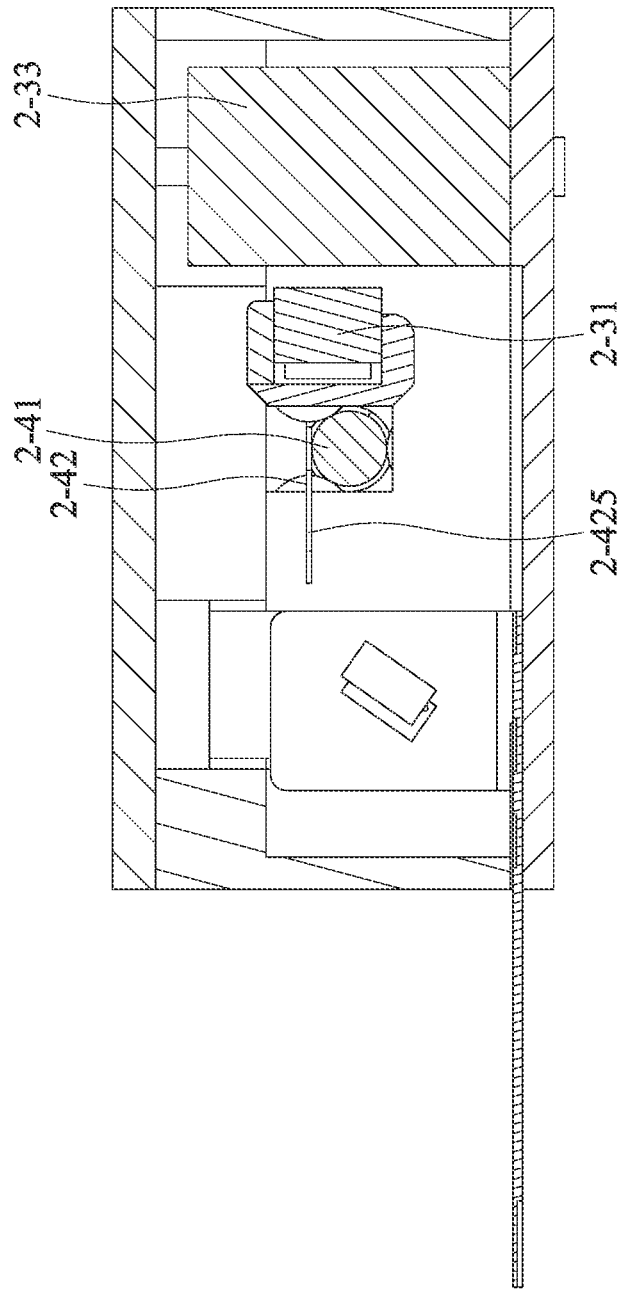
FIG. 16 is a cross-sectional view of the optical element driving mechanism along line 2-E-2-E' of FIG. 10, according to some embodiments of the present disclosure.

Please refer to FIG. 15 and FIG. 16, FIG. 15 is a cross-sectional view of the optical element driving mechanism 2-100 along line 2-D-2-D' of FIG. 10, according to some embodiments of the present disclosure; FIG. 16 is a cross-sectional view of the optical element driving mechanism 2-100 along line 2-E-2-E' of FIG. 10, according to some embodiments of the present disclosure.

As shown in FIG. 15 and FIG. 16, according to some embodiments of the present disclosure, in the third axis 2-AX3, the shortest distance 2-S1 between the movable part frame recess first surface 2-21a' and the movable part frame recess second surface 2-21a" may be 0.03 mm (millimeter)

to 0.1 mm greater than the maximum dimension 2-41S of the first supporting element 2-41.

According to some embodiments of the present disclosure, in the second axis 2-AX2, the shortest distance 2-S2 between the positioning element 2-42 and the movable part frame third surface 2-213 may be 0.03 mm to 0.1 mm greater than the maximum dimension 2-41S of the first supporting element 2-41.

In this way, the movement of the first supporting element 2-41 may be facilitated, so that the optical element driving mechanism 2-100 may be operated smoothly.

Please refer to FIG. 12, FIG. 13 and FIG. 16, according to some embodiments of the present disclosure, the driving assembly 2-30 may partially overlap the positioning element 2-42 when viewed along the third axis 2-AX3.

According to some embodiments of the present disclosure, the first driving magnetic element 2-31 may partially overlap the positioning element second elastic portion 2-425 when viewed along the third axis 2-AX3.

As shown in FIG. 12, FIG. 13 and FIG. 16, according to some embodiments of the present disclosure, the first driving coil 2-33 may partially overlap the positioning element second elastic portion 2-425 when viewed along the third axis 2-AX3.

According to some embodiments of the present disclosure, the second driving magnetic element 2-32 may partially overlap the positioning element first elastic portion 2-423 when viewed along the third axis 2-AX3.

Please refer to FIG. 12, FIG. 13 and FIG. 16, according to some embodiments of the present disclosure, the second driving coil 2-34 may partially overlap the positioning element first elastic portion 2-423 when viewed along the third axis 2-AX3.

In this way, the internal space of the optical element driving mechanism 2-100 may be effectively utilized; thereby achieving the effect of miniaturizing the optical element driving mechanism 2-100.

Figure 17:
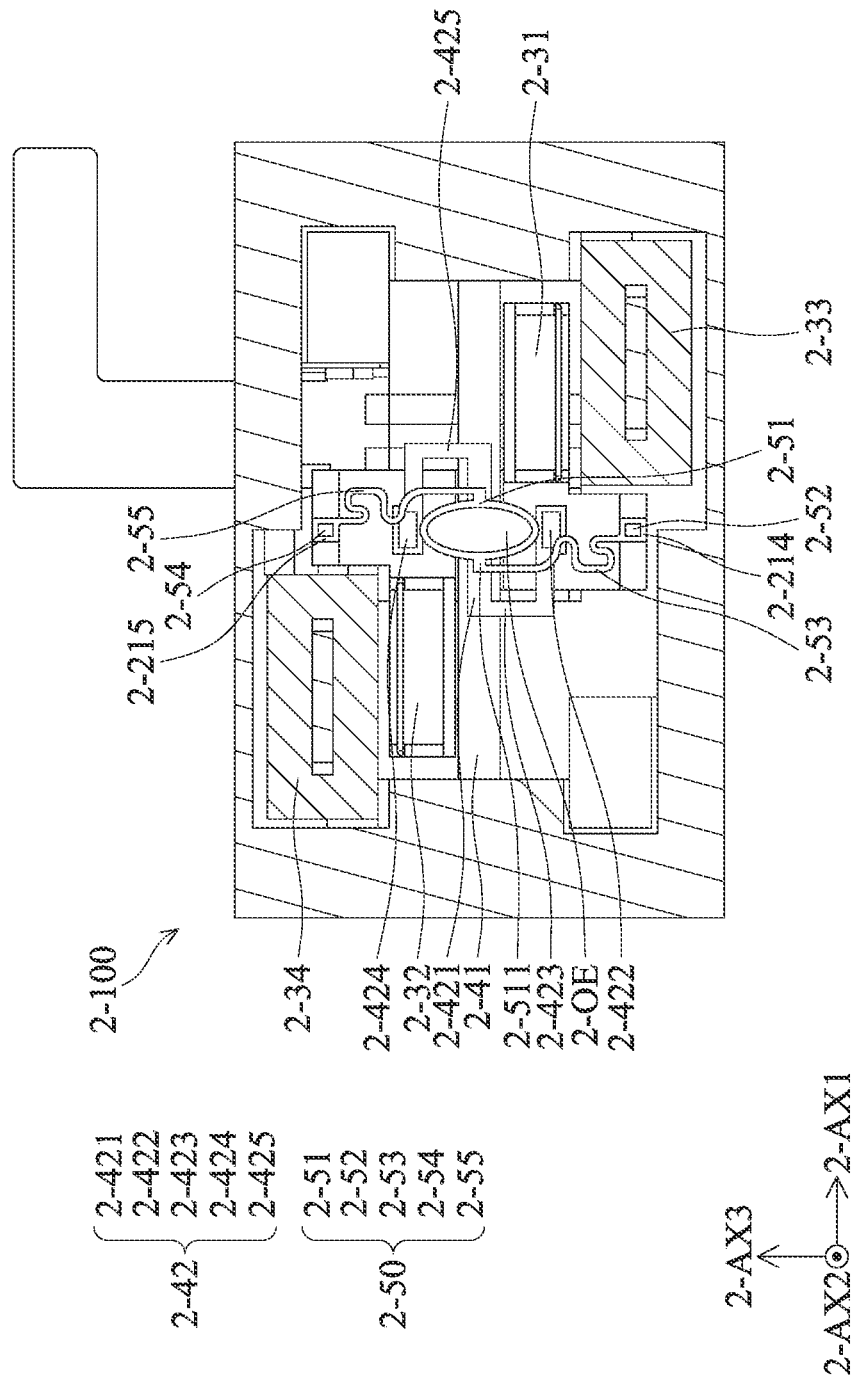
FIG. 17 is a cross-sectional view of the optical element driving mechanism along line 2-F-2-F' of FIG. 10, according to some embodiments of the present disclosure.
Figure 18:
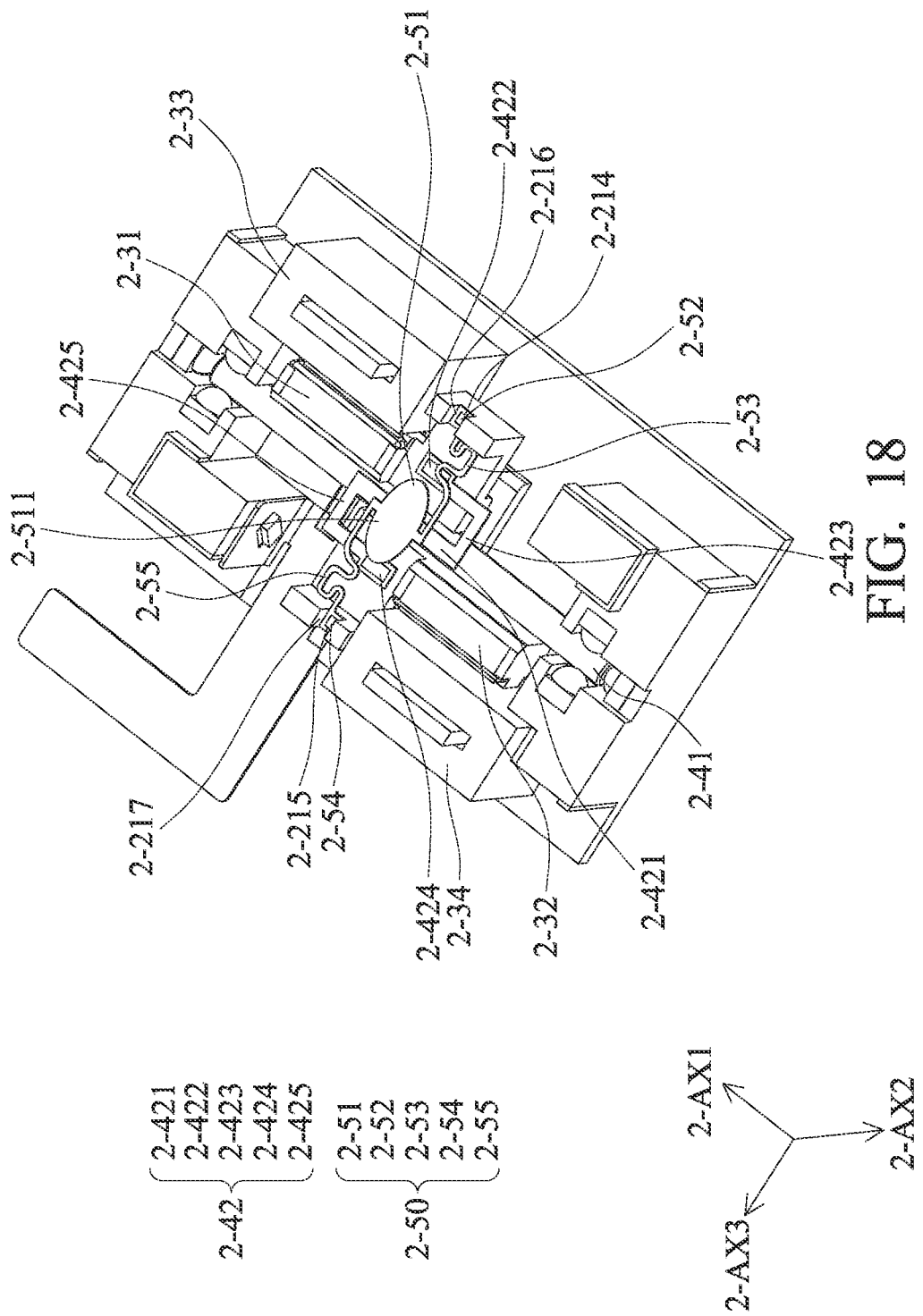
FIG. 18 is a schematic view of the optical element driving mechanism according to some embodiments of the present disclosure, wherein the outer frame is omitted.

Please refer to FIG. 17 and FIG. 18, FIG. 17 is a cross-sectional view of the optical element driving mechanism 2-100 along line 2-F-2-F' of FIG. 10, according to some embodiments of the present disclosure; FIG. 18 is a schematic view of the optical element driving mechanism 2-100 according to some embodiments of the present disclosure, wherein the outer frame 2-11 is omitted.

According to some embodiments of the present disclosure, the optical element 2-OE may move relative to the movable part frame 2-21 through the second supporting assembly 2-50.

As shown in FIG. 17 and FIG. 18, the second supporting assembly 2-50 may include a second supporting assembly setting portion 2-51, a second supporting assembly first movable part frame fixing end 2-52, a second supporting assembly first elastic portion 2-53, a second supporting assembly second movable part frame fixing end 2-54, and a second supporting assembly second elastic portion 2-55.

According to some embodiments of the present disclosure, the second supporting assembly setting portion 2-51 may be used for placing the optical element 2-OE. That is, the optical element 2-OE may be fixed to the second supporting assembly setting portion 2-51.

The second supporting assembly first movable part frame fixing end 2-52 may be fixedly connected to a movable part frame fourth surface 2-214 of the movable part frame 2-21 of the movable part 2-20.

According to some embodiments of the present disclosure, the second supporting assembly first elastic portion 2-53 may be flexible. The second supporting assembly setting portion 2-51 may be movably connected to the second supporting assembly first movable part frame fixing end 2-52 through the second supporting assembly first elastic portion 2-53.

Please refer to FIG. 17 and FIG. 18, the second supporting assembly second movable part frame fixing end 2-54 may be fixedly connected to a movable part frame fifth surface 2-215 of the movable part frame 2-21.

According to some embodiments of the present disclosure, the second supporting assembly second elastic portion 2-55 may be flexible. The second supporting assembly setting portion 2-51 may be movably connected to the second supporting assembly second movable part frame fixing end 2-54 through the second supporting assembly second elastic portion 2-55.

In this way, the movement of the second supporting assembly 2-50 may be facilitated, so that the optical element driving mechanism 2-100 may be operated smoothly.

As shown in FIG. 17 and FIG. 18, according to some embodiments of the present disclosure, the movable part frame fourth surface 2-214 may be located in a movable part frame first recessed portion 2-216 of the movable part frame 2-21, and the movable part frame first recessed portion 2-216 may have a recessed structure.

According to some embodiments of the present disclosure, the movable part frame fifth surface 2-215 may be located in a movable part frame second recessed portion 2-217 of the movable part frame 2-21, and the movable part frame second recessed portion 2-217 may have recessed structure.

In this way, the undesired movement of the second supporting assembly 2-50 may be avoided, thereby the optical element driving mechanism 2-100 is more stable.

Please refer to FIG. 17 and FIG. 18, according to some embodiments of the present disclosure, the second supporting assembly first movable part frame fixing end 2-52 and the second supporting assembly second movable part frame fixing end 2-54 may be arranged along the third axis 2-AX3 when viewed along the second axis 2-AX2.

In this way, the undesired movement of the second supporting assembly 2-50 may be avoided, thereby the optical element driving mechanism 2-100 is more stable.

According to some embodiments of the present disclosure, the positioning element first movable part frame fixing end 2-422 and the positioning element second movable part frame fixing end 2-424 may be arranged along the third axis 2-AX3 when viewed along the second axis 2-AX2.

In this way, the internal space of the optical element driving mechanism 2-100 may be effectively utilized, and the effect of miniaturizing the optical element driving mechanism 2-100 may be achieved.

According to some embodiments of the present disclosure, the second supporting assembly 2-50 may not have a mirror-symmetric structure when viewed along the second axis 2-AX2.

In this way, the undesired movement of the second supporting assembly 2-50 may be avoided, thereby the optical element driving mechanism 2-100 is more stable.

Please refer to FIG. 13, FIG. 14 and FIG. 15, according to some embodiments of the present disclosure, the positioning element 2-42 may not overlap the second supporting assembly 2-50 when viewed along the first axis 2-AX1. According to some embodiments of the present disclosure, the positioning element 2-42 may not overlap the second supporting assembly 2-50 when viewed along the third axis 2-AX3.

According to some embodiments of the present disclosure, the positioning element 2-42 may be located between the first supporting element 2-41 and the second supporting assembly 2-50 when viewed along the first axis 2-AX1. According to some embodiments of the present disclosure, the positioning element 2-42 may be located between the first supporting element 2-41 and the second supporting assembly 2-50 when viewed along the third axis 2-AX3.

As shown in FIG. 13, FIG. 14 and FIG. 15, the second supporting assembly 2-50 may not overlap the first supporting element 2-41 when viewed along the first axis 2-AX1. According to some embodiments of the present disclosure, the second supporting assembly 2-50 and the first supporting element 2-41 may not overlap when viewed along the third axis 2-AX3.

In this way, the undesired movement of the first supporting element 2-41 and the second supporting assembly 2-50 may be avoided, thereby the optical element driving mechanism 2-100 is more stable.

Please refer to FIG. 17, according to some embodiments of the present disclosure, the positioning element 2-42 may partially overlap the second supporting assembly 2-50 when viewed along the second axis 2-AX2.

According to some embodiments of the present disclosure, the positioning element first elastic portion 2-423 may partially overlap the second supporting assembly first elastic portion 2-53 when viewed along the second axis 2-AX2.

According to some embodiments of the present disclosure, the positioning element second elastic portion 2-425 may partially overlap the second supporting assembly second elastic portion 2-55 when viewed along the second axis 2-AX2.

In this way, the internal space of the optical element driving mechanism 2-100 may be effectively utilized, and the effect of miniaturizing the optical element driving mechanism 2-100 may be achieved.

As shown in FIG. 17, according to some embodiments of the present disclosure, the second supporting assembly setting portion 2-51 may overlap the first supporting element 2-41 when viewed along the second axis 2-AX2.

According to some embodiments of the present disclosure, the second supporting assembly setting portion 2-51 may overlap the positioning element positioning portion 2-421 when viewed along the second axis 2-AX2.

In this way, the internal space of the optical element driving mechanism 2-100 may be effectively utilized, and the effect of miniaturizing the optical element driving mechanism 2-100 may be achieved.

Please refer to FIG. 13, FIG. 14 and FIG. 15, according to some embodiments of the present disclosure, the second supporting assembly 2-50 may partially overlap the driving element 2-30 when viewed along the first axis 2-AX1.

According to some embodiments of the present disclosure, the second supporting assembly 2-50 may not overlap the first driving magnetic element 2-31 when viewed along the first axis 2-AX1.

According to some embodiments of the present disclosure, the second supporting assembly 2-50 may not overlap the first driving magnetic element 2-31 when viewed along the third axis 2-AX3.

According to some embodiments of the present disclosure, the second supporting assembly 2-50 may not overlap the first driving magnetic element 2-31 when viewed along any direction that is perpendicular to the second axis 2-AX2.

In this way, magnetic interference may be effectively avoided, thereby increasing the manipulation accuracy of the optical element driving mechanism 2-100.

According to some embodiments of the present disclosure, the second supporting assembly 2-50 may partially overlap the first driving coil 2-33 when viewed along the first axis 2-AX1.

In this way, the internal space of the optical element driving mechanism 2-100 may be effectively utilized, and the effect of miniaturizing the optical element driving mechanism 2-100 may be achieved.

Please refer to FIG. 17 and FIG. 18, according to some embodiments of the present disclosure, the second supporting assembly setting portion 2-51 may have an elongated structure when viewed along the second axis 2-AX2.

According to some embodiments of the present disclosure, the optical element 2-OE may have an elongated structure when viewed along the second axis 2-AX2.

According to some embodiments of the present disclosure, the second supporting assembly setting portion 2-51 may extend along the first axis 2-AX1 when viewed along the second axis 2-AX2.

According to some embodiments of the present disclosure, the second supporting assembly setting portion 2-51 may extend along the third axis 2-AX3 when viewed along the second axis 2-AX2.

According to some embodiments of the present disclosure, the second supporting assembly 2-50 may include a metal material. According to some embodiments of the present disclosure, the second supporting assembly 2-50 may include a material with low magnetic-permeability. For example, the second supporting assembly 2-50 may include metals with low magnetic-permeability such as titanium and copper.

According to some embodiments of the present disclosure, the optical element 2-OE may be a reflective structure. According to some embodiments of the present disclosure, the reflective structure of the optical element 2-OE may be used to reflect an electromagnetic wave. For example, the aforementioned electromagnetic waves may be visible light or invisible light.

According to some embodiments of the present disclosure, the second supporting assembly setting portion 2-51 may have a second supporting assembly setting portion surface 2-511 corresponding to the optical element 2-OE. According to some embodiments of the present disclosure, the reflective structure of the optical element 2-OE may be directly formed on the second supporting assembly setting portion surface 2-511.

According to some embodiments of the present disclosure, the optical element 2-OE and the second supporting assembly setting portion 2-51 may be integrated into one piece. According to some embodiments of the present disclosure, the optical element 2-OE may also be an additional mirror or a prism.

According to some embodiments of the present disclosure, the roughness of the second supporting assembly setting portion surface 2-511 may be different from the surface roughness of the second supporting assembly first elastic portion 2-53.

According to some embodiments of the present disclosure, the roughness of the second supporting assembly setting portion surface 2-511 may be lower than the surface roughness of the second supporting assembly first elastic portion 2-53.

According to some embodiments of the present disclosure, the roughness of the second supporting assembly setting portion surface 2-511 may be different from the surface roughness of the second supporting assembly first movable part frame fixing end 2-52.

According to some embodiments of the present disclosure, the roughness of the second supporting assembly setting portion surface 2-511 may be lower than the second supporting assembly first movable part frame fixing end 2-52.

In this way, it is helpful to form the optical element 2-OE on the second supporting assembly setting portion surface 2-511, thereby the combination of the optical element driving mechanism 2-100 and the optical element 2-OE is more stable.

According to some embodiments of the present disclosure, the second supporting assembly setting portion 2-51 may have a first resonance frequency relative to the movable part frame 2-21. According to some embodiments of the present disclosure, the movable part frame 2-21 may have a second resonance frequency relative to the fixed part 2-10. According to some embodiments of the present disclosure, the first resonance frequency may be different from the second resonance frequency.

Please refer to FIG. 17, according to some embodiments of the present disclosure, the positioning element positioning portion 2-421 may be fixedly connected to the first supporting element 2-41. According to some embodiments of the present disclosure, the positioning element 2-42 may have a plate-like structure.

According to some embodiments of the present disclosure, the second supporting assembly 2-50 may have a plate-like structure. According to some embodiments of the present disclosure, the positioning element 2-42 may be parallel to the second supporting assembly 2-50.

According to some embodiments of the present disclosure, the driving assembly 2-30 may be used to drive the optical element 2-OE to move relative to the movable part frame 2-21 in a second dimension 2-D2. According to some embodiments of the present disclosure, the second dimension 2-D2 may be different from the first dimension 2-D1.

According to some embodiments of the present disclosure, the second dimension 2-D2 may a rotation about a second rotation axis 2-RA2, and the second rotation axis 2-RA2 may not be parallel to the first rotation axis 2-RA1.

According to some embodiments of the present disclosure, the second rotation axis 2-RA2 may be parallel to the third axis 2-AX3.

As shown in FIG. 13, FIG. 14 and FIG. 15, according to some embodiments of the present disclosure, the second rotation axis 2-RA2 may not overlap the first rotation axis 2-RA1, and there may be a gap between the second rotation axis 2-RA2 and the first rotation axis 2-RA1.

According to some embodiments of the present disclosure, the second rotation axis 2-RA2 may not overlap the first rotation axis 2-RA1 when viewed along the first axis 2-AX1.

According to some embodiments of the present disclosure, the second rotation axis 2-RA2 may not overlap the first rotation axis 2-RA1 when viewed along the third axis 2-AX3.

According to some embodiments of the present disclosure, the second rotation axis 2-RA2 may not overlap the first rotation axis 2-RA1 when viewed along any direction that is perpendicular to the second axis 2-AX2.

In this way, the undesired movement of the first supporting element 2-41 and the second supporting assembly 2-50 may be avoided, thereby the optical element driving mechanism 2-100 is more stable.

In general, the driving assembly, the first supporting assembly, and the second supporting assembly of the optical element driving mechanism of the embodiments of the present disclosure may miniaturize the optical element driving mechanism, make the optical element driving mechanism more stable, and increase the manipulation accuracy of the optical element driving mechanism, so that the optical element driving mechanism may be operated smoothly.

Embodiment Group 3

Figure 19:
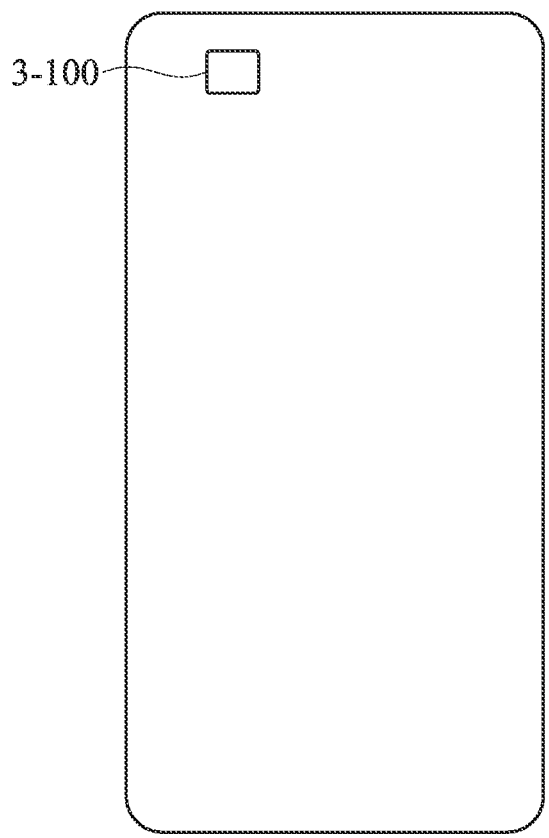
FIG. 19 is a schematic view of an electrical device according to some embodiment of the present disclosure.

Firstly, please refer to FIG. 19, FIG. 19 is a schematic view of an electrical device 3-1 according to some embodiment of the present disclosure. As shown in FIG. 19, an optical element driving mechanism 3-100 of some embodiment of the present disclosure may be mounted in an electrical device 3-1 for taking photos or videos, wherein the aforementioned electrical device 3-1 may, for example, be a smartphone or a digital camera, but the present disclosure is not limited to these. It should be noted that the position and the size between the optical element driving mechanism 3-100 and the electrical device 3-1 shown in FIG. 19 are only an example, which is not for limiting the position and the size between the optical element driving mechanism 3-100 and the electrical device 3-1. In fact, according to different needs, the optical element driving mechanism 3-100 may be mounted at different positions in the electrical device 3-1.

Figure 20:
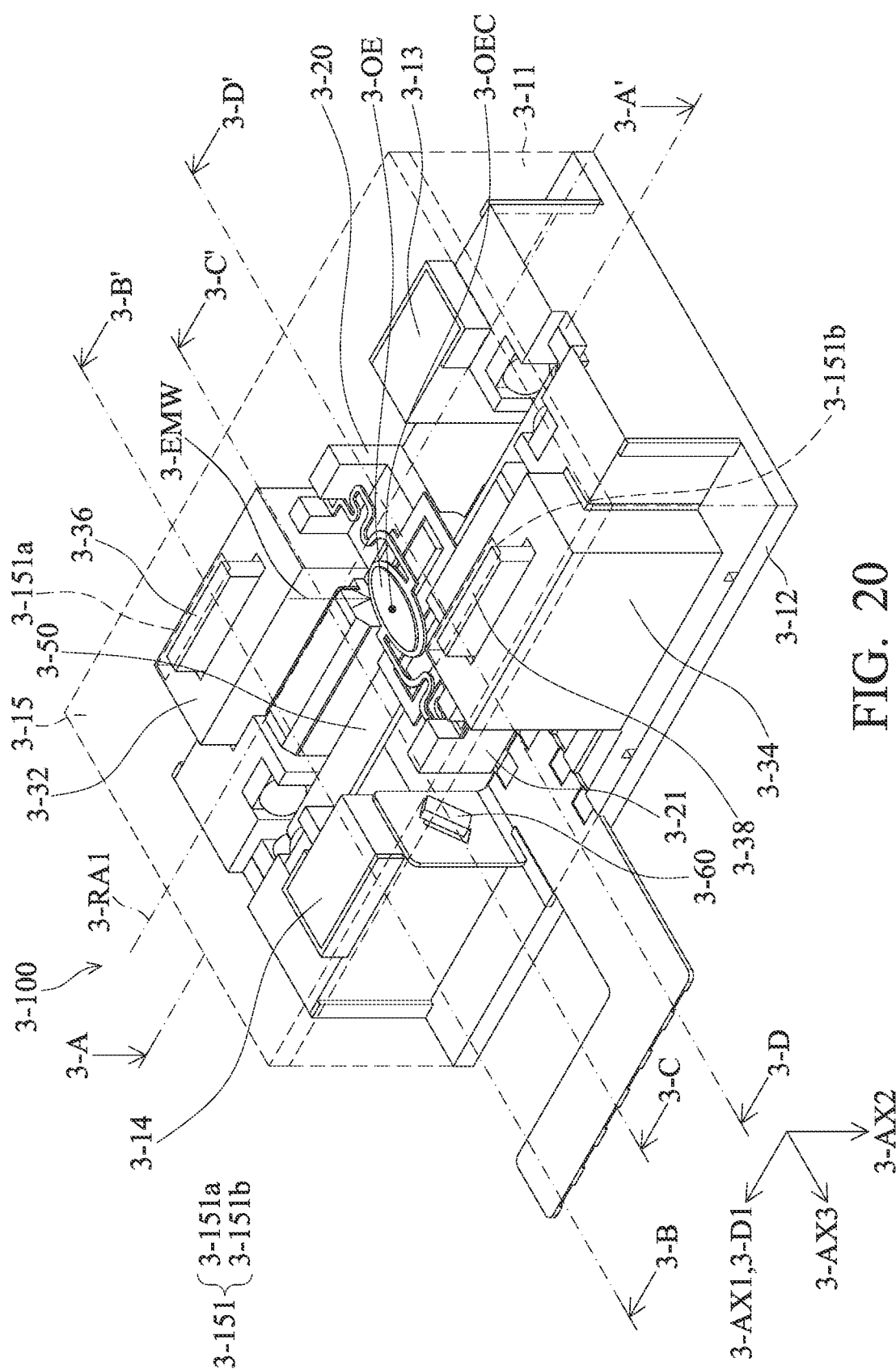
FIG. 20 is a schematic view of an optical element driving mechanism and an optical element according to some embodiments of the present disclosure, wherein an outer frame is shown as a dashed line.
Figure 21:
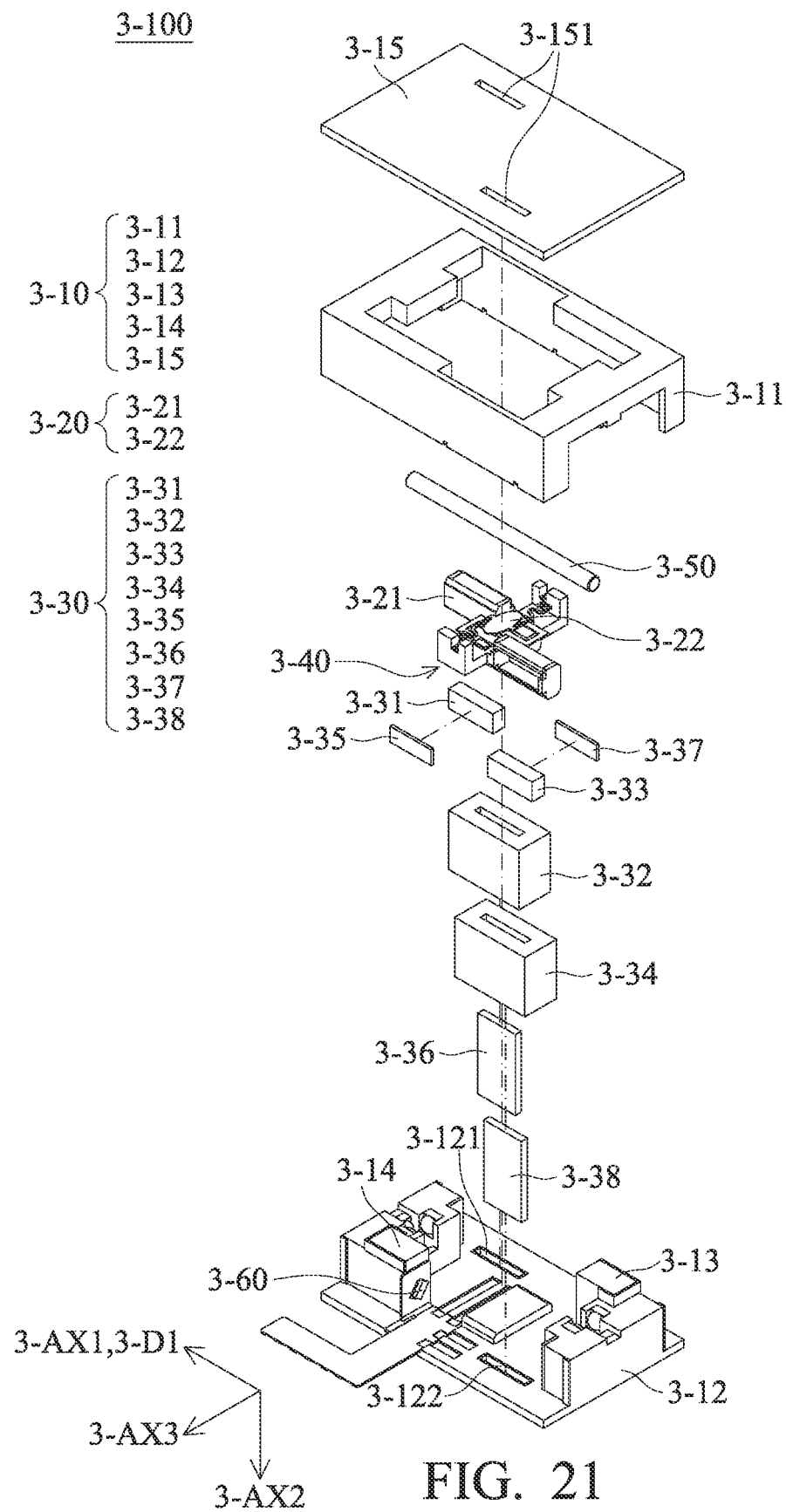
FIG. 21 is an exploded view of the optical element driving mechanism according to some embodiments of the present disclosure.

Please refer to FIG. 20. FIG. 20 is a schematic view of the optical element driving mechanism 3-100 and an optical element 3-OE according to some embodiments of the present disclosure, wherein the outer frame is shown as a dashed line. FIG. 21 is an exploded view of the optical element driving mechanism 3-100 according to some embodiments of the present disclosure.

As shown in FIG. 20 and FIG. 21, the optical element driving mechanism 3-100 may include a fixed part 3-10, a movable part 3-20, a driving assembly 3-30, a stopping assembly 3-40, a first supporting assembly 3-50, a first sensing assembly 3-60, and a connecting element 3-70.

The movable part 3-20 may move relative to the fixed part 3-10, and the driving assembly 3-30 may drive the movable part 3-20 to move relative to the fixed part 3-10. The movable part 3-20 may connect to an optical element 3-OE, and the movable part 3-20 may move relative to the fixed part 3-10 through the support of the first supporting assembly 3-50.

According to some embodiments of the present disclosure, the first supporting assembly 3-50 may be at least partially located between the movable part 3-20 and the fixed part 3-10. According to some embodiments of the present disclosure, the driving assembly 3-30 may be used to drive the movable part 3-20 to move in a first dimension 3-D1.

According to some embodiments of the present disclosure, the stopping assembly 3-40 may be used to limit the range of motion of the movable part 3-20 relative to the fixed part 3-10. According to some embodiments of the present disclosure, the first sensing assembly 3-60 may be used to sense the movement of the movable part 3-20 relative to the fixed part 3-10. According to some embodiments of the present disclosure, the connecting element 3-70 may be used to connect elements of the optical element driving mechanism 3-100.

The fixed part 3-10 may include an outer frame 3-11, a base 3-12, a first positioning structure 3-13, a second positioning structure 3-14, and a protective element 3-15. The outer frame 3-11 may be disposed on the base 3-12 to form an internal space to accommodate the elements of the optical element driving mechanism 3-100.

According to some embodiments of the present disclosure, the fixed part 3-10 may have an accommodating space (such as the aforementioned internal space) for accommodating the optical element 3-OE.

According to some embodiments of the present disclosure, the accommodating space may be used for accommodating the driving assembly 3-30. According to some embodiments of the present disclosure, the accommodating space may be used to accommodate the first supporting assembly 3-50.

The outer frame 3-11 may have an opening 3-111, and the opening 3-111 may correspond to the optical element 3-OE, so that an electromagnetic wave 3-EMW is incident to the optical element 3-OE. For example, according to some embodiments of the present disclosure, the electromagnetic wave 3-EMW may be visible light, infrared light, ultraviolet light, and the like.

The base 3-12 may include a first coil magnetic conductive element accommodating portion 3-121 and a second coil magnetic conductive element accommodating portion 3-122.

The protective element 3-15 may be fixedly connected to the outer frame 3-11. According to some embodiments of the present disclosure, the optical element 3-OE may be located between the protective element 3-15 and the base 3-12 when viewed along the first axis 3-AX1.

According to some embodiments of the present disclosure, the protective element 3-15 may cover the opening 3-111. According to some embodiments of the present disclosure, the electromagnetic wave 3-EMW may pass through the protective element 3-15, and the electromagnetic wave 3-EMW may be incident to the optical element 3-OE. That is, the protective element 3-15 does not block the electromagnetic wave 3-EMW.

According to some embodiments of the present disclosure, the protective element 3-15 may be used to position the driving assembly 3-30. According to some embodiments of the present disclosure, the protective element 3-15 may have a protective element recessed structure 3-151 that is corresponding to the driving assembly 3-30.

The movable part 3-20 may include a movable part frame 3-21, and a movable part setting surface 3-22. According to some embodiments of the present disclosure, the movable part setting surface 3-22 may be parallel to the first axis 3-AX1. According to some embodiments of the present disclosure, the movable part setting surface 3-22 may be perpendicular to the second axis 3-AX2. According to some embodiments of the present disclosure, the movable part setting surface 3-22 may be parallel to the third axis 3-AX3.

According to some embodiments of the present disclosure, the first axis 3-AX1 may be perpendicular to the second axis 3-AX2. According to some embodiments of the present disclosure, the first axis 3-AX1 may be perpendicular to the third axis 3-AX3. According to some embodiments of the present disclosure, the second axis 3-AX2 may be perpendicular to the third axis 3-AX3.

According to some embodiments of the present disclosure, the optical element driving mechanism 3-100 has an elongated structure, and the optical element driving mechanism 3-100 extends along the first axis 3-AX1 when viewed along the second axis 3-AX2.

According to some embodiments of the present disclosure, the first dimension 3-D1 may a rotation about a first rotation axis 3-RA1. According to some embodiments of the present disclosure, the first rotation axis 3-RA1 may be parallel to the first axis 3-AX1.

The driving assembly 3-30 may include a first magnetic element 3-31, a first coil 3-32, a second magnetic element 3-33, a second coil 3-34, and a first magnetic element magnetic conductive element 3-35, a first coil magnetic conductive element 3-36, a second magnetic element magnetic conductive element 3-37, and a second coil magnetic conductive element 3-38.

Figure 25:
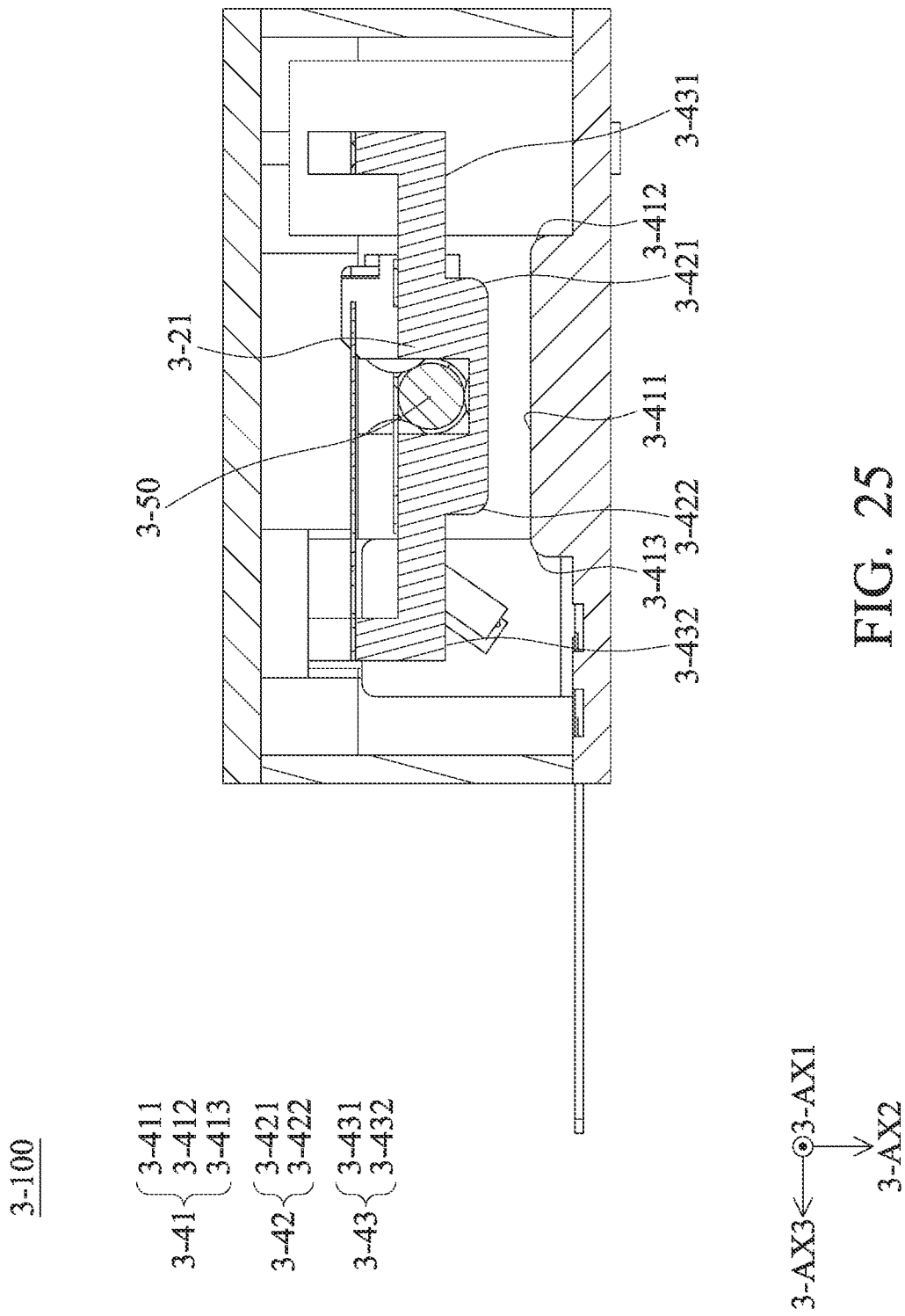
FIG. 25 is a cross-sectional view of the optical element driving mechanism along line 3-C-3-C' of FIG. 20, according to some embodiments of the present disclosure.

The stopping assembly 3-40 may include a first stopping structure 3-41, a second stopping structure 3-42, and a third stopping structure 3-43 (please refer to FIG. 25).

Figure 22:
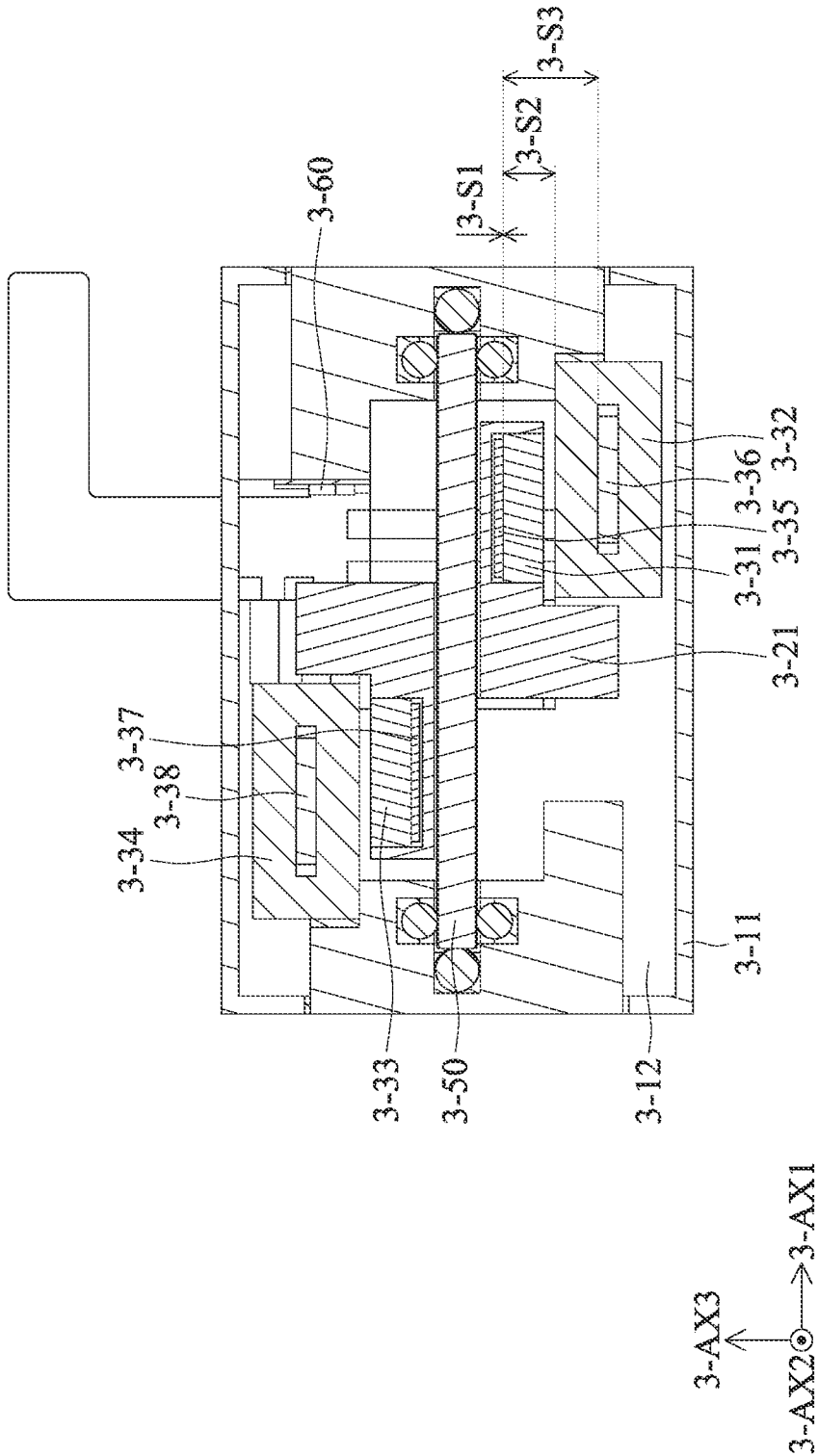
FIG. 22 is a cross-sectional view of the optical element driving mechanism along line 3-A-3-A' of FIG. 20, according to some embodiments of the present disclosure.

Please refer to FIG. 22, FIG. 22 is a cross-sectional view of the optical element driving mechanism 3-100 along line 3-A-3-A' of FIG. 20, according to some embodiments of the present disclosure.

As shown in FIG. 22, according to some embodiments of the present disclosure, the first coil 3-32 may correspond to the first magnetic element 3-31. For example, the first coil 3-32 may be disposed adjacent to the first magnetic element 3-31.

According to some embodiments of the present disclosure, the first magnetic element magnetic conductive element 3-35 may have a magnetic conductive material. According to some embodiments of the present disclosure, the first magnetic element magnetic conductive element 3-35 may correspond to the first magnetic element 3-31. For example, the first magnetic element magnetic conductive element 3-35 may be disposed adjacent to the first magnetic element 3-31.

Please refer to FIG. 22, according to some embodiments of the present disclosure, the first coil magnetic conductive element 3-36 may have a magnetic conductive material. According to some embodiments of the present disclosure, the first coil magnetic conductive element 3-36 may correspond to the first coil 3-32.

According to some embodiments of the present disclosure, the shortest distance 3-S1 (which may be 0) between the first magnetic element magnetic conductive element 3-35 and the first magnetic element 3-31 may be shorter than the shortest distance 3-S2 between the first magnetic element magnetic conductive element 3-35 and the first coil 3-32.

As shown in FIG. 22, according to some embodiments of the present disclosure, the shortest distance 3-S3 between the first coil magnetic conductive element 3-36 and the first magnetic element 3-31 may be greater than the shortest distance 3-S2 between the first magnetic element magnetic conductive element 3-35 and the first coil 3-32.

According to some embodiments of the present disclosure, the first magnetic element 3-31 may be located between the first magnetic element magnetic conductive element 3-35 and the first coil magnetic conductive element 3-36 when viewed along the second axis 3-AX2.

Please refer to FIG. 22, according to some embodiments of the present disclosure, the first coil 3-32 may be wound around the first coil magnetic conductive element 3-36. According to some embodiments of the present disclosure, the winding axis of the first coil 3-32 may be parallel to the second axis 3-AX2.

According to some embodiments of the present disclosure, the first magnetic element 3-31 may be fixedly disposed on the movable part frame 3-21 of the movable part 3-20. According to some embodiments of the present disclosure, the first magnetic element magnetic conductive element 3-35 may be fixedly disposed on the movable part frame 3-21.

As shown in FIG. 22, according to some embodiments of the present disclosure, the first magnetic element magnetic conductive element 3-35 may be located between the first magnetic element 3-31 and the movable part frame 3-21.

In this way, the driving force of the driving assembly 3-30 may be effectively enhanced, and the effect of miniaturizing the optical element driving mechanism 3-100 may also be achieved.

Figure 23:
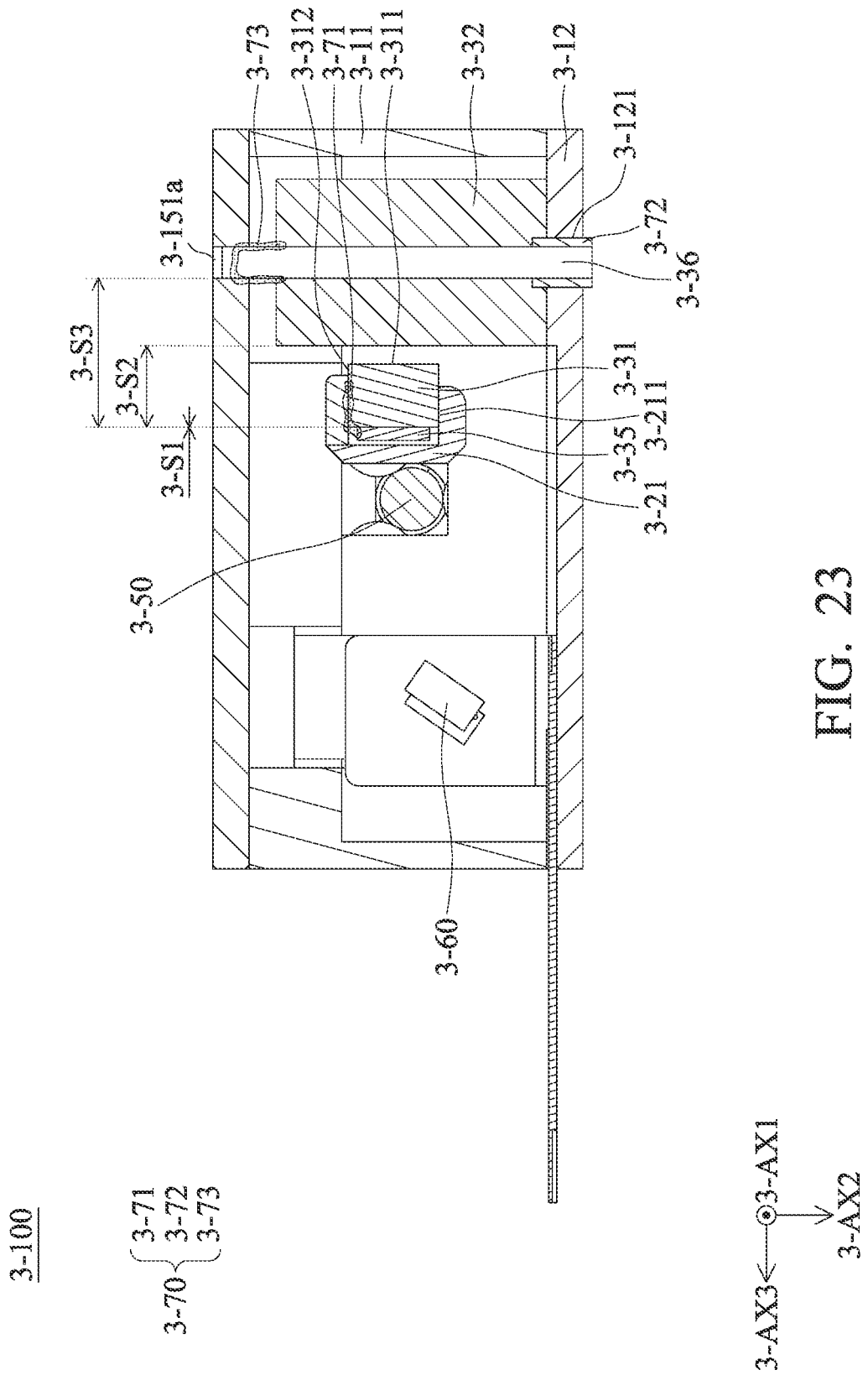
FIG. 23 is a cross-sectional view of the optical element driving mechanism along line 3-B-3-B' of FIG. 20, according to some embodiments of the present disclosure.

Please refer to FIG. 22 and FIG. 23, wherein FIG. 23 is a cross-sectional view of the optical element driving mechanism 3-100 along line 3-B-3-B' of FIG. 20, according to some embodiments of the present disclosure.

As shown in FIG. 22 and FIG. 23, according to some embodiments of the present disclosure, the first coil 3-32 may be fixedly disposed on the fixed part 3-10. According to some embodiments of the present disclosure, the first coil 3-32 may be fixedly disposed on the base 3-12 of the fixed part 3-10.

The first magnetic element 3-31 may include a first magnetic element first surface 3-311, and a first magnetic element second surface 3-312.

According to some embodiments of the present disclosure, the first magnetic element first surface 3-311 may face the first coil 3-32.

According to some embodiments of the present disclosure, the connecting element 3-70 may include a first connecting element 3-71.

As shown in FIG. 22 and FIG. 23, according to some embodiments of the present disclosure, the first magnetic element 3-31 may be fixedly connected to the movable part frame 3-21 via the first connecting element 3-71.

According to some embodiments of the present disclosure, the first connecting element 3-71 may be in direct contact with the first magnetic element 3-31.

According to some embodiments of the present disclosure, the first connecting element 3-71 may be in direct contact with the first magnetic element second surface 3-312.

Please refer to FIG. 22 and FIG. 23, according to some embodiments of the present disclosure, the first magnetic element second surface 3-312 may not be parallel to the first magnetic element first surface 3-311.

According to some embodiments of the present disclosure, the first magnetic element second surface 3-312 may be perpendicular to the first magnetic element first surface 3-311.

According to some embodiments of the present disclosure, the first magnetic element first surface 3-311 may be perpendicular to the third axis 3-AX3.

According to some embodiments of the present disclosure, the first magnetic element second surface 3-312 may be perpendicular to the second axis 3-AX2.

As shown in FIG. 22 and FIG. 23, according to some embodiments of the present disclosure, the first magnetic element first surface 3-311 and the first magnetic element second surface 3-312 may be parallel to the first axis 3-AX1.

According to some embodiments of the present disclosure, the first connecting element 3-71 may be in direct contact with the movable part frame 3-21.

According to some embodiments of the present disclosure, the first connecting element 3-71 may be in direct contact with the first magnetic element magnetic conductive element 3-35.

In this way, the driving force of the driving assembly 3-30 may be effectively enhanced, and any unwanted movement of the driving assembly 3-30 may be avoided, thereby making the optical element driving mechanism 3-100 more stable.

Please refer to FIG. 22 and FIG. 23, according to some embodiments of the present disclosure, the movable part frame 3-21 may include a first magnetic element accommodating portion 3-211. The first magnetic element accommodating portion 3-211 may correspond to the first magnetic element 3-31.

According to some embodiments of the present disclosure, the first magnetic element second surface 3-312 may be at least partially exposed to the movable part frame 3-21 when viewed along the second axis 3-AX2.

According to some embodiments of the present disclosure, the first magnetic element magnetic conductive element 3-35 may be at least partially exposed on the movable part frame 3-21 when viewed along the second axis 3-AX2.

Figure 24:
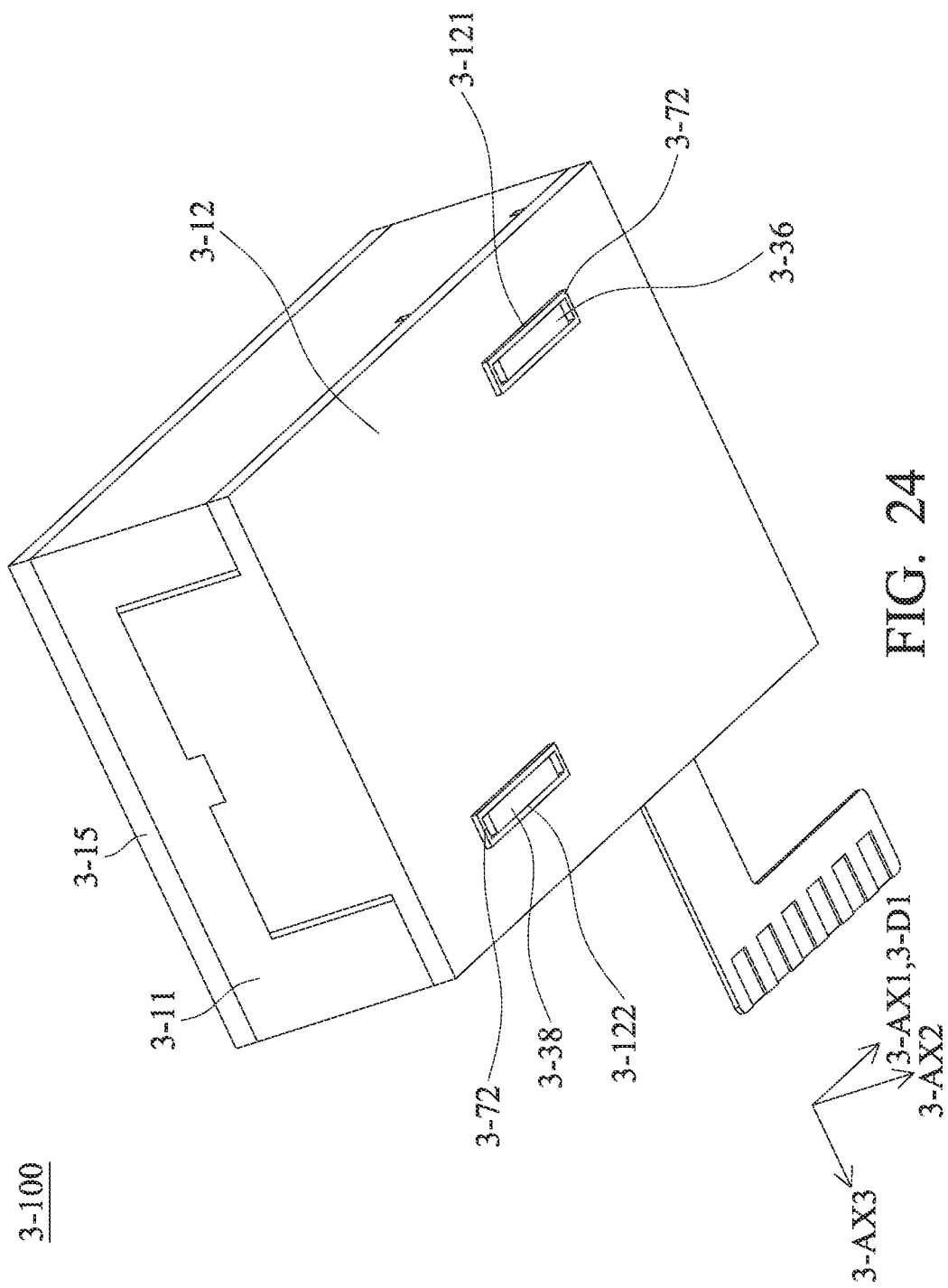
FIG. 24 is a schematic view of an optical element driving mechanism according to some embodiments of the present disclosure.

Please refer to FIG. 23 and FIG. 24, wherein FIG. 24 is a schematic view of an optical element driving mechanism 3-100 according to some embodiments of the present disclosure.

As shown in FIG. 23 and FIG. 24, according to some embodiments of the present disclosure, the first coil magnetic conductive element accommodating portion 3-121 of the base 3-12 of the fixed part 3-10 may correspond to the first coil magnetic conductive element 3-36.

According to some embodiments of the present disclosure, the base 3-12 may have a plate-like structure.

Please refer to FIG. 23 and FIG. 24, according to some embodiments of the present disclosure, the connecting element 3-70 may include a second connecting element 3-72.

According to some embodiments of the present disclosure, the first coil 3-32 may be fixedly connected to the base 3-12 via the second connecting element 3-72.

According to some embodiments of the present disclosure, the second connecting element 3-72 may be in direct contact with the first coil 3-32.

As shown in FIG. 23 and FIG. 24, according to some embodiments of the present disclosure, the second connecting element 3-72 may be in direct contact with the base 3-12.

According to some embodiments of the present disclosure, the second connecting element 3-72 may be disposed in the first coil magnetic conductive element accommodating portion 3-121.

Please refer to FIG. 23 and FIG. 24, according to some embodiments of the present disclosure, the second connecting element 3-72 may be in direct contact with the first coil magnetic conductive element 3-36.

According to some embodiments of the present disclosure, the second connecting element 3-72, the first coil 3-32 and the first coil magnetic conductive element 3-36 may overlap each other when viewed along the third axis 3-AX3.

As shown in FIG. 23 and FIG. 24, for example, according to some embodiments of the present disclosure, the second connecting element 3-72 may be located between the first coil 3-32 and the first coil magnetic conductive elements 3-36 when viewed along the third axis 3-AX3.

In this way, any unwanted movement of the driving assembly 3-30 may be avoided, thereby making the optical element driving mechanism 3-100 more stable. Moreover, the assembly of the optical element driving mechanism 3-100 may also be facilitated, thereby reducing the manufacturing cost of the optical element driving mechanism 3-100.

Please refer to FIG. 23 and FIG. 24, according to some embodiments of the present disclosure, the first coil magnetic conductive element accommodating portion 3-121 may have an opening structure.

According to some embodiments of the present disclosure, the first coil magnetic conductive element 3-36 may be exposed to the base 3-12 through the first coil magnetic conductive element accommodating portion 3-121 when viewed along the first axis 3-AX1.

In this way, the driving force of the driving assembly 3-30 may be effectively enhanced, and the effect of miniaturizing the optical element driving mechanism 3-100 may also be achieved. Moreover, the heat dissipation of the optical element driving mechanism 3-100 may also be facilitated, thereby increasing the smoothness of use of the optical element driving mechanism 3-100.

Please refer to FIG. 25, FIG. 25 is a cross-sectional view of the optical element driving mechanism 3-100 along line 3-C-3-C' of FIG. 20, according to some embodiments of the present disclosure.

As shown in FIG. 25, according to some embodiments of the present disclosure, the second stopping structure 3-42 may correspond to the first stopping structure 3-41. According to some embodiments of the present disclosure, the second stopping structure 3-42 may move relative to the first stopping structure 3-41.

According to some embodiments of the present disclosure, the third stopping structure 3-43 may correspond to the first stopping structure 3-41. According to some embodiments of the present disclosure, the third stopping structure 3-43 may be fixedly connected to the second stopping structure 3-42.

Figure 26:
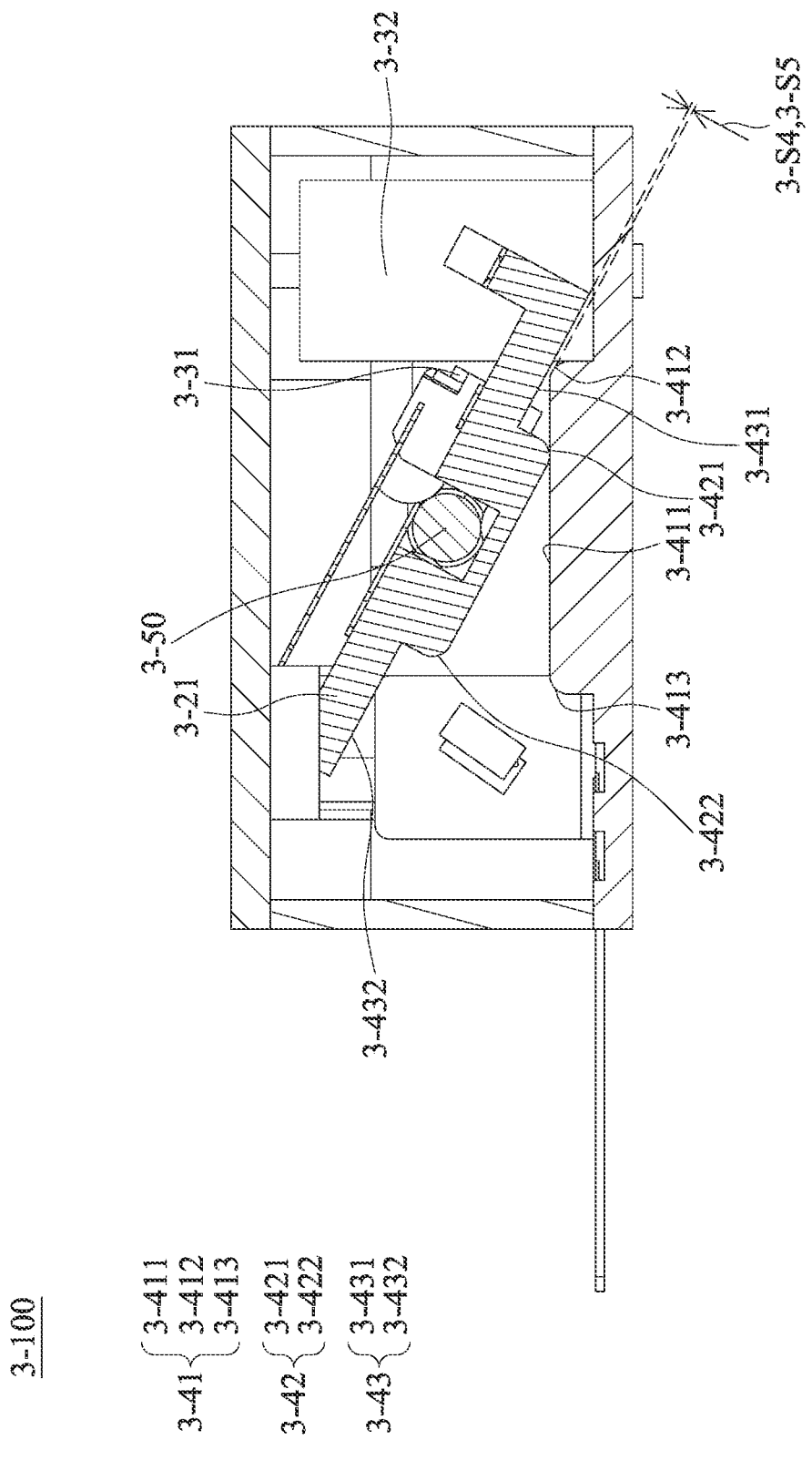
FIG. 26 is a schematic view of a different state of the optical element driving mechanism of embodiments according to FIG. 25, wherein a movable part frame is in a first position.

Please refer to FIG. 26. FIG. 26 is a schematic view of a different state of the optical element driving mechanism 3-100 of embodiments according to FIG. 25, wherein the movable part frame 3-21 is in a first position.

According to some embodiments of the present disclosure, when the movable part frame 3-21 of the movable part 3-20 is located at a first position relative to the fixed part 3-10, the second stopping structure 3-42 may be in direct contact with the first stopping structure 3-41.

According to some embodiments of the present disclosure, when the movable part frame 3-21 of the movable part 3-20 is located at the first position relative to the fixed part 3-10, there may be a gap between the third stopping structure 3-43 and the first stopping structure 3-41.

According to some embodiments of the present disclosure, when the movable part frame 3-21 of the movable part 3-20 is located at the first position relative to the fixed part 3-10, the shortest distance 3-S4 between the third stopping structure 3-43 and the first stopping structure 3-41 may be less than 0.1 millimeter (mm).

As shown in FIG. 26, according to some embodiments of the present disclosure, the first stopping structure 3-41 may be used to fix the driving assembly 3-30.

According to some embodiments of the present disclosure, the first stopping structure 3-41 may be in direct contact with the driving assembly 3-30.

According to some embodiments of the present disclosure, the first stopping structure 3-41 may be in direct contact with the first coil 3-32.

In this way, any unwanted movement of the first coil 3-32 of the driving assembly 3-30 may be avoided, thereby making the optical element driving mechanism 3-100 more stable.

Please refer to FIG. 25, according to some embodiments of the present disclosure, the first stopping structure 3-41 may include a first stopping structure first stopping portion 3-411, a first stopping structure second stopping portion 3-412, and a first stopping structure third stopping portion 3-413.

According to some embodiments of the present disclosure, the second stopping structure 3-42 may include a second stopping structure first stopping portion 3-421, and a second stopping structure second stopping portion 3-422.

According to some embodiments of the present disclosure, the third stopping structure 3-43 may include a third stopping structure first stopping portion 3-431, and a third stopping structure second stopping portion 3-432.

According to some embodiments of the present disclosure, the first stopping structure first stopping portion 3-411 may correspond to the second stopping structure first stopping portion 3-421 and the second stopping structure second stopping portion 3-422.

Figure 27:
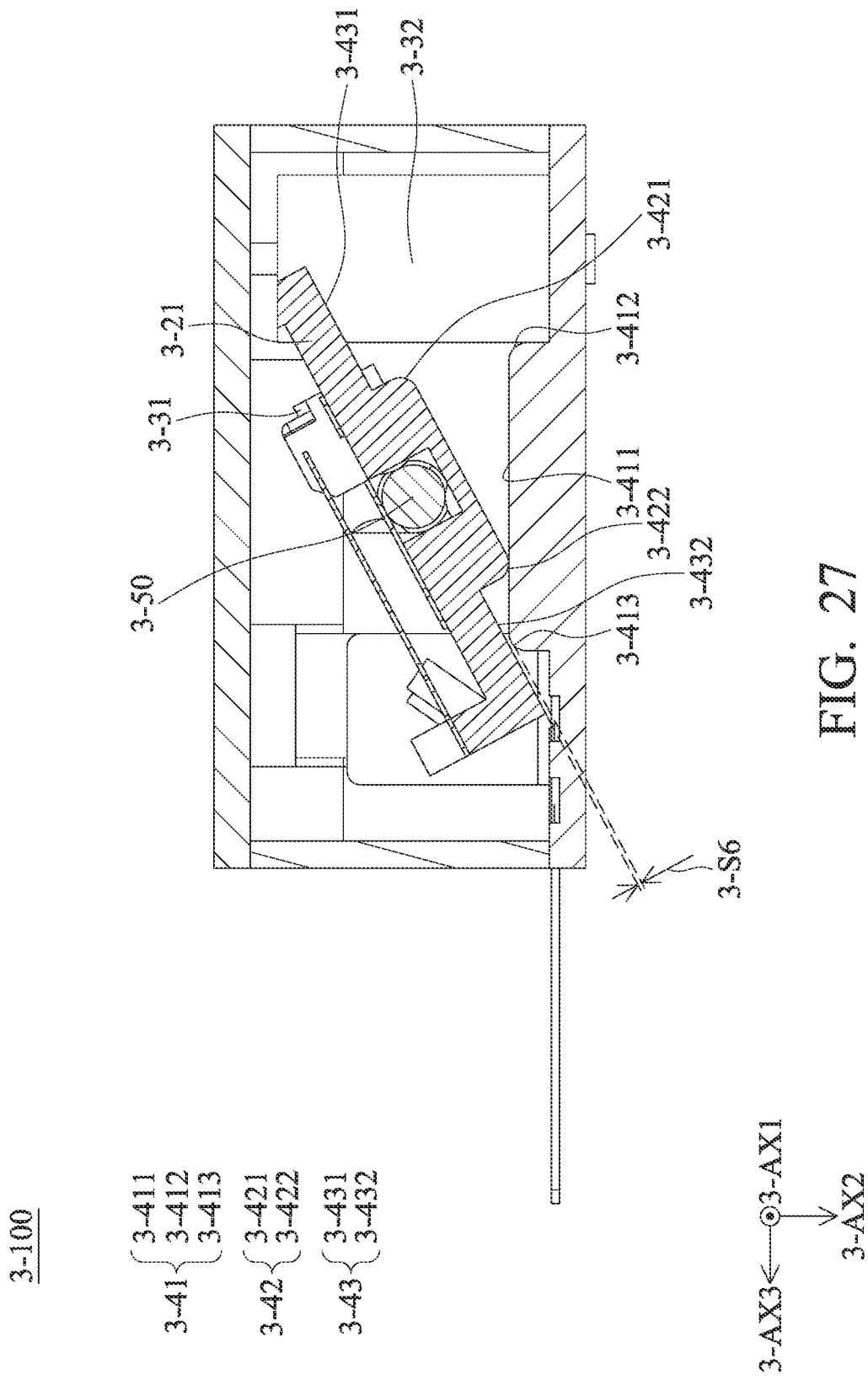
FIG. 27 is a schematic view of a different state of the optical element driving mechanism of embodiments according to FIG. 25, wherein the movable part frame is in a second position.

Please refer to FIG. 26 and FIG. 27. FIG. 27 is a schematic view of a different state of the optical element driving mechanism 3-100 of embodiments according to FIG. 25, wherein the movable part frame 3-21 is in a second position.

According to some embodiments of the present disclosure, when the movable part frame 3-21 of the movable part 3-20 is located at the first position relative to the fixed part 3-10, the second stopping structure first stopping portion 3-421 may be in direct contact with the first stopping structure first stopping portion 3-411.

According to some embodiments of the present disclosure, when the movable part frame 3-21 of the movable part 3-20 is located at the second position relative to the fixed part 3-10, the second stopping structure second stopping portion 3-422 may be in direct contact with the first stopping structure first stopping portion 3-411.

In this way, any unwanted movement of the movable part frame 3-21 may be avoided, thereby preventing the internal elements of the optical element driving mechanism 3-100 from deviating from their positions.

According to some embodiments of the present disclosure, the first stopping structure second stopping portion 3-412 may correspond to the third stopping structure first stopping portion 3-431.

According to some embodiments of the present disclosure, the first stopping structure third stopping portion 3-413 may correspond to the third stopping structure second stopping portion 3-432.

According to some embodiments of the present disclosure, when the movable part frame 3-21 of the movable part 3-20 is located at the first position relative to the fixed part 3-10, the shortest distance 3-S5 between the third stopping structure first stopping portion 3-431 and the first stopping structure second stopping portion 3-412 may be less than 1 mm.

That is, the third stopping structure first stopping portion 3-431 and the first stopping structure second stopping portion 3-412 may be used as backup stopping structures when the optical element driving mechanism 3-100 is impacted.

In this way, any unwanted movement of the movable part frame 3-21 may be avoided, thereby preventing the internal elements of the optical element driving mechanism 3-100 from deviating from their positions.

According to some embodiments of the present disclosure, when the movable part frame 3-21 of the movable part 3-20 is located at the second position relative to the fixed part 3-10, the shortest distance 3-S6 between the third stopping structure second stopping portion 3-432 and the first stopping structure third stopping portion 3-413 may be less than 1 mm.

That is, the third stopping structure second stopping portion 3-432 and the first stopping structure third stopping portion 3-413 may be used as backup stopping structures when the optical element driving mechanism 3-100 is impacted.

In this way, any unwanted movement of the movable part frame 3-21 may be avoided, thereby preventing the internal elements of the optical element driving mechanism 3-100 from deviating from their positions.

Please refer to FIG. 25, according to some embodiments of the present disclosure, the first stopping structure first stopping portion 3-411 may be located between the first stopping structure second stopping portion 3-412 and the first stopping structure third stopping portion 3-413.

According to some embodiments of the present disclosure, the first stopping structure first stopping portion 3-411 may have a planar structure.

According to some embodiments of the present disclosure, the second stopping structure first stopping portion 3-421 may have an arc structure.

According to some embodiments of the present disclosure, the radius of curvature of the arc structure of the second stopping structure first stopping portion 3-421 may be greater than 0.05 mm.

According to some embodiments of the present disclosure, the second stopping structure second stopping portion 3-422 may have an arc structure.

According to some embodiments of the present disclosure, the radius of curvature of the arc structure of the second stopping structure second stopping portion 3-422 may be greater than 0.05 mm.

According to some embodiments of the present disclosure, the first stopping structure second stopping portion 3-412 may have an arc structure.

According to some embodiments of the present disclosure, the radius of curvature of the arc structure of the first stopping structure second stopping portion 3-412 may be greater than 0.05 mm.

According to some embodiments of the present disclosure, the first stopping structure third stopping portion 3-413 may have an arc structure.

According to some embodiments of the present disclosure, the radius of curvature of the arc structure of the first stopping structure third stopping portion 3-413 may be greater than 0.05 mm.

According to some embodiments of the present disclosure, the third stopping structure first stopping portion 3-431 may have a planar structure.

According to some embodiments of the present disclosure, the third stopping structure second stopping portion 3-432 may have a planar structure.

In this way, the structure of the stopping assembly 3-40 may be enhanced, and the stopping assembly 3-40 is prevented from breaking when it is impacted. Furthermore, the unwanted particles from the stopping assembly 3-40 may also be avoided.

Please refer to FIG. 20, FIG. 22, and FIG. 25, according to some embodiments of the present disclosure, when viewed along the second axis 3-AX2, the second stopping structure first stopping portion 3-421 and the second stopping structure second stopping portion 3-422 are located on opposite sides of the center 3-OEC of the optical element 3-OE, respectively.

According to some embodiments of the present disclosure, when viewed along the second axis 3-AX2, the third stopping structure first stopping portion 3-431 and the third stopping structure second stopping portion 3-432 are located on opposite sides the center 3-OEC of the optical element 3-OE, respectively.

In this way, any unwanted movement of the optical element 3-OE may be avoided, thereby improving the accuracy of the optical element driving mechanism 3-100.

Please refer to FIG. 22, according to some embodiments of the present disclosure, the second coil 3-34 may correspond to the second magnetic element 3-33. For example, the second coil 3-34 may be disposed adjacent to the second magnetic element 3-33.

According to some embodiments of the present disclosure, the second magnetic element magnetic conductive element 3-37 may have a magnetic conductive material. According to some embodiments of the present disclosure, the second magnetic element magnetic conductive element 3-37 may correspond to the second magnetic element 3-33. For example, the second magnetic element magnetic conductive element 3-37 may be disposed adjacent to the second magnetic element 3-33.

According to some embodiments of the present disclosure, the first magnetic element 3-31 may have an elongated structure when viewed along the second axis 3-AX2. According to some embodiments of the present disclosure, the first magnetic element 3-31 may extend along the first axis 3-AX1.

According to some embodiments of the present disclosure, the first magnetic element magnetic conductive element 3-35 may have an elongated structure when viewed along the second axis 3-AX2. According to some embodiments of the present disclosure, the first magnetic element magnetic conductive element 3-35 may extend along the first axis 3-AX1.

According to some embodiments of the present disclosure, the first coil 3-32 may have an elongated structure when viewed along the second axis 3-AX2. According to some embodiments of the present disclosure, the first coil 3-32 may extend along the first axis 3-AX1.

In this way, the driving force of the driving assembly 3-30 may be effectively enhanced, and the effect of miniaturizing the optical element driving mechanism 3-100 may also be achieved.

According to some embodiments of the present disclosure, the second magnetic element 3-33 may have an elongated structure when viewed along the second axis 3-AX2. According to some embodiments of the present disclosure, the second magnetic element 3-33 may extend along the first axis 3-AX1.

According to some embodiments of the present disclosure, the second magnetic element magnetic conductive element 3-37 may have an elongated structure when viewed along the second axis 3-AX2. According to some embodiments of the present disclosure, the second magnetic element magnetic conductive element 3-37 may extend along the first axis 3-AX1.

According to some embodiments of the present disclosure, the second coil 3-34 may have an elongated structure when viewed along the second axis 3-AX2. According to some embodiments of the present disclosure, the second coil 3-34 may extend along the first axis 3-AX1.

According to some embodiments of the present disclosure, the second magnetic element 3-33 may be fixedly disposed on the movable part frame 3-21.

According to some embodiments of the present disclosure, the second coil 3-34 may be fixedly disposed on the fixed part 3-10. According to some embodiments of the present disclosure, the second coil 3-34 may be fixedly disposed on the base 3-12 of the fixed part 3-10.

In this way, the driving force of the driving assembly 3-30 may be effectively enhanced, and the effect of miniaturizing the optical element driving mechanism 3-100 may also be achieved.

Please refer to FIG. 20 and FIG. 21, according to some embodiments of the present disclosure, the protective element recessed structure 3-151 of the protective element 3-15 may include a protective element first recessed structure 3-151a and a protective element second recessed structure 3-151b.

According to some embodiments of the present disclosure, the protective element first recessed structure 3-151a may correspond to the first coil magnetic conductive element 3-36.

According to some embodiments of the present disclosure, the first coil magnetic conductive element 3-36 may be exposed to the protective element 3-15 through the protective element first recessed structure 3-151a of the protective element 3-15.

According to some embodiments of the present disclosure, the protective element second recessed structure 3-151b may correspond to the second coil magnetic conductive element 3-38.

According to some embodiments of the present disclosure, the second coil magnetic conductive element 3-38 may be exposed to the protective element 3-15 through the protective element second recessed structure 3-151b of the protective element 3-15.

In this way, the driving force of the driving assembly 3-30 may be effectively enhanced, and any unwanted movement of the driving assembly 3-30 may be avoided, thereby making the optical element driving mechanism 3-100 more stable. Moreover, the heat dissipation of the optical element driving mechanism 3-100 may also be facilitated, thereby increasing the smoothness of use of the optical element driving mechanism 3-100.

Figure 28:
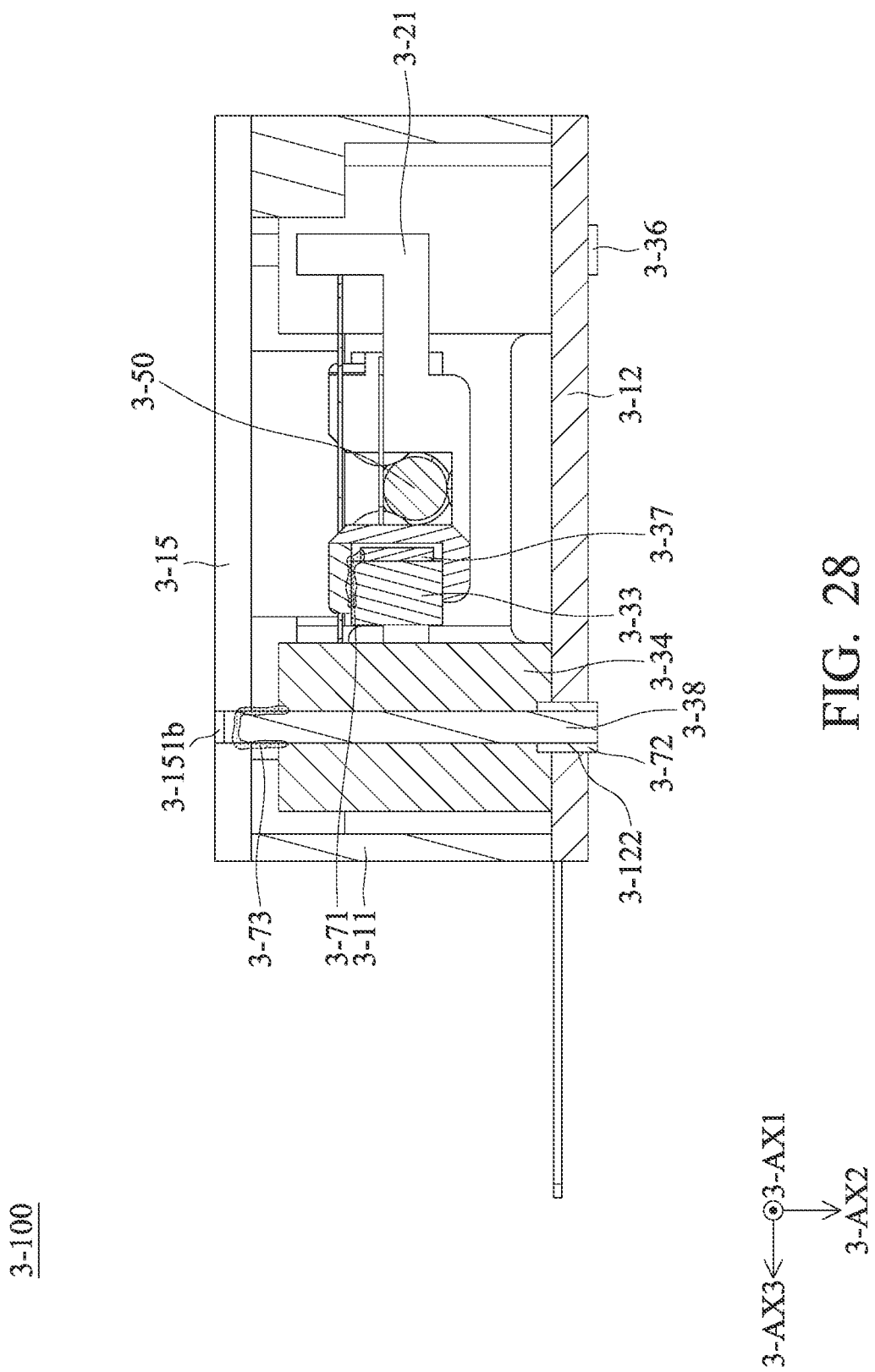
FIG. 28 is a cross-sectional view of the optical element driving mechanism along line 3-D-3-D' of FIG. 20, according to some embodiments of the present disclosure.

Please refer to FIG. 23 and FIG. 28, wherein FIG. 28 is a cross-sectional view of the optical element driving mechanism 3-100 along line 3-D-3-D' of FIG. 20, according to some embodiments of the present disclosure.

According to some embodiments of the present disclosure, the connecting element 3-70 may include a third connecting element 3-73.

According to some embodiments of the present disclosure, a part of the driving assembly 3-30 may be fixed to the protective element 3-15 by the third connecting element 3-73.

According to some embodiments of the present disclosure, the third connection element 3-73 may be in direct contact with the protective element 3-15.

According to some embodiments of the present disclosure, the third connecting element 3-73 may be located in the protective element first recessed structure 3-151a and the protective element second recessed structure 3-151b of the protective element concave structure 3-151 of the protective element 3-15.

According to some embodiments of the present disclosure, the third connecting element 3-73 may be in direct contact with the first coil 3-32.

According to some embodiments of the present disclosure, the third connecting element 3-73 may be in direct contact with the first coil magnetic conductive element 3-36.

In this way, any unwanted movement of the driving assembly 3-30 may be avoided, thereby making the optical element driving mechanism 3-100 more stable.

Please refer to FIG. 24 and FIG. 28, according to some embodiments of the present disclosure, the second coil magnetic conductive element accommodating portion 3-122 of the base 3-12 of the fixed part 3-10 may correspond to the second coil magnetic conductive element 3-38.

According to some embodiments of the present disclosure, the second coil 3-34 may be fixedly connected to the base 3-12 through the second connecting element 3-72.

According to some embodiments of the present disclosure, the second connecting element 3-72 may be in direct contact with the second coil 3-34.

As shown in FIG. 24 and FIG. 28, according to some embodiments of the present disclosure, the second connecting element 3-72 may be in direct contact with the base 3-12.

According to some embodiments of the present disclosure, the second connecting element 3-72 may be disposed in the second coil magnetic conductive element accommodating portion 3-122.

Please refer to FIG. 24 and FIG. 28, according to some embodiments of the present disclosure, the second connecting element 3-72 may be in direct contact with the second coil magnetic conductive element 3-38.

According to some embodiments of the present disclosure, the second connecting element 3-72, the second coil 3-34 and the second coil magnetic conductive element 3-38 may overlap each other when viewed along the third axis 3-AX3.

As shown in FIG. 24 and FIG. 28, for example, according to some embodiments of the present disclosure, the second connecting element 3-72 may be located between the second coil 3-34 and the second coil magnetic conductive elements 3-38 when viewed along the third axis 3-AX3.

In this way, any unwanted movement of the driving assembly 3-30 may be avoided, thereby making the optical element driving mechanism 3-100 more stable. Moreover, the assembly of the optical element driving mechanism 3-100 may also be facilitated, thereby reducing the manufacturing cost of the optical element driving mechanism 3-100.

Please refer to FIG. 24 and FIG. 28, according to some embodiments of the present disclosure, the second coil magnetic conductive element accommodating portion 3-122 may have an opening structure.

According to some embodiments of the present disclosure, the second coil magnetic conductive element 3-38 may be exposed to the base 3-12 through the second coil magnetic conductive element accommodating portion 3-122 when viewed along the first axis 3-AX1.

In this way, the driving force of the driving assembly 3-30 may be effectively enhanced, and the effect of miniaturizing the optical element driving mechanism 3-100 may also be achieved. Moreover, the heat dissipation of the optical element driving mechanism 3-100 may also be facilitated, thereby increasing the smoothness of use of the optical element driving mechanism 3-100.

According to some embodiments of the present disclosure, the second coil magnetic conductive element 3-38 may have a magnetic conductive material. According to some embodiments of the present disclosure, the second coil magnetic conductive element 3-38 may correspond to the second coil 3-34.

According to some embodiments of the present disclosure, the shortest distance (which may be 0) between the second coil magnetic conductive element 3-38 and the second magnetic element 3-33 may be shorter than the shortest distance between the second magnetic element 3-37 and the second coil 3-34.

As shown in FIG. 22, according to some embodiments of the present disclosure, the shortest distance between the second coil magnetic conductive element 3-38 and the second magnetic element 3-33 may be greater than the shortest distance between the second magnetic element 3-37 and the second coil 3-34.

According to some embodiments of the present disclosure, the second magnetic element 3-33 may be located between the second magnetic element magnetic conductive element 3-37 and the second coil magnetic conductive element 3-38 when viewed along the second axis 3-AX2.

Please refer to FIG. 22, according to some embodiments of the present disclosure, the second coil 3-34 may be wound around the second coil magnetic conductive element 3-38. According to some embodiments of the present disclosure, the winding axis of the second coil 3-34 may be parallel to the second axis 3-AX2.

According to some embodiments of the present disclosure, the second magnetic element 3-33 may be fixedly disposed on the movable part frame 3-21 of the movable part 3-20. According to some embodiments of the present disclosure, the second magnetic element and the magnetic conductive element 3-37 may be fixedly disposed on the movable part frame 3-21.

As shown in FIG. 22, according to some embodiments of the present disclosure, the second magnetic element magnetic conductive element 3-37 may be located between the second magnetic element 3-33 and the movable part frame 3-21.

In this way, the driving force of the driving assembly 3-30 may be effectively enhanced, and the effect of miniaturization of the optical element driving mechanism 3-100 may also be achieved.

Please refer to FIG. 22 and FIG. 28, according to some embodiments of the present disclosure, the second coil 3-34 may be fixedly disposed on the fixed part 3-10. According to some embodiments of the present disclosure, the second coil 3-34 may be fixedly disposed on the base 3-12 of the fixed part 3-10.

Figure 29:
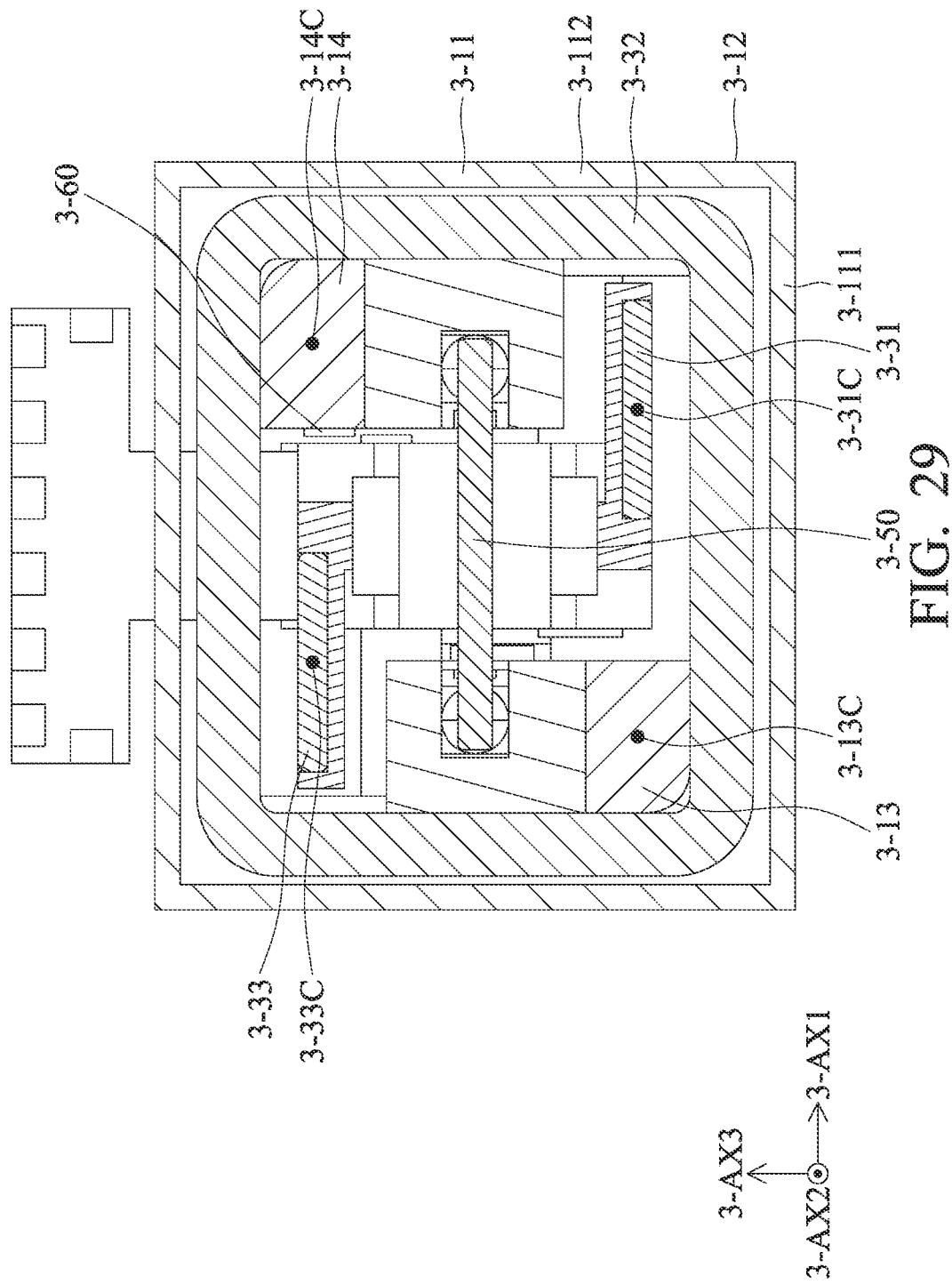
FIG. 29 is a schematic view of a modified embodiment of the optical element driving mechanism according to FIG. 22 of some embodiments of the present disclosure.

Please refer to FIG. 29. FIG. 29 is a schematic view of a modified embodiment of the optical element driving mechanism 3-100 according to FIG. 22 of some embodiments of the present disclosure.

It should be noted that in the embodiment of FIG. 29, the optical element driving mechanism 3-100 may not have the second coil 3-34. Moreover, the first coil 3-32 may extend substantially along the outer frame 3-11.

According to some embodiments of the present disclosure, the first coil 3-32 may surround the first magnetic element 3-31 when viewed along the second axis 3-AX2.

According to some embodiments of the present disclosure, the first coil 3-32 may surround the first supporting assembly 3-50 when viewed along the second axis 3-AX2.

As shown in FIG. 29, according to some embodiments of the present disclosure, the first coil 3-32 may surround the optical element 3-OE when viewed along the second axis 3-AX2.

According to some embodiments of the present disclosure, the first coil 3-32 may surround the first sensing assembly 3-60 when viewed along the second axis 3-AX2.

According to some embodiments of the present disclosure, both the first coil 3-32 and the first magnetic element 3-31 may at least partially overlap each other when viewed along any direction that is perpendicular to the second axis 3-AX2.

According to some embodiments of the present disclosure, both the first coil 3-32 and the first support element 3-50 may at least partially overlap each other when viewed along any direction that is perpendicular to the second axis 3-AX2.

According to some embodiments of the present disclosure, the first coil 3-32 and the optical element 3-OE (not shown in FIG. 29) may not overlap each other when viewed along any direction that is perpendicular to the second axis 3-AX2.

According to some embodiments of the present disclosure, both the first coil 3-32 and the first sensing assembly 3-60 may at least partially overlap each other when viewed along any direction that is perpendicular to the second axis 3-AX2.

According to some embodiments of the present disclosure, the first coil 3-32 may be fixedly connected to the first positioning structure 3-13.

According to some embodiments of the present disclosure, the first positioning structure 3-13 may be fixedly connected to the base 3-12.

According to some embodiments of the present disclosure, the first positioning structure 3-13 may extend from the base 3-12 along the second axis 3-AX2.

According to some embodiments of the present disclosure, the first positioning structure 3-13 and the base 3-12 may have an integrated structure.

As shown in FIG. 29, according to some embodiments of the present disclosure, the first coil 3-32 may surround the first positioning structure 3-13 when viewed along the second axis 3-AX2.

According to some embodiments of the present disclosure, both the first coil 3-32 and the first positioning structure 3-13 may at least partially overlap each other when viewed along any direction that is perpendicular to the second axis 3-AX2.

According to some embodiments of the present disclosure, the first coil 3-32 may be fixedly connected to the second positioning structure 3-14.

According to some embodiments of the present disclosure, the second positioning structure 3-14 may be fixedly connected to the base 3-12.

According to some embodiments of the present disclosure, the second positioning structure 3-14 may extend from the base 3-12 along the second axis 3-AX2.

According to some embodiments of the present disclosure, the second positioning structure 3-14 and the base 3-12 may have an integrated structure.

Please refer to FIG. 29, according to some embodiments of the present disclosure, the first coil 3-32 may surround the second positioning structure 3-14 when viewed along the second axis 3-AX2.

According to some embodiments of the present disclosure, both the first coil 3-32 and the second positioning structure 3-14 may at least partially overlap each other when viewed along any direction that is perpendicular to the second axis 3-AX2.

As shown in FIG. 29, according to some embodiments of the present disclosure, when viewed along the second axis 3-AX2, the alignment direction of the center 3-13C of the first positioning structure 3-13 and the center 3-14C of the second positioning structure 3-14 may not be parallel to either the first axis 3-AX1 or the third axis 3-AX3.

According to some embodiments of the present disclosure, when viewed along the second axis 3-AX2, the alignment direction of the center 3-31C of the first magnetic element 3-31 and the center 3-33C of the second magnetic element 3-33 may not be parallel to either the first axis 3-AX1 or the third axis 3-AX3.

According to some embodiments of the present disclosure, the first coil 3-32 may surround the second magnetic element 3-33 when viewed along the second axis 3-AX2.

According to some embodiments of the present disclosure, both the first coil 3-32 and the second magnetic element 3-33 may at least partially overlap each other when viewed along any direction that is perpendicular to the second axis 3-AX2.

Please refer to FIG. 29, according to some embodiments of the present disclosure, the first magnetic element 3-31 may at least partially overlap the first positioning structure 3-13 when viewed along the first axis 3-AX1.

According to some embodiments of the present disclosure, the second magnetic element 3-33 may at least partially overlap the second positioning structure 3-14 when viewed along the first axis 3-AX1.

According to some embodiments of the present disclosure, the first magnetic element 3-31 may at least partially overlap the second positioning structure 3-14 when viewed along the third axis 3-AX3.

According to some embodiments of the present disclosure, the second magnetic element 3-33 may at least partially overlap the first positioning structure 3-13 when viewed along the third axis 3-AX3.

In this way, the weight of the optical element driving mechanism 3-100 may be balanced, thereby making the optical element driving mechanism 3-100 more stable.

As shown in FIG. 29, according to some embodiments of the present disclosure, the outer frame 3-11 of the fixed part 3-10 may further include a first sidewall 3-112 and a second sidewall 3-113.

According to some embodiments of the present disclosure, the first sidewall 3-112 may have a plate-like structure. According to some embodiments of the present disclosure, the second sidewall 3-113 may have a plate-like structure. According to some embodiments of the present disclosure, the first sidewall 3-112 and the second sidewall 3-113 may not be parallel to each other.

Please refer to FIG. 29, according to some embodiments of the present disclosure, there may be a gap between the first coil 3-32 and the first sidewall 3-112. According to some embodiments of the present disclosure, there may be a gap between the first coil 3-32 and the second sidewall 3-113.

According to some embodiments of the present disclosure, the first coil 3-32 may not be in contact with the first sidewall 3-112. According to some embodiments of the present disclosure, the first coil 3-32 may not be in contact with the second sidewall 3-113.

According to some embodiments of the present disclosure, the first sidewall 3-112 and the second sidewall 3-113 are adjacent to the accommodating space (e.g., the aforementioned internal space) of the fixed part 3-10.

In general, the optical element driving mechanism of the embodiment of the present disclosure may avoid any unwanted movement of the internal elements of the optical element driving mechanism, and prevent the internal elements of the optical element driving mechanism from deviating from their positions, so that the optical element driving mechanism is more stable. Furthermore, the internal elements of the optical element driving mechanism may be avoided from generating unwanted particles, and the accuracy of the optical element driving mechanism may be improved. Furthermore, the optical element driving mechanism of embodiments of the present disclosure may be helpful for assembly, thereby reducing the manufacturing cost of the optical element driving mechanism. In addition, the optical element driving mechanism of embodiments of the present disclosure may be helpful to dissipate heat of the optical element driving mechanism, thereby increasing the smoothness of use of the optical element driving mechanism. Also, the optical element driving mechanism of embodiments of the present disclosure may miniaturize the optical element driving mechanism.

Embodiment Group 4

Figure 30:
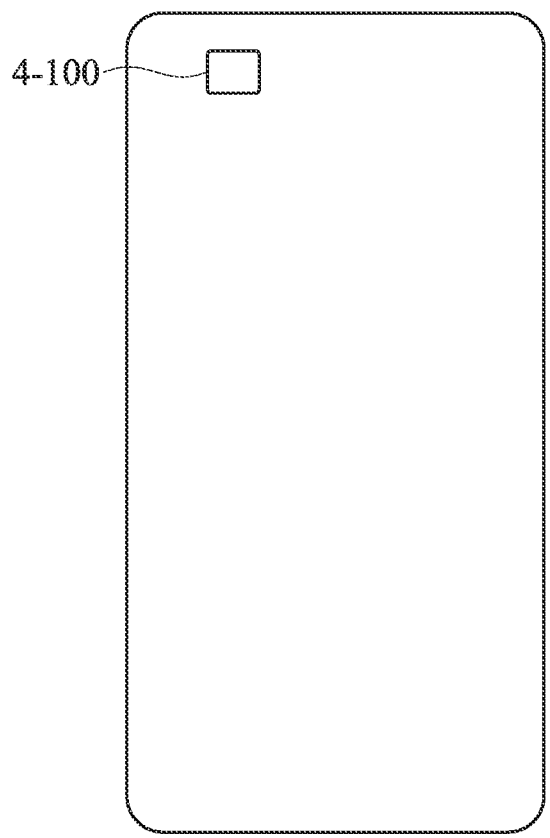
FIG. 30 is a schematic view of an electrical device according to some embodiment of the present disclosure.

Firstly, please refer to FIG. 30, FIG. 30 is a schematic view of an electrical device 4-1 according to some embodiment of the present disclosure. As shown in FIG. 30, an optical element driving mechanism 4-100 of some embodiment of the present disclosure may be mounted in an electrical device 4-1 for taking photos or videos, wherein the aforementioned electrical device 4-1 may, for example, be a smartphone or a digital camera, but the present disclosure is not limited to these. It should be noted that the position and the size between the optical element driving mechanism 4-100 and the electrical device 4-1 shown in FIG. 30 are only an example, which is not for limiting the position and the size between the optical element driving mechanism 4-100 and the electrical device 4-1. In fact, according to different needs, the optical element driving mechanism 4-100 may be mounted at different positions in the electrical device 4-1

Figure 31:
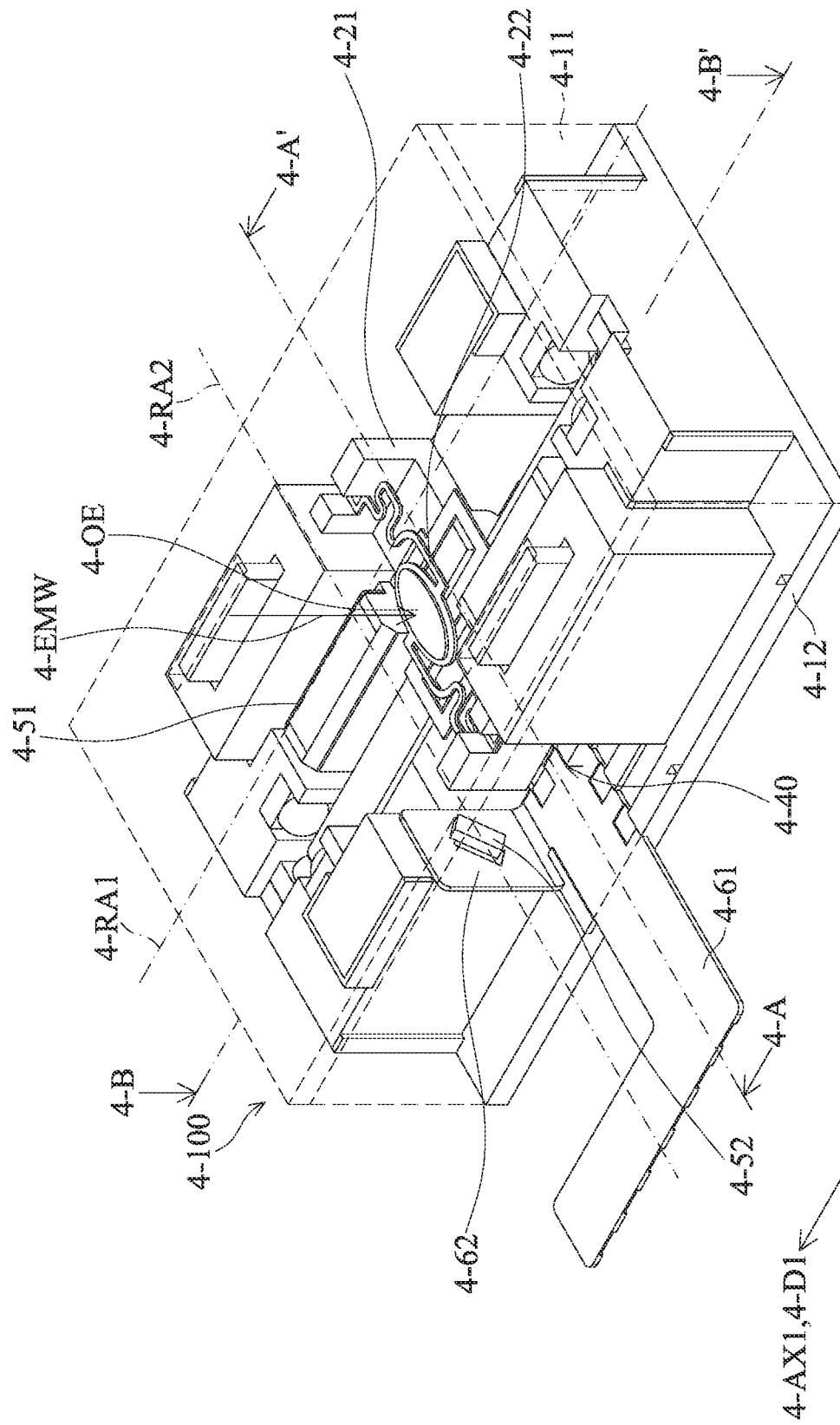
FIG. 31 is a schematic view of an optical element driving mechanism and an optical element according to some embodiments of the present disclosure, wherein an outer frame is shown as a dashed line.
Figure 32:
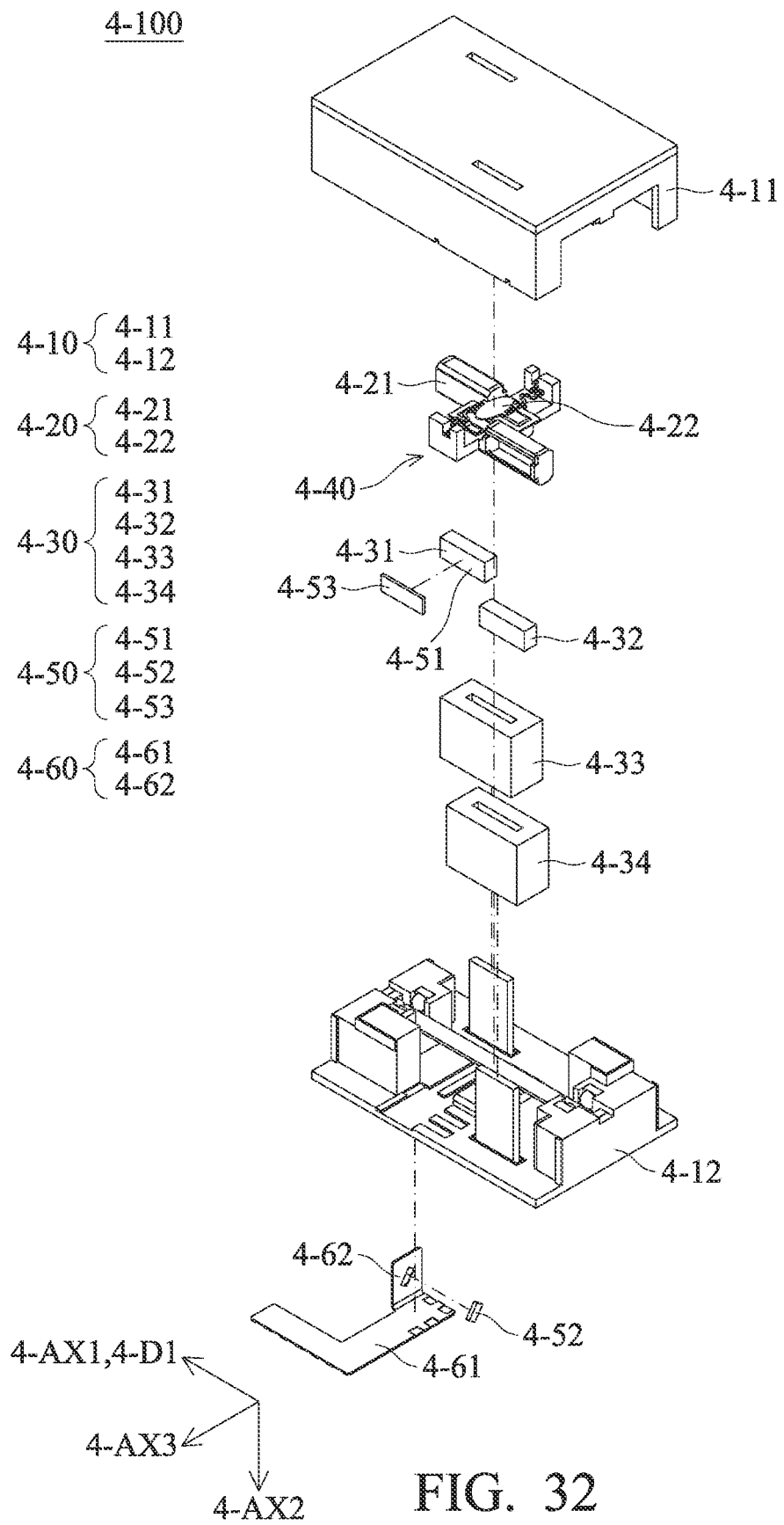
FIG. 32 is an exploded view of the optical element driving mechanism according to some embodiments of the present disclosure.

Please refer to FIG. 31. FIG. 31 is a schematic view of the optical element driving mechanism 4-100 and an optical element 4-OE according to some embodiments of the present disclosure, wherein the outer frame is shown as a dashed line. FIG. 32 is an exploded view of the optical element driving mechanism 4-100 according to some embodiments of the present disclosure.

As shown in FIG. 31 and FIG. 32, the optical element driving mechanism 4-100 may include a fixed part 4-10, a movable part 4-20, a driving assembly 4-30, a stopping assembly 4-40, a sensing assembly 4-50, and a circuit assembly 4-60.

The movable part 4-20 may move relative to the fixed part 4-10, and the driving assembly 4-30 may drive the movable part 4-20 to move relative to the fixed part 4-10. According to some embodiments of the present disclosure, the movable part 4-20 may be connected to an optical element 4-OE.

According to some embodiments of the present disclosure, the optical element 4-OE may correspond to an electromagnetic wave 4-EMW. For example, the electromagnetic wave 4-EMW may be incident to the optical element 4-OE. For example, according to some embodiments of the present disclosure, the electromagnetic wave 4-EMW may be visible light, infrared light, ultraviolet light, and the like.

The fixed part 4-10 may include an outer frame 4-11, and a base 4-12. The outer frame 4-11 may be disposed on the base 4-12, so as to form an inner space and to accommodate the elements of the optical element driving mechanism 4-100.

The movable part 4-20 may include a movable part frame 4-21, and a movable part setting surface 4-22.

The driving assembly 4-30 may include a first magnetic element 4-31, a second magnetic element 4-32, a first coil 4-33, and a second coil 4-34.

According to some embodiments of the present disclosure, the movable part setting surface 4-22 may be parallel to a first axis 4-AX1. According to some embodiments of the present disclosure, the movable part setting surface 4-22 may be perpendicular to a second axis 4-AX2. According to some embodiments of the present disclosure, the movable part setting surface 4-22 may be parallel to a third axis 4-AX3.

According to some embodiments of the present disclosure, the first axis 4-AX1 may be perpendicular to the second axis 4-AX2. According to some embodiments of the present disclosure, the first axis 4-AX1 may be perpendicular to the third axis 4-AX3. According to some embodiments of the present disclosure, the second axis 4-AX2 may be perpendicular to the third axis 4-AX3.

According to some embodiments of the present disclosure, the optical element driving mechanism 4-100 may have an elongated structure when viewed along the second axis 4-AX2. According to some embodiments of the present disclosure, the optical element driving mechanism 4-100 may extend along the first axis 4-AX1.

According to some embodiments of the present disclosure, the driving assembly 4-30 may be used to drive the optical element 4-OE to move relative to the fixed part 4-10 in a first dimension 4-D1.

According to some embodiments of the present disclosure, the driving assembly 4-30 may be used to drive the movable part frame 4-21 to move relative to the fixed part 4-10 in the first dimension 4-D1.

According to some embodiments of the present disclosure, the first dimension 4-D1 may be a rotation about a first rotation axis 4-RA1. According to some embodiments of the present disclosure, the first rotation axis 4-RA1 may be parallel to the first axis 4-AX1.

According to some embodiments of the present disclosure, the driving assembly 4-30 may be used to drive the movable part setting surface 4-22 of the movable part 4-20 to move relative to the movable part frame 4-21 in a second dimension 4-D2.

According to some embodiments of the present disclosure, the second dimension 4-D2 is different from the first dimension 4-D1. According to some embodiments of the present disclosure, the second dimension 4-D2 may be perpendicular to the first dimension 4-D1.

According to some embodiments of the present disclosure, the second dimension 4-D2 may be a rotation about a second rotation axis 4-RA2. According to some embodiments of the present disclosure, the second axis 4-RA2 may be parallel to the third axis 4-AX3.

According to some embodiments of the present disclosure, the sensing assembly 4-50 may be used to sense the movement of the movable part frame 4-21 of the movable part 4-20 relative to the fixed part 4-10. The sensing assembly 4-50 may include a reference element 4-51, a sensing element 4-52, and a magnetic conductive element 4-53.

According to some embodiments of the present disclosure, the circuit assembly 4-60 may be electrically connected to the driving assembly 4-30. According to some embodiments of the present disclosure, the circuit assembly 4-60 may include a first circuit element 4-61 and a second circuit element 4-62.

Figure 33:
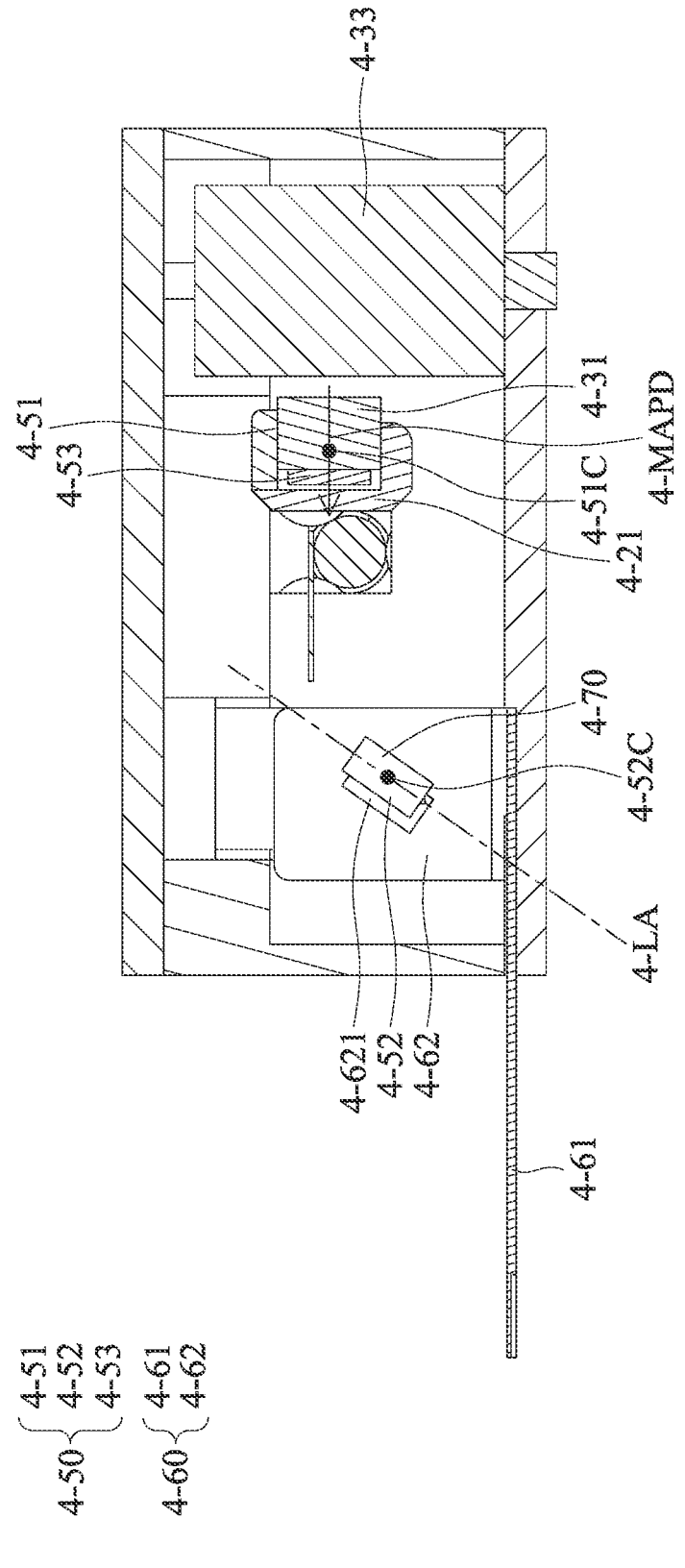
FIG. 33 is a cross-sectional view of the optical element driving mechanism along line 4-A-4-A' of FIG. 31, according to some embodiments of the present disclosure.

Please refer to FIG. 33, FIG. 33 is a cross-sectional view of the optical element driving mechanism 4-100 along line 4-A-4-A' of FIG. 31, according to some embodiments of the present disclosure.

According to some embodiments of the present disclosure, the sensing element 4-52 may be disposed to correspond to the reference element 4-51, and the sensing element 4-52 may be used for outputting a sensing signal. According to some embodiments of the present disclosure, the reference element 4-51 may move relative to the sensing element 4-52.

Figure 34:
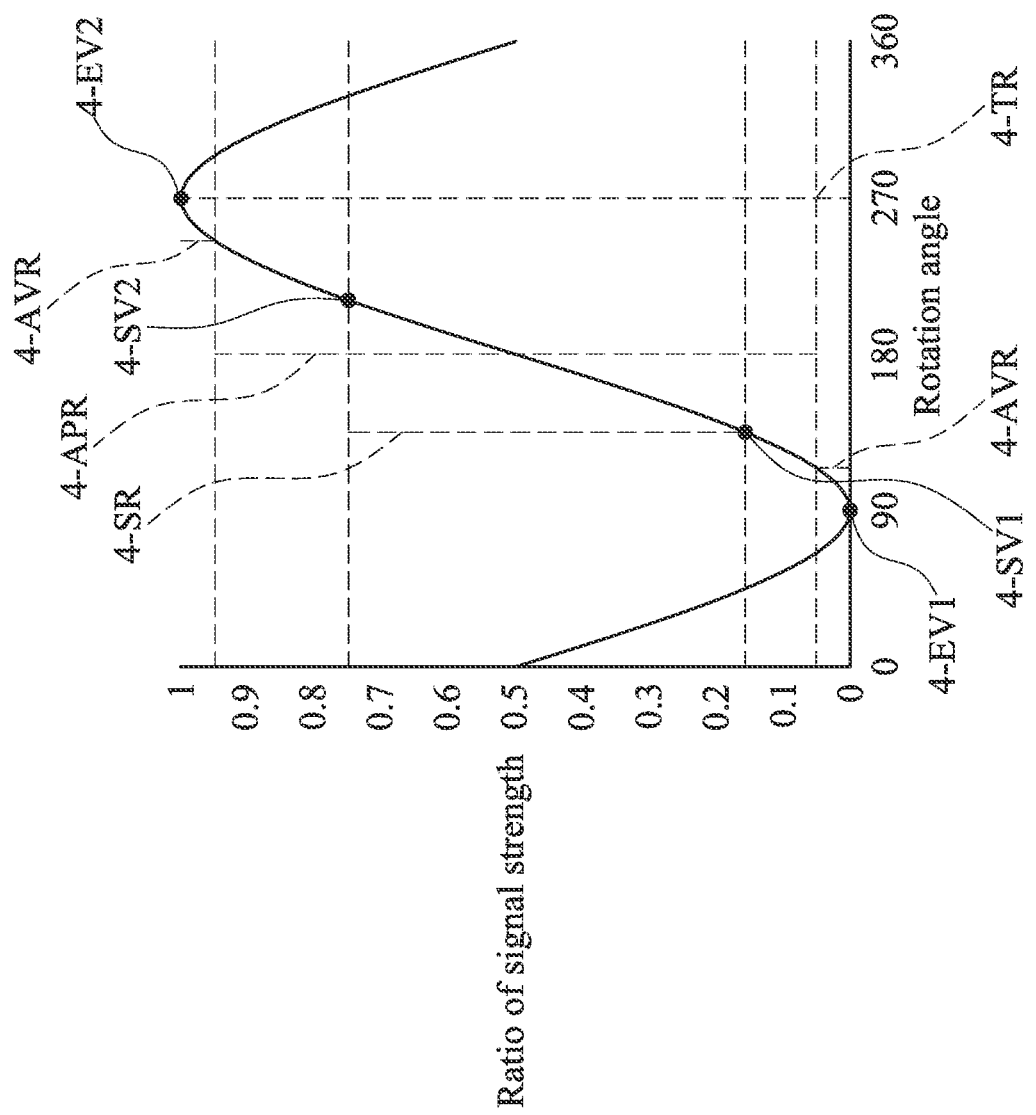
FIG. 34 is a schematic view of a sensing signal output by a sensing element of the optical element driving mechanism according to some embodiments of the present disclosure.

Please refer to FIG. 34. FIG. 34 is a schematic view of a sensing signal output by the sensing element 4-52 of the optical element driving mechanism 4-100 according to some embodiments of the present disclosure.

According to some embodiments of the present disclosure, the sensing element 4-52 may output a sensing signal between a first extreme value 4-EV1 and a second extreme value 4-EV2. According to some embodiments of the present disclosure, there may be an intermediate value between the first extreme value 4-EV1 and the second extreme value 4-EV2.

According to some embodiments of the present disclosure, the stopping assembly 4-40 may be used to limit the movement of the movable part frame 4-21 relative to the fixed part 4-10 within a first moving range. The first moving range may be defined by a first position of the movable part frame 4-21 and a second position of the movable part frame 4-21.

According to some embodiments of the present disclosure, when the movable part frame 4-21 moves relative to the fixed part 4-10 within the first moving range, the sensing signal may be within a first setting range 4-SR.

According to some embodiments of the present disclosure, the first setting range 4-SR may be narrower than a first total range 4-TR. According to some embodiments of the present disclosure, the first total range 4-TR may be defined as the difference between the second extreme value 4-EV2 and the first extreme value 4-EV1.

According to some embodiments of the present disclosure, the interval of the first setting range 4-SR may include intermediate values. According to some embodiments of the present disclosure, the interval of the first setting range 4-SR may not include the first extreme value 4-EV1. According to some embodiments of the present disclosure, the interval of the first setting range 4-SR may not include the second extreme value 4-EV2.

According to some embodiments of the present disclosure, an avoidance range 4-AVR may be defined as five percent of the first total range 4-TR.

According to some embodiments of the present disclosure, an applicable range 4-APR may be defined as a value that is respectively narrowed by the first extreme value 4-EV1 and the second extreme value 4-EV2 from the avoidance range 4-AVR. For example, the applicable range 4-APR may be ten percent narrower than the first total range 4-TR.

According to some embodiments of the present disclosure, the first setting range 4-SR may be narrower than the applicable range 4-APR. According to some embodiments of the present disclosure, the first setting range 4-SR may be within the applicable range 4-APR.

According to some embodiments of the present disclosure, the first setting range 4-SR may be defined as the difference between a second setting value 4-SV2 and a first setting value 4-SV1.

According to some embodiments of the present disclosure, the first setting value 4-SV1 is within the applicable range 4-APR. According to some embodiments of the present disclosure, the second setting value 4-SV2 is within the applicable range 4-APR.

In this way, the accuracy of the sensing element 4-52 may be increased, thereby the operation of the optical element driving mechanism 4-100 is smoother.

Figure 35:
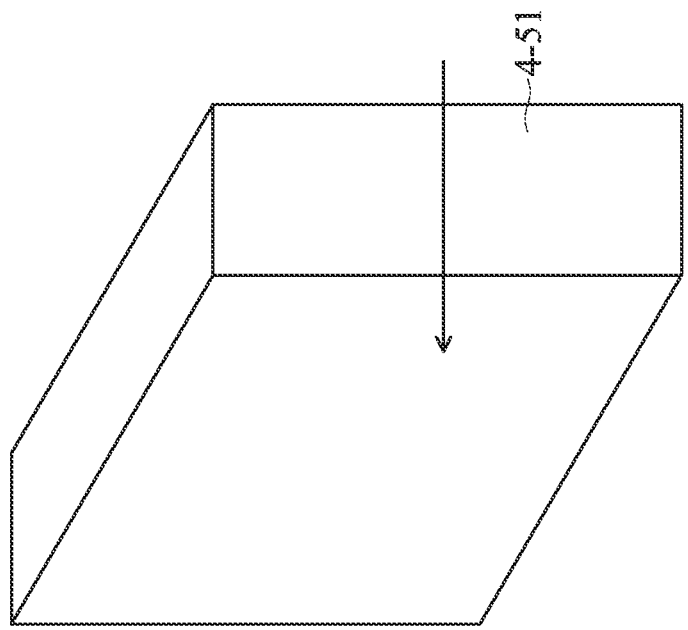
FIG. 35 is a schematic view of a reference element and the sensing element of the optical element driving mechanism according to some embodiments of the present disclosure, wherein the arrows represent the magnetic field direction.
Figure 35:
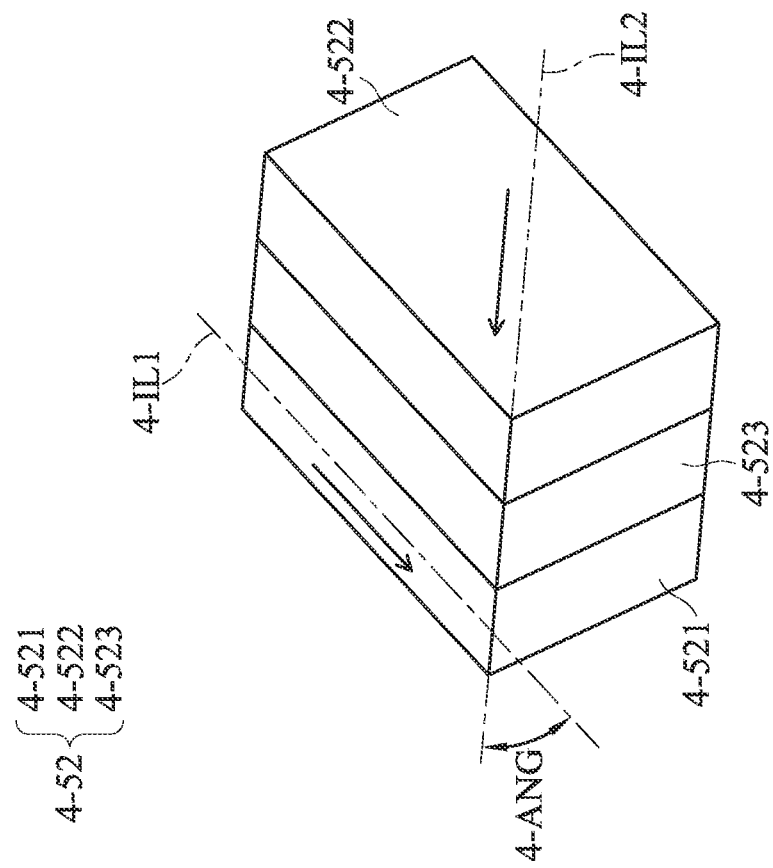

Please refer to FIG. 35. FIG. 35 is a schematic view of the reference element 4-51 and the sensing element 4-52 of the optical element driving mechanism 4-100 according to some embodiments of the present disclosure, wherein the arrows represent the magnetic field direction.

According to some embodiments of the present disclosure, the reference element 4-51 may be used to generate a first magnetic field.

According to some embodiments of the present disclosure, the sensing element 4-52 may sense the rotation of the movable frame 4-21 by sensing the change of the magnetic field direction of the first magnetic field.

According to some embodiments of the present disclosure, the sensing element 4-52 includes a first magnetoresistive sensor. For example, the sensing elements 4-52 may include a tunnel magnetoresistance (TMR) sensor, a giant magnetoresistance (GMR) sensor, and the like.

According to some embodiments of the present disclosure, the sensing element 4-52 may include a fixed layer 4-521, a free layer 4-522, and an intermediate layer 4-523.

According to some embodiments of the present disclosure, the fixed layer 4-521 may have a fixed magnetic field. The fixed magnetic field may have a fixed magnetic field direction. The free layer 4-522 may have a magnetizable material, and the free layer 4-522 may be magnetized by an ambient magnetic field (e.g., the magnetic field of the reference element 4-51). The intermediate layer 4-523 may be interposed between the fixed layer 4-521 and the free layer 4-522.

According to some embodiments of the present disclosure, when the ambient magnetic field overlaps the free layer 4-522, the free layer 4-522 may be magnetized along the magnetization direction.

According to some embodiments of the present disclosure, the magnetization direction is parallel to a first imaginary line 4-IL1, and the fixed magnetic field direction is parallel to a second imaginary line 4-IL2.

According to some embodiments of the present disclosure, when the movable part frame 4-21 is located at any position within the first moving range relative to the fixed part 4-10, the first imaginary line 4-IL1 may not be parallel to the second imaginary line 4-IL2.

According to some embodiments of the present disclosure, when the movable part frame 4-21 is located at any position within the first moving range relative to the fixed part 4-10, the included angle 4-ANG between the first imaginary line 4-IL1 and the second imaginary line 4-IL2 may be greater than 25 degrees.

According to some embodiments of the present disclosure, the included angle 4-ANG between the first imaginary line 4-IL1 and the second imaginary line 4-IL2 may be an obtuse angle. According to some embodiments of the present disclosure, the included angle 4-ANG between the first imaginary line 4-IL1 and the second imaginary line 4-IL2 may be an acute angle.

According to some embodiments of the present disclosure, no matter the included angle 4-ANG between the first imaginary line 4-IL1 and the second imaginary line 4-IL2 is an obtuse angle or an acute angle, the included angle 4-ANG between the first imaginary line 4-IL1 and the second imaginary line 4-IL2 is always greater than 25 degrees.

In this way, the accuracy of the sensing element 4-52 may be increased, thereby the operation of the optical element driving mechanism 4-100 is smoother.

Please refer to FIG. 33, the reference element 4-51 may include a magnetic pole alignment direction 4-MPAD. It should be noted that the magnetic pole alignment direction 4-MPAD may be defined as an alignment direction in which the center of a south-seeking pole faces the center of a north-seeking pole.

According to some embodiments of the present disclosure, the reference element 4-51 may not overlap the sensing element 4-52 when viewed along the first axis 4-AX1.

According to some embodiments of the present disclosure, when viewed along the first axis 4-AX1, the alignment direction of the center 4-51C of the reference element 4-51 and the center 4-52C of the sensing element 4-52 may be neither perpendicular nor parallel to the magnetic pole alignment direction 4-MPAD.

In this way, the accuracy of the sensing element 4-52 may be increased, thereby the operation of the optical element driving mechanism 4-100 is smoother. In addition, the internal space of the optical element driving mechanism 4-100 may be effectively used, thereby the effect of miniaturization is achieved.

According to some embodiments of the present disclosure, the magnetic conductive element 4-53 of the sensing assembly 4-50 may include a magnetic conductive material, and the magnetic conductive element 4-53 may correspond to the reference element 4-51.

Figure 36:
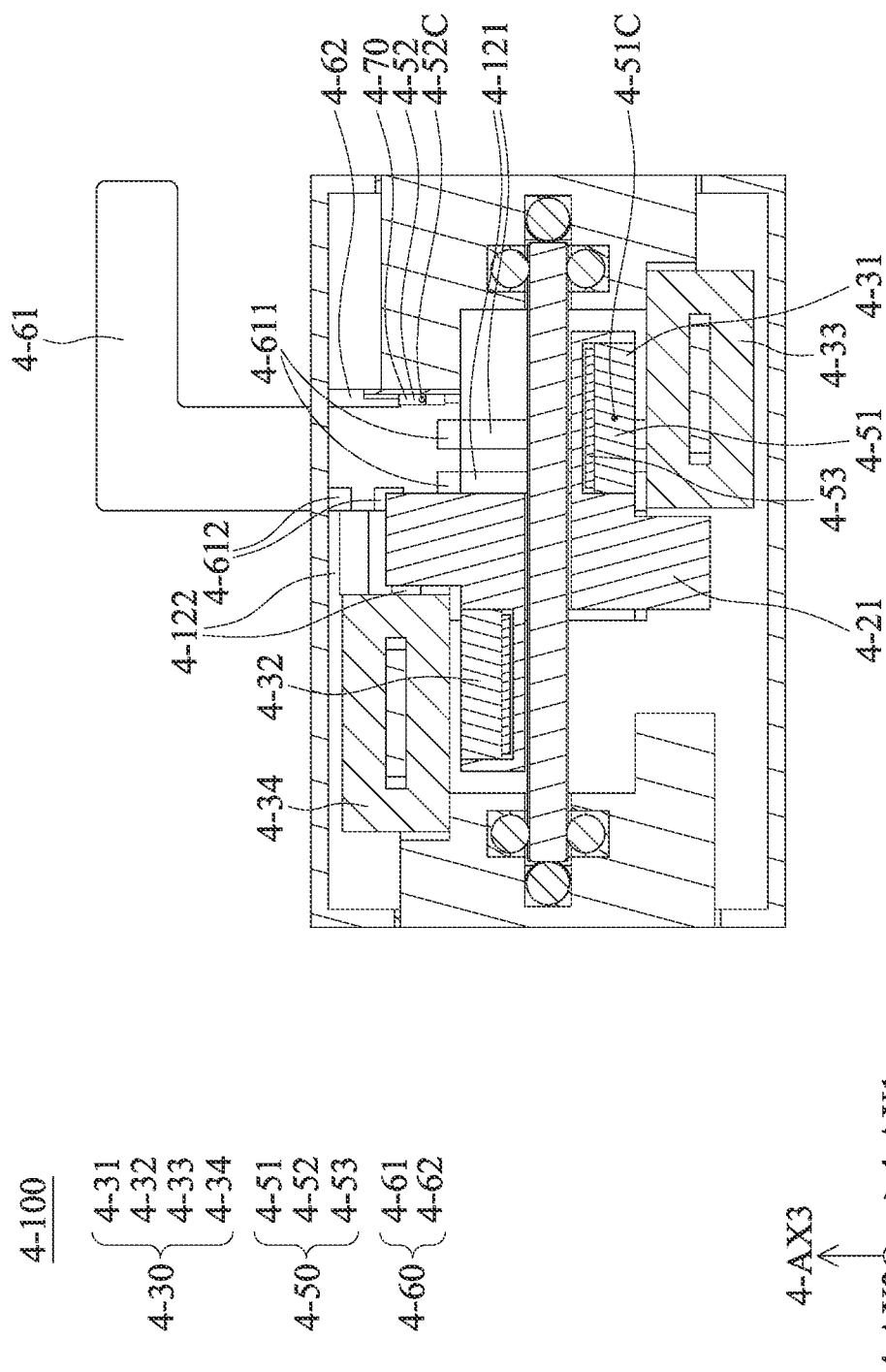
FIG. 36 is a cross-sectional view of the optical element driving mechanism along line 4-B-4-B' of FIG. 31, according to some embodiments of the present disclosure.

Please refer to FIG. 33 and FIG. 36. FIG. 36 is a cross-sectional view of the optical element driving mechanism 4-100 along line 4-B-4-B' of FIG. 31, according to some embodiments of the present disclosure.

According to some embodiments of the present disclosure, when viewed along the first axis 4-AX1, the line that connects the center 4-51C of the reference element 4-51 and the center 4-52C of the sensing element 4-52 may pass through the magnetic conductive element 4-53.

In this way, the accuracy of the sensing element 4-52 may be increased, thereby the operation of the optical element driving mechanism 4-100 is smoother. In addition, the internal space of the optical element driving mechanism 4-100 may be effectively used, thereby the effect of miniaturization is achieved.

According to some embodiments of the present disclosure, the sensing element 4-52 having an elongated structure may extend along a long axis 4-LA when viewed along the first axis 4-AX1.

According to some embodiments of the present disclosure, the long axis 4-LA may not be parallel to the magnetic pole alignment direction 4-MPAD when viewed along the first axis 4-AX1.

According to some embodiments of the present disclosure, the long axis 4-LA may not be perpendicular to the magnetic pole alignment direction 4-MPAD when viewed along the first axis 4-AX1.

According to some embodiments of the present disclosure, the long axis 4-LA may not pass through the reference element 4-51 when viewed along the first axis 4-AX1.

In this way, the accuracy of the sensing element 4-52 may be increased, thereby the operation of the optical element driving mechanism 4-100 is smoother. In addition, the internal space of the optical element driving mechanism 4-100 may be effectively used, thereby the effect of miniaturization is achieved.

Please refer to FIG. 33, according to some embodiments of the present disclosure, the driving assembly 4-30 may partially overlap the sensing element 4-52 when viewed along the first axis 4-AX1.

According to some embodiments of the present disclosure, the driving assembly 4-30 may partially overlap the sensing element 4-52 when viewed along the third axis 4-AX3.

According to some embodiments of the present disclosure, the first magnetic element 4-31 of the driving assembly 4-30 may not overlap the sensing element 4-52 when viewed along the first axis 4-AX1.

According to some embodiments of the present disclosure, the first magnetic element 4-31 may partially overlap the sensing element 4-52 of the driving assembly 4-30 when viewed along the third axis 4-AX3.

According to some embodiments of the present disclosure, the second magnetic element 4-32 of the driving assembly 4-30 may not overlap the sensing element 4-52 when viewed along the first axis 4-AX1.

According to some embodiments of the present disclosure, the second magnetic element 4-32 of the driving assembly 4-30 may not overlap the sensing element 4-52 when viewed along the third axis 4-AX3.

According to some embodiments of the present disclosure, the first coil 4-33 of the driving assembly 4-30 may not overlap the sensing element 4-52 when viewed along the first axis 4-AX1.

According to some embodiments of the present disclosure, the first coil 4-33 of the driving assembly 4-30 may partially overlap the sensing element 4-52 when viewed along the third axis 4-AX3.

According to some embodiments of the present disclosure, the second coil 4-34 of the driving assembly 4-30 may partially overlap the sensing element 4-52 when viewed along the first axis 4-AX1.

According to some embodiments of the present disclosure, the second coil 4-34 of the driving assembly 4-30 may not overlap the sensing element 4-52 when viewed along the third axis 4-AX3.

In this way, the accuracy of the sensing element 4-52 may be increased, thereby the operation of the optical element driving mechanism 4-100 is smoother. In addition, the internal space of the optical element driving mechanism 4-100 may be effectively used, thereby the effect of miniaturization is achieved.

Please refer to FIG. 33 and FIG. 36, according to some embodiments of the present disclosure, the first circuit element 4-61 may include a first circuit element first contact 4-611 and a first circuit element second contact 4-612.

According to some embodiments of the present disclosure, the first circuit element first contact 4-611 may be electrically connected to the first coil 4-33. According to some embodiments of the present disclosure, the first circuit element second contact 4-612 may be electrically connected to the second coil 4-34.

According to some embodiments of the present disclosure, the second circuit element 4-62 may include a second circuit element first contact 4-621. According to some embodiments of the present disclosure, the second circuit element first contact 4-621 may be electrically connected to the sensing assembly 4-50.

According to some embodiments of the present disclosure, the surface of the first circuit element second contact 4-612 is parallel to the surface of the first circuit element first contact 4-611.

According to some embodiments of the present disclosure, the surface of the second circuit element first contact 4-621 is not parallel to the surface of the first circuit element first contact 4-611.

Please refer to FIG. 33, according to some embodiments of the present disclosure, the base 4-12 of the fixed part 4-10 may include a first guiding groove 4-121 and a second guiding groove 4-122.

According to some embodiments of the present disclosure, the first guiding groove 4-121 may be used to accommodate a first wire (not shown) of the first coil 4-33. According to some embodiments of the present disclosure, the second guide groove 4-122 may be used to accommodate a second wire (not shown) of the second coil 4-34.

According to some embodiments of the present disclosure, the extending direction of the first guiding groove 4-121 may not be parallel to the extending direction of the second guiding groove 4-122.

According to some embodiments of the present disclosure, the first circuit element 4-61 may have a plate-like structure. According to some embodiments of the present disclosure, the second circuit element 4-62 may have a plate-like structure.

According to some embodiments of the present disclosure, the first circuit element 4-61 may not be parallel to the second circuit element 4-62. According to some embodiments of the present disclosure, the first circuit element 4-61 may be perpendicular to the second circuit element 4-62.

In this way, the internal space of the optical element driving mechanism 4-100 may be effectively utilized, thereby the effect of miniaturization is achieved.

According to some embodiments of the present disclosure, the optical element driving mechanism 4-100 may further include a control assembly 4-70.

According to some embodiments of the present disclosure, the optical element driving mechanism 4-100 may not include any detection element for sensing the movement of the movable part setting surface 4-22.

According to some embodiments of the present disclosure, the driving assembly 4-30 may receive a first driving signal output from the control assembly 4-70 to drive the movable part frame 4-21 to move relative to the fixed part 4-10.

According to some embodiments of the present disclosure, the driving assembly 4-30 may receive a second driving signal output by the control assembly 4-70 to drive the movable part setting surface 4-22 to move relative to the movable part frame 4-21.

According to some embodiments of the present disclosure, the control assembly 4-70 may include a first information. The first information may include the positional relationship of the sensing signal and the movable part frame 4-21 relative to the fixed part 4-10.

According to some embodiments of the present disclosure, the control assembly 4-70 may include a second information. The second information may include the positional relationship of the second driving signal and the movable part setting surface 4-22 relative to the movable part frame 4-21.

According to some embodiments of the present disclosure, the control assembly 4-70 may output the first driving signal according to the sensing signal and the first information.

According to some embodiments of the present disclosure, the control assembly 4-70 may be driver ICs. According to some embodiments of the present disclosure, the sensing elements 4-52 may be driving sensors.

According to some embodiments of the present disclosure, the control assembly 4-70 and the sensing element 4-52 may have an integrated structure. According to some embodiments of the present disclosure, the control assembly 4-70 and the sensing element 4-52 may be packaged into the same package (integrated circuit package).

That is, the movement of the movable part frame 4-21 in the first dimension 4-D1 (which may be regarded as the slow axis) relative to the fixed part 4-10 may be precisely controlled using the position sensor. The movement of the movable part setting surface 4-22 in the second dimension 4-D2 (which may be regarded as a fast axis) relative to the movable part frame 4-21 may be precisely controlled without using a position sensor. The amplitude of movement of the movable part setting surface 4-22 relative to the movable part frame 4-21 in the second dimension 4-D2 may be adjust according to the strength of the second driving signal.

Figure 37:
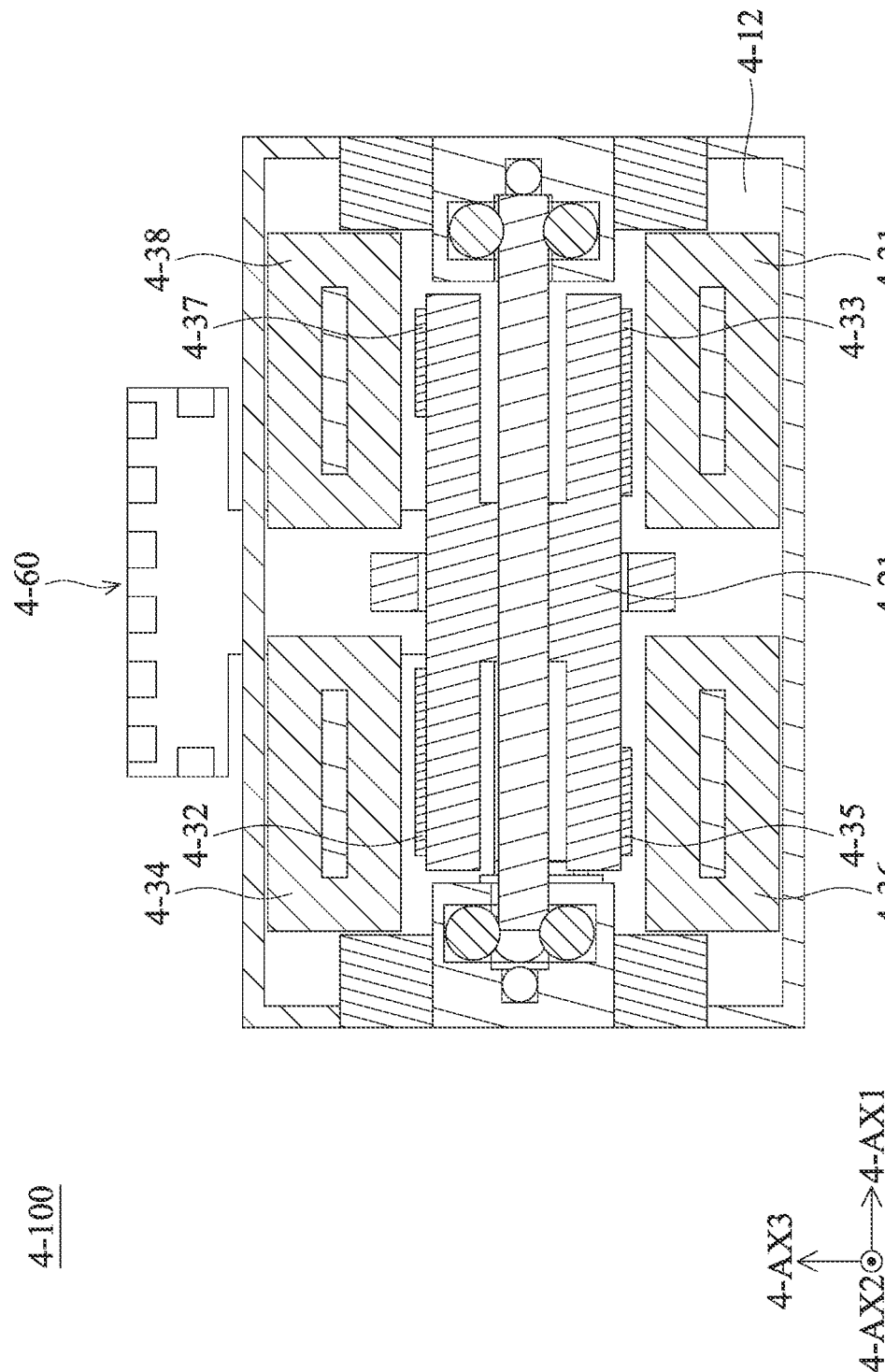
FIG. 37 is a schematic view of a modified embodiment of the optical element driving mechanism according to FIG. 33.

Please refer to FIG. 37, FIG. 37 is a schematic view of a modified embodiment of the optical element driving mechanism 4-100 according to FIG. 33.

As shown in FIG. 37, according to some embodiments of the present disclosure, the driving assembly 4-30 may further include a third magnetic element 4-35, a third coil 4-36, a fourth magnetic element 4-37, and A fourth coil 4-38.

According to some embodiments of the present disclosure, the third magnetic element 4-35 may correspond to the third coil 4-36. According to some embodiments of the present disclosure, the fourth magnetic element 4-37 may correspond to the fourth coil 4-38.

According to some embodiments of the present disclosure, the first magnetic element 4-31 may correspond to the first coil 4-33. According to some embodiments of the present disclosure, the second magnetic element 4-32 may correspond to the second coil 4-34.

According to some embodiments of the present disclosure, the first magnetic element 4-31 may be fixedly disposed on the movable part frame 4-21. According to some embodiments of the present disclosure, the second magnetic element 4-32 may be fixedly disposed on the movable part frame 4-21.

According to some embodiments of the present disclosure, the third magnetic element 4-35 may be fixedly disposed on the movable part frame 4-21. According to some embodiments of the present disclosure, the fourth magnetic element 4-37 may be fixedly disposed on the movable part frame 4-21.

According to some embodiments of the present disclosure, the first coil 4-33 may be fixedly disposed on the base 4-12 of the fixed part 4-10. According to some embodiments of the present disclosure, the second coil 4-34 may be fixedly disposed on the base 4-12 of the fixed part 4-10.

According to some embodiments of the present disclosure, the third coil 4-36 may be fixedly disposed on the base 4-12 of the fixed part 4-10. According to some embodiments of the present disclosure, the fourth coil 4-38 may be fixedly disposed on the base 4-12 of the fixed part 4-10.

According to some embodiments of the present disclosure, the first coil 4-33 may be electrically independent from the third coil 4-36. According to some embodiments of the present disclosure, the first coil 4-33 may be electrically connected to the second coil 4-34.

According to some embodiments of the present disclosure, the second coil 4-34 may be electrically independent from the fourth coil 4-38. According to some embodiments of the present disclosure, the third coil 4-36 may be electrically connected to the fourth coil 4-38.

According to some embodiments of the present disclosure, the first coil 4-33 may receive the first driving signal to drive the movable part frame 4-21 to move relative to the fixed part 4-10.

According to some embodiments of the present disclosure, the third coil 4-36 may receive the second driving signal to drive the movable part setting surface 4-22 to move relative to the movable part frame 4-21.

According to some embodiments of the present disclosure, the first driving signal may have a first frequency. According to some embodiments of the present disclosure, the second driving signal may have a second frequency.

According to some embodiments of the present disclosure, the second frequency may be different from the first frequency. According to some embodiments of the present disclosure, the second frequency may be greater than the first frequency.

According to some embodiments of the present disclosure, the first coil 4-33 may receive the first driving signal to generate a first driving force.

According to some embodiments of the present disclosure, the third coil 4-36 may receive the second driving signal to generate a second driving force.

According to some embodiments of the present disclosure, the first driving force may be applied to the movable part frame 4-21. According to some embodiments of the present disclosure, the second driving force may be applied to the movable part frame 4-21.

According to some embodiments of the present disclosure, the strength of the first driving force may be limited within a first range. According to some embodiments of the present disclosure, the strength of the second driving force may be limited within a second range.

According to some embodiments of the present disclosure, the maximum value of the first range and the maximum value of the second range may be different. According to some embodiments of the present disclosure, the maximum value of the first range may be greater than the maximum value of the second range.

According to some embodiments of the present disclosure, the volume of the first magnetic element 4-31 may be different from the volume of the third magnetic element 4-35. According to some embodiments of the present disclosure, the volume of the first magnetic element 4-31 may be greater than the volume of the third magnetic element 4-35.

According to some embodiments of the present disclosure, the volume of the first magnetic element 4-31 may be different from the volume of the fourth magnetic element 4-37. According to some embodiments of the present disclosure, the volume of the first magnetic element 4-31 may be greater than the volume of the fourth magnetic element 4-37.

According to some embodiments of the present disclosure, the volume of the second magnetic element 4-32 may be different from the volume of the third magnetic element 4-35. According to some embodiments of the present disclosure, the volume of the second magnetic element 4-32 may be greater than the volume of the third magnetic element 4-35.

According to some embodiments of the present disclosure, the volume of the second magnetic element 4-32 may be different from the volume of the fourth magnetic element 4-37. According to some embodiments of the present disclosure, the volume of the second magnetic element 4-32 may be greater than the volume of the fourth magnetic element 4-37.

According to some embodiments of the present disclosure, the volume of the first magnetic element 4-31 may be the same as the volume of the second magnetic element 4-32.

According to some embodiments of the present disclosure, the volume of the third magnetic element 4-35 may be the same as the volume of the fourth magnetic element 4-37.

In this way, the driving force of the driving assembly 4-30 may be effectively enhanced, and the effect of miniaturization may be achieved.

According to some embodiments of the present disclosure, the first magnetic element 4-31 may not overlap the second magnetic element 4-32 when viewed along the first axis 4-AX1.

According to some embodiments of the present disclosure, the first magnetic element 4-31 may at least partially overlap the third magnetic element 4-35 when viewed along the first axis 4-AX1.

According to some embodiments of the present disclosure, the first magnetic element 4-31 may not overlap the fourth magnetic element 4-37 when viewed along the first axis 4-AX1.

According to some embodiments of the present disclosure, the second magnetic element 4-32 may not overlap the third magnetic element 4-35 when viewed along the first axis 4-AX1.

According to some embodiments of the present disclosure, the second magnetic element 4-32 may at least partially overlap the fourth magnetic element 4-37 when viewed along the first axis 4-AX1.

According to some embodiments of the present disclosure, the third magnetic element 4-35 may not overlap the fourth magnetic element 4-37 when viewed along the first axis 4-AX1.

According to some embodiments of the present disclosure, the first magnetic element 4-31 may not overlap the second magnetic element 4-32 when viewed along the third axis 4-AX3.

According to some embodiments of the present disclosure, the first magnetic element 4-31 may not overlap the third magnetic element 4-35 when viewed along the third axis 4-AX3.

According to some embodiments of the present disclosure, the first magnetic element 4-31 may at least partially overlap the fourth magnetic element 4-37 when viewed along the third axis 4-AX3.

According to some embodiments of the present disclosure, the second magnetic element 4-32 may at least partially overlap the third magnetic element 4-35 when viewed along the third axis 4-AX3.

According to some embodiments of the present disclosure, the second magnetic element 4-32 may not overlap the fourth magnetic element 4-37 when viewed along the third axis 4-AX3.

According to some embodiments of the present disclosure, the third magnetic element 4-35 may not overlap the fourth magnetic element 4-37 when viewed along the third axis 4-AX3.

According to some embodiments of the present disclosure, when viewed along the second axis 4-AX2, the first magnetic element 4-31, the second magnetic element 4-32, the third magnetic element 4-35, and the fourth magnetic element 4-37 may not overlap each other.

In this way, the driving force of the driving assembly 4-30 may be effectively enhanced, and the effect of miniaturization may be achieved.

According to some embodiments of the present disclosure, when viewed along the first axis 4-AX1, the first magnetic element 4-31 may not overlap the first coil 4-33, the second coil 4-34, the third coil 4-36, and the fourth coil 4-38.

According to some embodiments of the present disclosure, when viewed along the first axis 4-AX1, the second magnetic element 4-32 may not overlap the first coil 4-33, the second coil 4-34, the third coil 4-36, and the fourth coil 4-38.

According to some embodiments of the present disclosure, when viewed along the first axis 4-AX1, the third magnetic element 4-35, the first coil 4-33, the second coil 4-34, the third coil 4-36 and the fourth coil 4-38 may not overlap.

According to some embodiments of the present disclosure, when viewed along the first axis 4-AX1, the fourth magnetic element 4-37 may not overlap the first coil 4-33, the second coil 4-34, the third coil 4-36, and the fourth coil 4-38.

According to some embodiments of the present disclosure, when viewed along the third axis 4-AX3, the first magnetic element 4-31 may partially overlap the first coil 4-33 and the fourth coil 4-38.

According to some embodiments of the present disclosure, when viewed along the third axis 4-AX3, the first magnetic element 4-31 may not overlap the second coil 4-34 and the third coil 4-36.

According to some embodiments of the present disclosure, when viewed along the third axis 4-AX3, the second magnetic element 4-32 may not overlap the first coil 4-33 and the fourth coil 4-38.

According to some embodiments of the present disclosure, when viewed along the third axis 4-AX3, the second magnetic element 4-32 may partially overlap the second coil 4-34 and the third coil 4-36.

According to some embodiments of the present disclosure, when viewed along the third axis 4-AX3, the third magnetic element 4-35 may not overlap the first coil 4-33 and the fourth coil 4-38.

According to some embodiments of the present disclosure, when viewed along the third axis 4-AX3, the third magnetic element 4-35 may partially overlap the second coil 4-34 and the third coil 4-36.

According to some embodiments of the present disclosure, when viewed along the third axis 4-AX3, the fourth magnetic element 4-37 may partially overlap the first coil 4-33 and the fourth coil 4-38.

According to some embodiments of the present disclosure, when viewed along the third axis 4-AX3, the fourth magnetic element 4-37 may not overlap the second coil 4-34 and the third coil 4-36.

According to some embodiments of the present disclosure, when viewed along the second axis 4-AX2, the first magnetic element 4-31 may not overlap the first coil 4-33, the second coil 4-34, the third coil 4-36, and the fourth coil 4-38.

According to some embodiments of the present disclosure, when viewed along the second axis 4-AX2, the second magnetic element 4-32 may not overlap the first coil 4-33, the second coil 4-34, the third coil 4-36, and the fourth coil 4-38.

According to some embodiments of the present disclosure, when viewed along the second axis 4-AX2, the third magnetic element 4-35 may not overlap the first coil 4-33, the second coil 4-34, the third coil 4-36, and the fourth coil 4-38.

According to some embodiments of the present disclosure, when viewed along the second axis 4-AX2, the fourth magnetic element 4-37 may not overlap the first coil 4-33, the second coil 4-34, the third coil 4-36, and the fourth coil 4-38.

In this way, the driving force of the driving assembly 4-30 may be effectively enhanced, and the effect of miniaturization may be achieved.

According to some embodiments of the present disclosure, the first coil 4-33 may not overlap the second coil 4-34 when viewed along the first axis 4-AX1.

According to some embodiments of the present disclosure, the first coil 4-33 may at least partially overlap the third coil 4-36 when viewed along the first axis 4-AX1.

According to some embodiments of the present disclosure, the first coil 4-33 may not overlap the fourth coil 4-38 when viewed along the first axis 4-AX1.

According to some embodiments of the present disclosure, the second coil 4-34 may not overlap the third coil 4-36 when viewed along the first axis 4-AX1.

According to some embodiments of the present disclosure, the second coil 4-34 may at least partially overlap the fourth coil 4-38 when viewed along the first axis 4-AX1.

According to some embodiments of the present disclosure, the third coil 4-36 may not overlap the fourth coil 4-38 when viewed along the first axis 4-AX1.

According to some embodiments of the present disclosure, the first coil 4-33 may not overlap the second coil 4-34 when viewed along the third axis 4-AX3.

According to some embodiments of the present disclosure, the first coil 4-33 may not overlap the third coil 4-36 when viewed along the third axis 4-AX3.

According to some embodiments of the present disclosure, the first coil 4-33 may at least partially overlap the fourth coil 4-38 when viewed along the third axis 4-AX3.

According to some embodiments of the present disclosure, the second coil 4-34 may at least partially overlap the third coil 4-36 when viewed along the third axis 4-AX3.

According to some embodiments of the present disclosure, the second coil 4-34 may not overlap the fourth coil 4-38 when viewed along the third axis 4-AX3.

According to some embodiments of the present disclosure, the third coil 4-36 may not overlap the fourth coil 4-38 when viewed along the third axis 4-AX3.

According to some embodiments of the present disclosure, when viewed along the second axis 4-AX2, the first coil 4-33, the second coil 4-34, the third coil 4-36, and the fourth coil 4-38 may not overlap each other.

In this way, the driving force of the driving assembly 4-30 may be effectively enhanced, and the effect of miniaturization may be achieved.

In general, the optical element driving mechanism of the embodiment of the present disclosure may increase the accuracy of the sensing element, thereby the operation of the optical element driving mechanism is smoother. In addition, the internal space of the optical element driving mechanism may be effectively used, thereby the effect of miniaturization is achieved. In addition, the driving force of the driving assembly may be effectively enhanced, so that the desired function may be achieved by using a smaller current.

Embodiment Group 5

Figure 38:
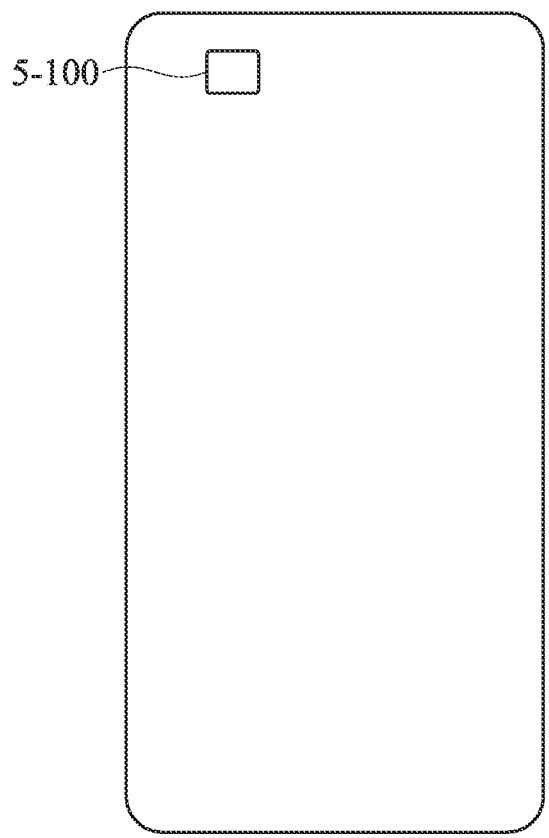
FIG. 38 is a schematic view of an electrical device according to some embodiment of the present disclosure.

Firstly, please refer to FIG. 38, FIG. 38 is a schematic view of an electrical device 5-1 according to some embodiment of the present disclosure. As shown in FIG. 38, an optical element driving mechanism 5-100 of some embodiment of the present disclosure may be mounted in an electrical device 5-1 for taking photos or videos, wherein the aforementioned electrical device 5-1 may, for example, be a smartphone or a digital camera, but the present disclosure is not limited to these. It should be noted that the position and the size between the optical element driving mechanism 5-100 and the electrical device 5-1 shown in FIG. 38 are only an example, which is not for limiting the position and the size between the optical element driving mechanism 5-100 and the electrical device 5-1. In fact, according to different needs, the optical element driving mechanism 5-100 may be mounted at different positions in the electrical device 5-1

Figure 39:
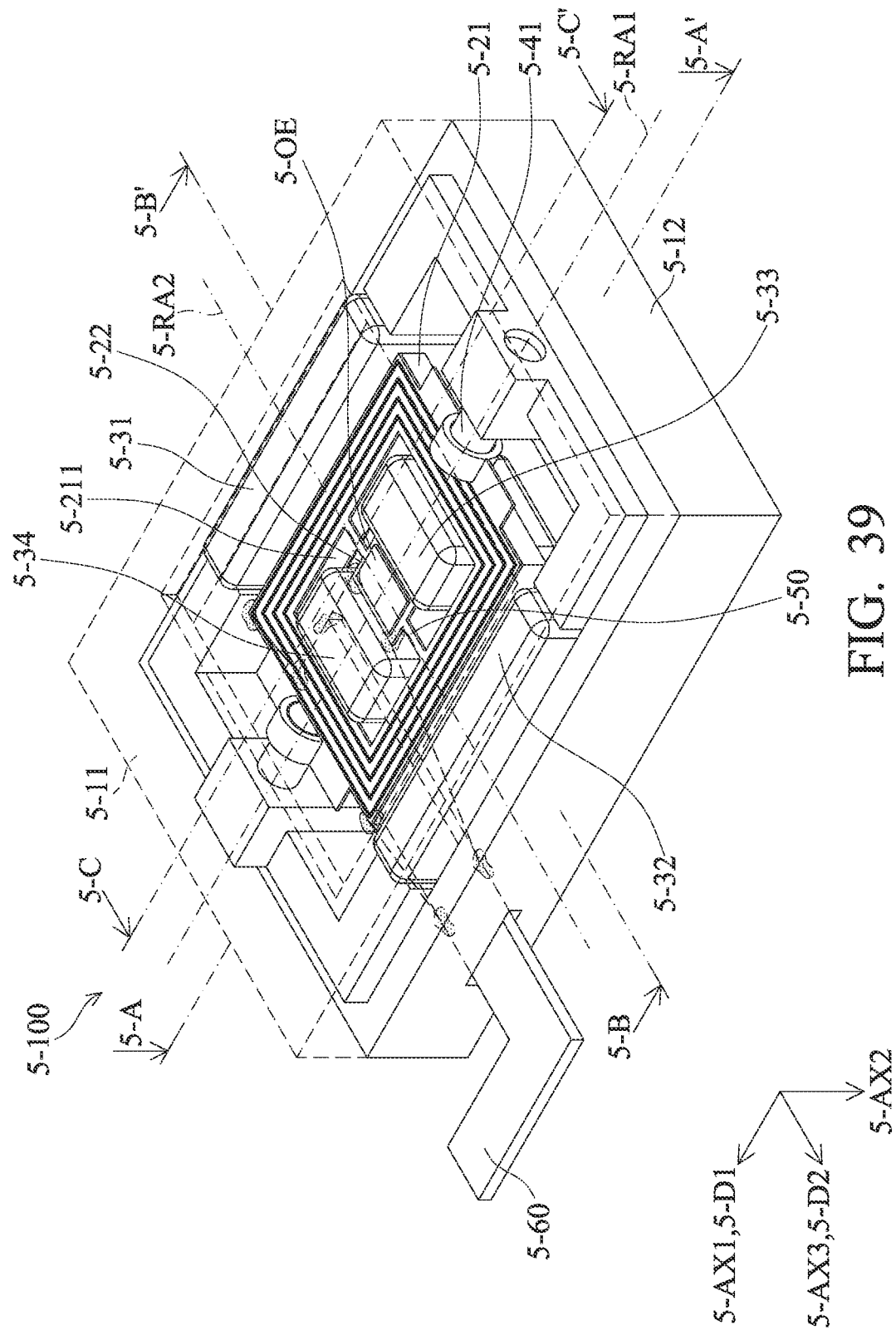
FIG. 39 is a schematic view of an optical element driving mechanism and an optical element according to some embodiments of the present disclosure, wherein an outer frame is shown as a dashed line.
Figure 40:
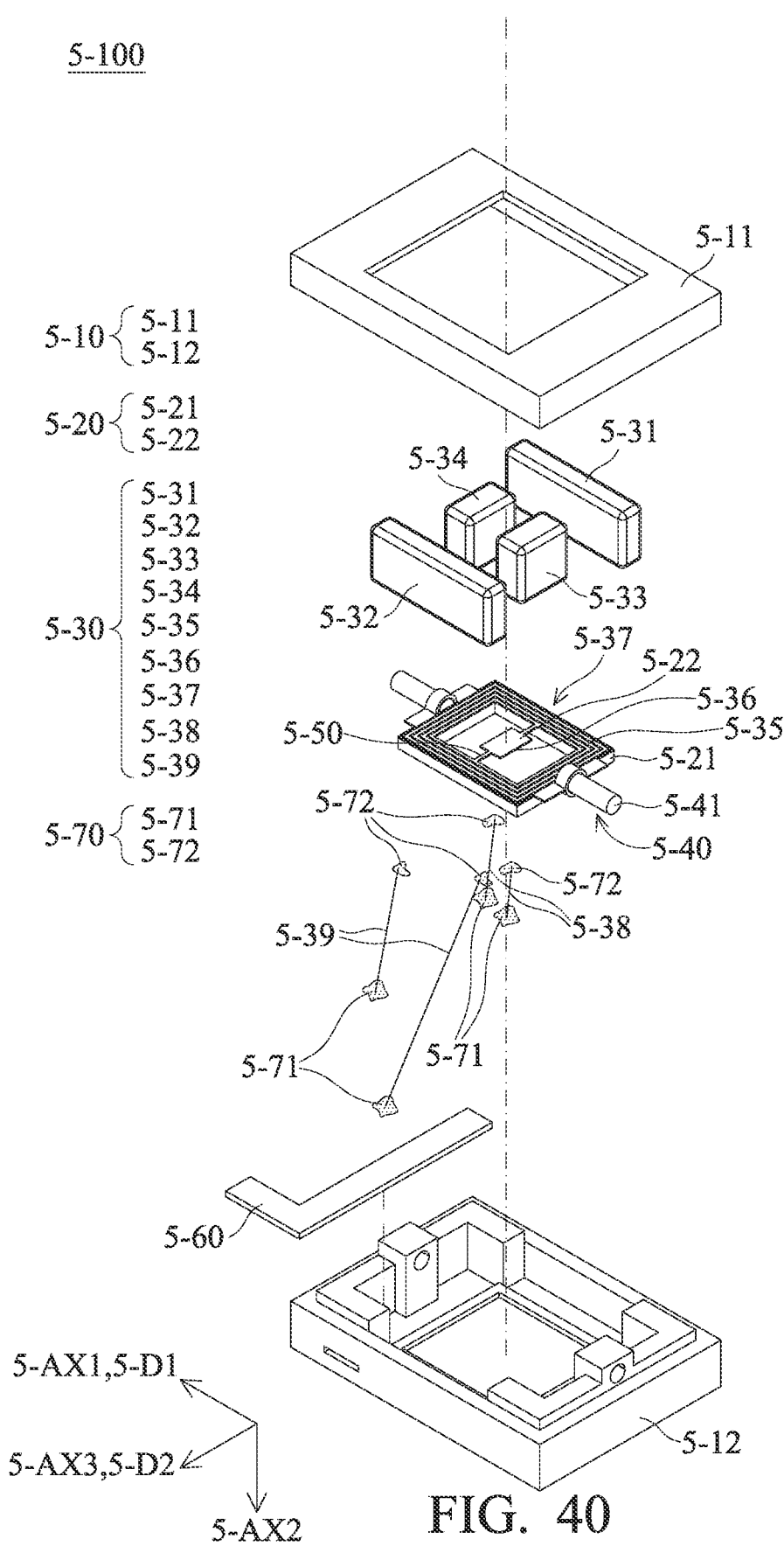
FIG. 40 is an exploded view of the optical element driving mechanism according to some embodiments of the present disclosure.

Please refer to FIG. 39. FIG. 39 is a schematic view of the optical element driving mechanism 5-100 and an optical element 5-OE according to some embodiments of the present disclosure, wherein the outer frame is shown as a dashed line. FIG. 40 is an exploded view of the optical element driving mechanism 5-100 according to some embodiments of the present disclosure.

As shown in FIG. 39 and FIG. 40, the optical element driving mechanism 5-100 may include a fixed part 5-10, a movable part 5-20, a driving assembly 5-30, a first supporting assembly 5-40, a second supporting assembly 5-50, a circuit assembly 5-60, and a buffering element 5-70.

The movable part 5-20 may move relative to the fixed part 5-10, and the driving assembly 5-30 may drive the movable part 5-20 to move relative to the fixed part 5-10. The movable part 5-20 may be connected with an optical element 5-OE, and the movable part 5-20 may move relative to the fixed part 5-10 through the support of the first supporting assembly 5-40.

According to some embodiments of the present disclosure, the first supporting assembly 5-40 may be at least partially located between the movable part 5-20 and the fixed part 5-10. According to some embodiments of the present disclosure, the driving assembly 5-30 may be used to drive the movable part 5-20 to move in a first dimension 5-D1.

The fixed part 5-10 may include an outer frame 5-11, and a base 5-12. The outer frame 5-11 may be disposed on the base 5-12, so as to form an inner space, and the inner space may accommodate the elements of the optical element driving mechanism 5-100.

The movable part 5-20 may include a movable part frame 5-21, and a movable part setting surface 5-22. According to some embodiments of the present disclosure, the movable part setting surface 5-22 may correspond to the optical element 5-OE.

According to some embodiments of the present disclosure, the movable part setting surface 5-22 may be parallel to a first axis 5-AX1. According to some embodiments of the present disclosure, the movable part setting surface 5-22 may be perpendicular to a second axis 5-AX2. According to some embodiments of the present disclosure, the movable part setting surface 5-22 may be parallel to a third axis 5-AX3.

According to some embodiments of the present disclosure, the first axis 5-AX1 may be perpendicular to the second axis 5-AX2. According to some embodiments of the present disclosure, the first axis 5-AX1 may be perpendicular to the third axis 5-AX3. According to some embodiments of the present disclosure, the second axis 5-AX2 may be perpendicular to the third axis 5-AX3.

According to some embodiments of the present disclosure, the optical element driving mechanism 5-100 may have an elongated structure when viewed along the second axis 5-AX2. According to some embodiments of the present disclosure, the optical element driving mechanism 5-100 may extend along the first axis 5-AX1.

According to some embodiments of the present disclosure, the driving assembly 5-30 may be used to drive the optical element 5-OE to move relative to the fixed part 5-10 in the first dimension 5-D1.

According to some embodiments of the present disclosure, the driving assembly 5-30 may be used to drive the movable part frame 5-21 to move relative to the fixed part 5-10 in the first dimension 5-D1.

According to some embodiments of the present disclosure, the first dimension 5-D1 may be a rotation about a first rotation axis 5-RA1. According to some embodiments of the present disclosure, the first rotation axis 5-RA1 may be parallel to the first axis 5-AX1.

According to some embodiments of the present disclosure, the driving assembly 5-30 may be used to drive the movable part setting surface 5-22 of the movable part 5-20 to move relative to the movable part frame 5-21 in a second dimension 1-D2.

According to some embodiments of the present disclosure, the driving assembly 5-30 may be used to drive the optical element 5-OE to move in the second dimension 1-D2.

According to some embodiments of the present disclosure, the second dimension 1-D2 is different from the first dimension 5-D1. According to some embodiments of the present disclosure, the second dimension 1-D2 may be perpendicular to the first dimension 5-D1.

According to some embodiments of the present disclosure, the second dimension 1-D2 may be a rotation about a second rotation axis 5-RA2. According to some embodiments of the present disclosure, the second axis 5-RA2 may be parallel to the third axis 5-AX3.

According to some embodiments of the present disclosure, the driving assembly 5-30 may include a first magnetic element 5-31, a second magnetic element 5-32, a third magnetic element 5-33, a fourth magnetic element 5-34, s first coil assembly 5-35, a second coil assembly 5-36, a driving assembly substrate 5-37, a first electrical connection element 5-38, and a second electrical connection element 5-39.

According to some embodiments of the present disclosure, the first supporting assembly 5-40 may include a first supporting element 5-41. According to some embodiments of the present disclosure, the circuit assembly 5-60 may be electrically connected to the driving assembly 5-30 to electrically connect the driving assembly 5-30 to an external circuit.

According to some embodiments of the present disclosure, the optical element 5-OE may move relative to the movable part 5-20 via the second supporting assembly 5-50. According to some embodiments of the present disclosure, the optical element 5-OE may move relative to the movable part frame 5-21 via the second supporting assembly 5-50. According to some embodiments of the present disclosure, the movable part setting surface 5-22 is movable relative to the movable part frame 5-21 via the second supporting assembly 5-50.

According to some embodiments of the present disclosure, the buffering element 5-70 may include a first buffering element 5-71 and a second buffering element 5-72.

Figure 41:
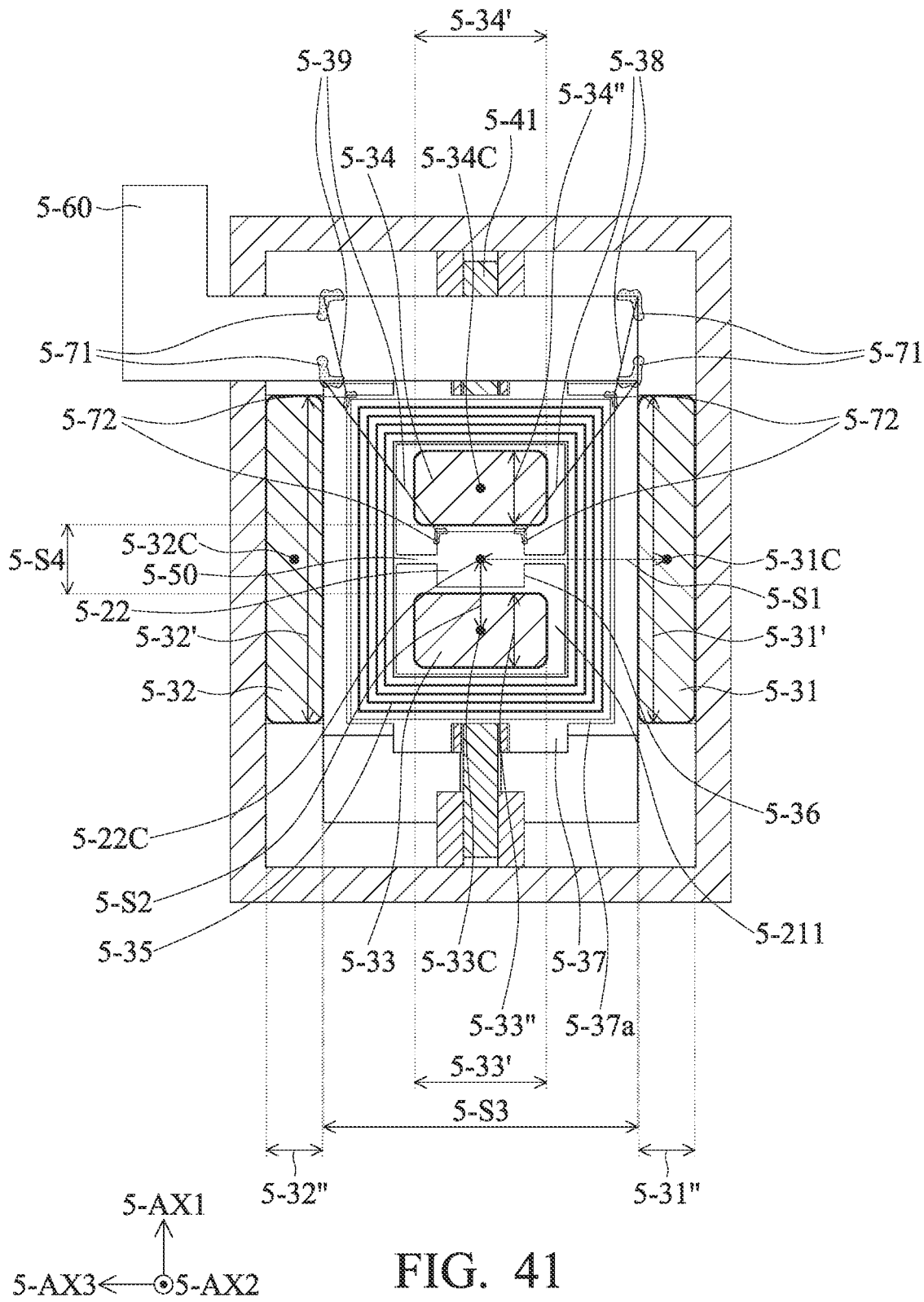
FIG. 41 is a cross-sectional view of the optical element driving mechanism along line 5-A-5-A' of FIG. 39, according to some embodiments of the present disclosure.
Figure 42:
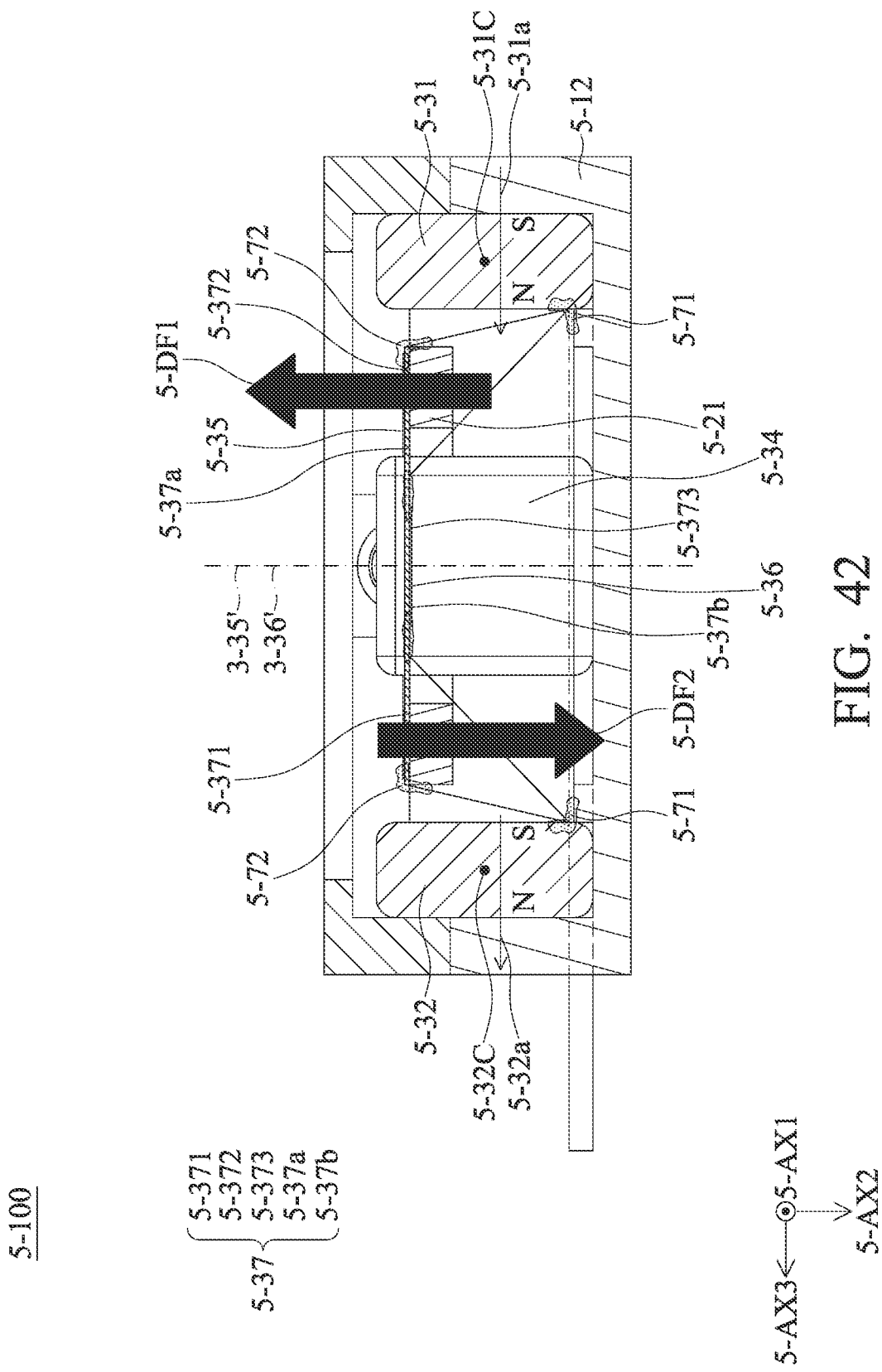
FIG. 42 is a cross-sectional view of the optical element driving mechanism along line 5-B-5-B' of FIG. 39, according to some embodiments of the present disclosure.

Please refer to FIG. 41 and FIG. 42, FIG. 41 is a cross-sectional view of the optical element driving mechanism 5-100 along line 5-A-5-A' of FIG. 39, according to some embodiments of the present disclosure; FIG. 42 is a cross-sectional view of the optical element driving mechanism 5-100 along line 5-B-5-B' of FIG. 39, according to some embodiments of the present disclosure.

As shown in FIG. 41 and FIG. 42, according to some embodiments of the present disclosure, the first coil assembly 5-35 may correspond to the first magnetic element 5-31. According to some embodiments of the present disclosure, the first coil assembly 5-35 may be disposed adjacent to the first magnetic element 5-31.

According to some embodiments of the present disclosure, the second magnetic element 5-32 may correspond to the first coil assembly 5-35. According to some embodiments of the present disclosure, the second magnetic element 5-32 may be disposed adjacent to the first coil assembly 5-35.

According to some embodiments of the present disclosure, the second coil assembly 5-36 may correspond to the third magnetic element 5-33. According to some embodiments of the present disclosure, the second coil assembly 5-36 may be disposed adjacent to the third magnetic element 5-33.

According to some embodiments of the present disclosure, the fourth magnetic element 5-34 may correspond to the second coil assembly 5-36. According to some embodiments of the present disclosure, the fourth magnetic element 5-34 may be disposed adjacent to the second coil assembly 5-36.

Please refer to FIG. 41 and FIG. 42, according to some embodiments of the present disclosure, the first magnetic element 5-31 may be used to correspond to the movable part frame 5-21 of the movable part 5-20 to generate a first driving force 5-DF1. The first driving force 5-DF1 may be represented by an arrow.

According to some embodiments of the present disclosure, the first driving force 5-DF1 may be used to move the movable part frame 5-21 relative to the fixed part 5-10 in the first dimension 5-D1.

According to some embodiments of the present disclosure, the second magnetic element 5-32 may be used to generate a second driving force 5-DF2 to the movable part frame 5-21. The second driving force 5-DF2 may be represented by an arrow.

As shown in FIG. 41 and FIG. 42, according to some embodiments of the present disclosure, the second driving force 5-DF2 may be used to move the movable part frame 5-21 relative to the fixed part 5-10 in the first dimension 5-D1.

According to some embodiments of the present disclosure, the direction of the first driving force 5-DF1 may be parallel to the direction of the second driving force 5-DF2.

According to some embodiments of the present disclosure, the magnetic pole alignment direction 5-31a (for example, the direction from the south-seeking pole to the north-seeking pole) of the first magnetic element 5-31 and the magnetic pole alignment direction 5-32a (for example, the direction from the south-seeking pole to the north-seeking pole) of the second magnetic element 5-32 may be the same.

For example, according to some embodiments of the present disclosure, the magnetic pole alignment direction 5-31a of the first magnetic element 5-31 may be the positive direction of the third axis 5-AX3; and the magnetic pole alignment direction 5-32a of the second magnetic element 5-32 may also be the positive direction of the third axis 5-AX3.

For example, according to some embodiments of the present disclosure, the magnetic pole alignment direction 5-31a of the first magnetic element 5-31 may be the opposite direction of the third axis 5-AX3; and the magnetic pole alignment direction 5-32a of the second magnetic element 5-32 may also be the opposite direction of the third axis 5-AX3.

Please refer to FIG. 39, FIG. 41 and FIG. 42, according to some embodiments of the present disclosure, the first magnetic element 5-31 and the second magnetic element 5-32 may be located at the two opposite sides of the optical element 5-OE when viewed along the second axis 5-AX2.

According to some embodiments of the present disclosure, the first magnetic element 5-31 and the second magnetic element 5-32 may be located at the two opposite sides of the first rotation axis 5-RA1 when viewed along the second axis 5-AX2.

According to some embodiments of the present disclosure, the line that connects the center 5-31C of the first magnetic element 5-31 and the center 5-32C of the second magnetic element 5-32 may pass through the optical element 5-OE when viewed along the second axis 5-AX2.

In this way, the driving assembly 5-30 may drive the optical element 5-OE to move along the first rotation axis 5-RA1 more effectively, thereby making the operation of the optical element driving mechanism 5-100 smoother.

Figure 43:
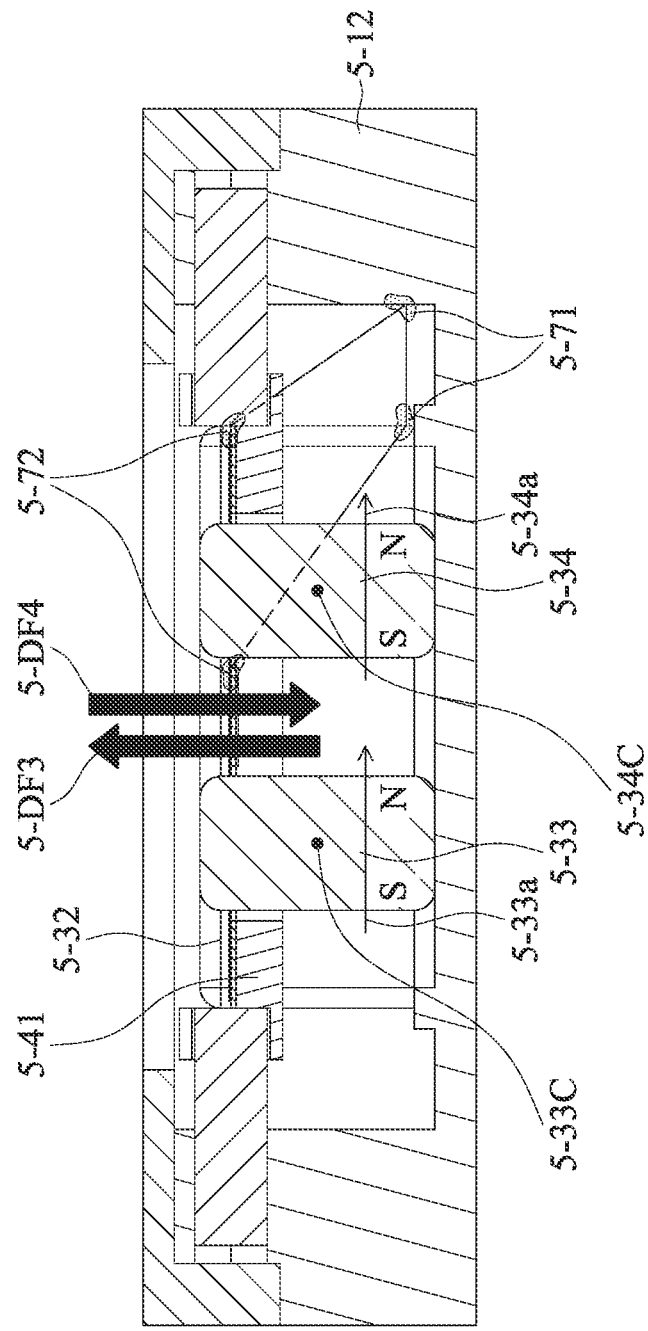
FIG. 43 is a cross-sectional view of the optical element driving mechanism along line 5-C-5-C' of FIG. 39, according to some embodiments of the present disclosure.

Please refer to FIG. 41 and FIG. 43, FIG. 43 is a cross-sectional view of the optical element driving mechanism 5-100 along line 5-C-5-C' of FIG. 39, according to some embodiments of the present disclosure.

As shown in FIG. 41 and FIG. 43, according to some embodiments of the present disclosure, the third magnetic element 5-33 may be used to generate a third driving force 5-DF3 to the movable part setting surface 5-22 of the movable part 5-20. The third driving force 5-DF3 is represented by an arrow.

According to some embodiments of the present disclosure, the third driving force 5-DF3 may be used to move the movable part setting surface 5-22 relative to the movable part frame 5-21 in the second dimension 1-D2.

According to some embodiments of the present disclosure, the fourth magnetic element 5-34 may be used to generate a fourth driving force 5-DF4 to the movable part setting surface 5-22. The fourth driving force 5-DF4 is represented by an arrow.

According to some embodiments of the present disclosure, the fourth driving force 5-DF4 may be used to move the movable part setting surface 5-22 relative to the movable part frame 5-21 in the second dimension 1-D2.

Please refer to FIG. 41 and FIG. 43, according to some embodiments of the present disclosure, the direction of the third driving force 5-DF3 may be parallel to the direction of the fourth driving force 5-DF4.

According to some embodiments of the present disclosure, the magnetic pole alignment direction 5-33a (for example, the direction from the south-seeking pole to the north-seeking pole) of the third magnetic element 5-33 and the magnetic pole alignment direction 5-34a (for example, the direction from the south-seeking pole to the north-seeking pole) of the fourth magnetic element 5-34 may be the same.

For example, according to some embodiments of the present disclosure, the magnetic pole alignment direction 5-33a of the third magnetic element 5-33 may be the positive direction of the first axis 5-AX1; and the magnetic pole alignment direction 5-34a of the fourth magnetic element 5-34 may also be the positive direction of the first axis 5-AX1.

For example, according to some embodiments of the present disclosure, the magnetic pole alignment direction 5-33a of the third magnetic element 5-33 may be the opposite direction of the first axis 5-AX1; and the magnetic pole alignment direction 5-34a of the fourth magnetic element 5-34 may also be the opposite direction of the first axis 5-AX1.

As shown in FIG. 41 and FIG. 43, according to some embodiments of the present disclosure, the third magnetic element 5-33 and the fourth magnetic element 5-34 may be located at the opposite sides of the optical element OE when viewed along the second axis 5-AX2.

According to some embodiments of the present disclosure, the third magnetic element 5-33 and the fourth magnetic element 5-34 may be located at the opposite sides of the second rotation axis 5-RA2 when viewed along the second axis 5-AX2.

According to some embodiments of the present disclosure, the line that connects the center 5-33C of the third magnetic element 5-33 and the center 5-34C of the fourth magnetic element 5-34 may pass through the optical element 5-OE when viewed along the second axis 5-AX2.

In this way, the driving assembly 5-30 may drive the optical element 5-OE to move along the second rotation axis 5-RA2 more effectively, thereby making the operation of the optical element driving mechanism 5-100 smoother.

Please refer to FIG. 42 and FIG. 43, according to some embodiments of the present disclosure, the direction of the first driving force 5-DF1 may be parallel to the direction of the third driving force 5-DF3.

Please refer to FIG. 41, FIG. 42 and FIG. 43, according to some embodiments of the present disclosure, the magnetic pole alignment direction 5-31a of the first magnetic element 5-31 may not be parallel to the magnetic pole alignment direction 5-33a of the third magnetic element 5-33.

According to some embodiments of the present disclosure, the magnetic pole alignment direction 5-31a of the first magnetic element 5-31 may be perpendicular to the magnetic pole alignment direction 5-33a of the third magnetic element 5-33.

As shown in FIG. 41, FIG. 42 and FIG. 43, according to some embodiments of the present disclosure, the alignment direction of the center 5-31C of the first magnetic element 5-31 and the center 5-32C of the second magnetic element 5-32 may not be parallel to the alignment direction of the center 5-33C of the third magnetic element 5-33 and the center 5-34C of the fourth magnetic element 5-34.

According to some embodiments of the present disclosure, the alignment direction of the center 5-31C of the first magnetic element 5-31 and the center 5-32C of the second magnetic element 5-32 may be perpendicular to the alignment direction of the center 5-33C of the third magnetic element 5-33 and the center 5-34C of the fourth magnetic element 5-34.

Please refer to FIG. 41, FIG. 42 and FIG. 43, according to some embodiments of the present disclosure, when viewed along the second axis 5-AX2, the shortest distance 5-S1 between the first magnetic element 5-31 and the center 5-22C of the movable part setting surface 5-22 may be different from the shortest distance 5-S2 of the third magnetic element 5-33 and the center 5-22C of the movable part setting surface 5-22.

According to some embodiments of the present disclosure, when viewed along the second axis 5-AX2, the shortest distance 5-S1 between the first magnetic element 5-31 and the center 5-22C of the movable part setting surface 5-22 may be greater than the shortest distance 5-S2 of the third magnetic element 5-33 and the center 5-22C of the movable part setting surface 5-22.

As shown in FIG. 41, FIG. 42 and FIG. 43, according to some embodiments of the present disclosure, when viewed along the second axis 5-AX2, the shortest distance 5-S3 between the first magnetic element 5-31 and the second magnetic element 5-32 may be different from the shortest distance 5-S4 between the third magnetic element 5-33 and the fourth magnetic element 5-34.

According to some embodiments of the present disclosure, when viewed along the second axis 5-AX2, the shortest distance 5-S3 between the first magnetic element 5-31 and the second magnetic element 5-32 may be greater than the shortest distance 5-S4 between the third magnetic element 5-33 and the fourth magnetic element 5-34.

Please refer to FIG. 41, FIG. 42 and FIG. 43, according to some embodiments of the present disclosure, when viewed along the magnetic pole alignment direction 5-31a (for example, may be parallel to the third axis AX3) of the first magnetic element 5-31, the first magnetic element 5-31 may partially overlap the second magnetic element 5-32.

According to some embodiments of the present disclosure, when viewed along the magnetic pole alignment direction 5-31a (for example, may be parallel to the third axis 5-AX3) of the first magnetic element 5-31, the first magnetic element 5-31 may partially overlap the third magnetic element 5-33.

According to some embodiments of the present disclosure, when viewed along the magnetic pole alignment direction 5-31a (for example, may be parallel to the third axis 5-AX3) of the first magnetic element 5-31, the first magnetic element 5-31 may partially overlap the fourth magnetic element 5-34.

As shown in FIG. 41, FIG. 42 and FIG. 43, according to some embodiments of the present disclosure, when viewed along the magnetic pole alignment direction 5-31a (for example, may be parallel to the third axis 5-AX3) of the first magnetic element 5-31, the second magnetic element 5-32 may partially overlap the third magnetic element 5-33.

According to some embodiments of the present disclosure, when viewed along the magnetic pole alignment direction 5-31a (for example, parallel to the third axis 5-AX3) of the first magnetic element 5-31, the second magnetic element 5-32 may partially overlap the fourth magnetic element 5-34.

Please refer to FIG. 41, FIG. 42 and FIG. 43, according to some embodiments of the present disclosure, when viewed along the magnetic pole alignment direction 5-31a (for example, may be parallel to the third axis AX3) of the first magnetic element 5-31, the third magnetic element 5-33 may not overlap the fourth magnetic element 5-34.

In this way, the magnetic interference of the driving assembly 5-30 may be avoided, thereby facilitating the movement of the driving optical element 5-OE. In addition, the internal space of the optical element driving mechanism 5-100 may be effectively used, thereby the effect of miniaturization is achieved.

As shown in FIG. 41, FIG. 42 and FIG. 43, according to some embodiments of the present disclosure, when viewed along the magnetic pole alignment direction 5-33a (for example, may be parallel to the first axis 5-AX1) of the third magnetic element 5-33, the first magnetic element 5-31 may not overlap the second magnetic element 5-32.

According to some embodiments of the present disclosure, when viewed along the magnetic pole alignment direction 5-33a (for example, may be parallel to the first axis 5-AX1) of the third magnetic element 5-33, the first magnetic element 5-31 may not overlap the third magnetic element 5-33.

According to some embodiments of the present disclosure, when viewed along the magnetic pole alignment direction 5-33a (for example, may be parallel to the first axis 5-AX1) of the third magnetic element 5-33, the first magnetic element 5-31 may not overlap the fourth magnetic element 5-34.

Please refer to FIG. 41, FIG. 42 and FIG. 43, according to some embodiments of the present disclosure, when viewed along the magnetic pole alignment direction 5-33a (for example, may be parallel to the first axis 5-AX1) of the third magnetic element 5-33, the second magnetic element 5-32 may not overlap the third magnetic element 5-33.

According to some embodiments of the present disclosure, when viewed along the magnetic pole alignment direction 5-33a (for example, may be parallel to the first axis 5-AX1) of the third magnetic element 5-33, the second magnetic element 5-32 may not overlap the fourth magnetic element 5-34.

As shown in FIG. 41, FIG. 42 and FIG. 43, according to some embodiments of the present disclosure, when viewed along the magnetic pole alignment direction 5-33a (for example, may be parallel to the first axis 5-AX1) of the third magnetic element 5-33, the third magnetic element 5-33 may partially overlap the fourth magnetic element 5-34.

In this way, the magnetic interference of the driving assembly 5-30 may be avoided, thereby facilitating the movement of the driving optical element 5-OE. In addition, the internal space of the optical element driving mechanism 5-100 may be effectively used, thereby the effect of miniaturization is achieved.

Please refer to FIG. 41, FIG. 42, and FIG. 43, according to some embodiments of the present disclosure, when viewed along the second axis 5-AX2, the first magnetic element 5-31, the second magnetic element 5-32, the third magnetic element 5-33, and the fourth magnetic element 5-34 may have elongated structures.

According to some embodiments of the present disclosure, the length 5-31' of the first magnetic element 5-31 may be the same as the length 5-32' of the second magnetic element 5-32 when viewed along the second axis 5-AX2.

According to some embodiments of the present disclosure, the length 5-31' of the first magnetic element 5-31 may be greater than the length 5-33' of the third magnetic element 5-33 when viewed along the second axis 5-AX2.

According to some embodiments of the present disclosure, the length 5-31' of the first magnetic element 5-31 may be greater than the length 5-34' of the fourth magnetic element 5-34 when viewed along the second axis 5-AX2.

As shown in FIG. 41, FIG. 42 and FIG. 43, according to some embodiments of the present disclosure, the length 5-33' of the third magnetic element 5-33 may be the same as the length 5-34' of the fourth magnetic element 5-34 when viewed along the second axis 5-AX2.

According to some embodiments of the present disclosure, the width 5-31" of the first magnetic element 5-31 may be the same as the width 5-32" of the second magnetic element 5-32 when viewed along the second axis 5-AX2.

According to some embodiments of the present disclosure, the width 5-31" of the first magnetic element 5-31 may be shorter than the width 5-33" of the third magnetic element 5-33 when viewed along the second axis 5-AX2.

According to some embodiments of the present disclosure, the width 5-31" of the first magnetic element 5-31 may be shorter than the width 5-34" of the fourth magnetic element 5-34 when viewed along the second axis 5-AX2.

According to some embodiments of the present disclosure, the width 5-33" of the third magnetic element 5-33 may be the same as the width 5-34" of the fourth magnetic element 5-34 when viewed along the second axis 5-AX2.

In this way, the internal space of the optical element driving mechanism 5-100 may be effectively utilized, thereby the effect of miniaturization is achieved.

Please refer to FIG. 41, FIG. 42, and FIG. 43, according to some embodiments of the present disclosure, the first supporting element 5-41 may have an elongated structure. According to some embodiments of the present disclosure, the first supporting element 5-41 may move relative to the fixed part 5-10 or the movable part frame 5-21.

According to some embodiments of the present disclosure, the second supporting assembly 5-50 may be flexible. According to some embodiments of the present disclosure, the second supporting assembly 5-50 may partially fixedly connect to the movable part setting surface 5-22 and the movable part frame 5-21.

As shown in FIG. 41, FIG. 42 and FIG. 43, according to some embodiments of the present disclosure, the first magnetic element 5-31 may not overlap the first supporting element 5-41 when viewed along the first axis 5-AX1.

According to some embodiments of the present disclosure, the second magnetic element 5-32 may not overlap the first supporting element 5-41 when viewed along the first axis 5-AX1.

According to some embodiments of the present disclosure, the third magnetic element 5-33 may at least partially overlap the first supporting element 5-41 when viewed along the first axis 5-AX1.

According to some embodiments of the present disclosure, the fourth magnetic element 5-34 may at least partially overlap the first supporting element 5-41 when viewed along the first axis 5-AX1.

Please refer to FIG. 41, FIG. 42, and FIG. 43, according to some embodiments of the present disclosure, the first magnetic element 5-31, the second magnetic element 5-32, the third magnetic element 5-33 and the fourth magnetic element 5-34 may not overlap the first supporting element 5-41 when viewed along the second axis 5-AX2.

As shown in FIG. 41, FIG. 42 and FIG. 43, according to some embodiments of the present disclosure, the first magnetic element 5-31 may at least partially overlap the first supporting element 5-41 when viewed along the third axis 5-AX3.

According to some embodiments of the present disclosure, the second magnetic element 5-32 may at least partially overlap the first supporting element 5-41 when viewed along the third axis 5-AX3.

According to some embodiments of the present disclosure, the third magnetic element 5-33 may not overlap the first supporting element 5-41 when viewed along the third axis 5-AX3.

According to some embodiments of the present disclosure, the fourth magnetic element 5-34 may not overlap the first supporting element 5-41 when viewed along the third axis 5-AX3.

In this way, the internal space of the optical element driving mechanism 5-100 may be effectively utilized, thereby the effect of miniaturization is achieved.

As shown in FIG. 41, FIG. 42 and FIG. 43, according to some embodiments of the present disclosure, the first magnetic element 5-31 may not overlap the second supporting assembly 5-50 when viewed along the first axis 5-AX1.

According to some embodiments of the present disclosure, the second magnetic element 5-32 may not overlap the second supporting assembly 5-50 when viewed along the first axis 5-AX1.

According to some embodiments of the present disclosure, the third magnetic element 5-33 may at least partially overlap the second supporting assembly 5-50 when viewed along the first axis 5-AX1.

According to some embodiments of the present disclosure, the fourth magnetic element 5-34 may at least partially overlap the second supporting assembly 5-50 when viewed along the first axis 5-AX1.

Please refer to FIG. 41, FIG. 42, and FIG. 43, according to some embodiments of the present disclosure, the first magnetic element 5-31, the second magnetic element 5-32, the third magnetic element 5-33 and the fourth magnetic element 5-34 may not overlap the second supporting assembly 5-50 when viewed along the second axis 5-AX2.

As shown in FIG. 41, FIG. 42 and FIG. 43, according to some embodiments of the present disclosure, the first magnetic element 5-31 may at least partially overlap the second supporting assembly 5-50 when viewed along the third axis 5-AX3.

According to some embodiments of the present disclosure, the second magnetic element 5-32 may at least partially overlap the second supporting assembly 5-50 when viewed along the third axis 5-AX3.

According to some embodiments of the present disclosure, the third magnetic element 5-33 may not overlap the second supporting assembly 5-50 when viewed along the third axis 5-AX3.

According to some embodiments of the present disclosure, the fourth magnetic element 5-34 may not overlap the second supporting assembly 5-50 when viewed along the third axis 5-AX3.

In this way, the internal space of the optical element driving mechanism 5-100 may be effectively utilized, thereby the effect of miniaturization is achieved.

Please refer to FIG. 41, FIG. 42 and FIG. 43, according to some embodiments of the present disclosure, the driving assembly substrate 5-37 may include a driving assembly substrate body 5-371, a first insulating layer 5-372, a second insulation layer 5-373, a first driving assembly substrate surface 5-37a, and a second driving assembly substrate surface 5-37b.

According to some embodiments of the present disclosure, the first coil assembly 5-35 may be disposed on the driving assembly substrate 5-37. According to some embodiments of the present disclosure, the driving assembly substrate 5-37 may have a plate-like structure.

According to some embodiments of the present disclosure, the first coil assembly 5-35 may be disposed on the first driving assembly substrate surface 5-37a of the driving assembly substrate 5-37.

According to some embodiments of the present disclosure, the second coil assembly 5-36 may be disposed on the driving assembly substrate 5-37.

According to some embodiments of the present disclosure, the second coil assembly 5-36 may be disposed on the second driving assembly substrate surface 5-37b of the driving assembly substrate 5-37.

As shown in FIG. 41, FIG. 42 and FIG. 43, according to some embodiments of the present disclosure, the first driving assembly substrate surface 5-37a and the second driving assembly substrate surface 5-37b may face different directions.

According to some embodiments of the present disclosure, the first driving assembly substrate surface 5-37a and the second driving assembly substrate surface 5-37b may face opposite directions.

According to some embodiments of the present disclosure, when viewed along a direction that is perpendicular to the thickness of the driving assembly substrate 5-37 (for example, may be any direction that is perpendicular to the second axis 5-AX2), the first coil assembly 5-35 and the second coil assembly 5-36 may be located on opposite sides of the driving assembly substrate 5-37.

In this way, the first coil assembly 5-35 and the second coil assembly 5-36 may be effectively prevented from being short-circuited with each other, thereby the reliability of the optical element driving mechanism 5-100 is improved.

Please refer to FIG. 41, FIG. 42 and FIG. 43, according to some embodiments of the present disclosure, when viewed along the first coil assembly winding axis 5-35' of the first coil assembly 5-35, the first coil assembly 5-35 and the second coil assembly 5-36 may not overlap each other.

According to some embodiments of the present disclosure, when viewed along the second coil assembly winding axis 5-36' of the second coil assembly 5-36, the second coil assembly 5-36 may at least partially overlap the optical element 5-OE.

According to come embodiments of the present disclosure, the first coil assembly winding axis 5-35' may partially overlap the second coil assembly winding axis 5-36'.

In this way, the internal space of the optical element driving mechanism 5-100 may be effectively utilized, thereby the effect of miniaturization is achieved.

As shown in FIG. 41, FIG. 42 and FIG. 43, according to some embodiments of the present disclosure, the first insulating layer 5-372 may be located between the driving assembly substrate body 5-371 and the first coil assembly 5-35.

According to some embodiments of the present disclosure, the second insulating layer 5-373 may be located between the driving assembly substrate body 5-371 and the second coil assembly 5-36. According to some embodiments of the present disclosure, the driving assembly substrate body 5-371 may be made of metal.

Please refer to FIG. 41, FIG. 42 and FIG. 43, according to some embodiments of the present disclosure, when viewed along the thickness direction of the driving assembly substrate 5-37 (for example, the direction that is parallel to the first axis 5-AX1), the optical element 5-OE may not overlap the first insulating layer 5-372.

According to some embodiments of the present disclosure, when viewed along the thickness direction of the driving assembly substrate 5-37 (for example, the direction that is parallel to the first axis 5-AX1), the optical element 5-OE may at least partially overlap the second insulating layer 5-373.

In this way, the interaction of the driving forces may be effectively avoided, thereby making the operation of the optical element driving mechanism 5-100 smoother.

As shown in FIG. 41, FIG. 42 and FIG. 43, according to some embodiments of the present disclosure, the driving assembly substrate 5-37 may be disposed on the movable part frame 5-21.

According to some embodiments of the present disclosure, the second driving assembly substrate surface 5-37*b* may face the movable part frame 5-21.

According to some embodiments of the present disclosure, when viewed along a direction that is perpendicular to the thickness of the driving assembly substrate 5-37 (for example, any direction that is perpendicular to the second axis 5-AX2), the second coil assembly 5-36 may at least partially overlap the movable part frames 5-21.

According to some embodiments of the present disclosure, the second supporting assembly 5-50 and the driving assembly substrate 5-37 may have an integrated structure. That is, the second supporting assembly 5-50 and the driving assembly substrate 5-37 may not need to be connected by additional means (such as welding).

In this way, the assembly of the optical element driving mechanism 5-100 may be facilitated, thereby the manufacturing cost of the optical element driving mechanism 5-100 is reduced.

Please refer to FIG. 41, FIG. 42 and FIG. 43, according to some embodiments of the present disclosure, the first magnetic element 5-31 may be fixedly disposed on the base 12 of the fixed part 5-10.

According to some embodiments of the present disclosure, the second magnetic element 5-32 may be fixedly disposed on the base 12 of the fixed part 5-10.

According to some embodiments of the present disclosure, the third magnetic element 5-33 may be fixedly disposed on the base 12 of the fixed part 5-10.

According to some embodiments of the present disclosure, the fourth magnetic element 5-34 may be fixedly disposed on the base 12 of the fixed part 5-10.

In this way, the driving assembly may be made more stable, thereby the reliability of the optical element driving mechanism 5-100 is improved.

As shown in FIG. 41, FIG. 42 and FIG. 43, according to some embodiments of the present disclosure, the movable part frame 5-21 may form a first space 5-211. The first space 5-211 may have a hollow structure, and the first space 5-211 may be used to accommodate a part of the driving assembly 5-30.

According to some embodiments of the present disclosure, the first magnetic element 5-31 may not be located in the first space 5-211 when viewed along the second axis 5-AX2.

According to some embodiments of the present disclosure, the second magnetic element 5-32 may not be located in the first space 5-211 when viewed along the second axis 5-AX2.

According to some embodiments of the present disclosure, the third magnetic element 5-33 may be located in the first space 5-211 when viewed along the second axis 5-AX2.

According to some embodiments of the present disclosure, the fourth magnetic element 5-34 may be located in the first space 5-211 when viewed along the second axis 5-AX2.

In this way, the internal space of the optical element driving mechanism 5-100 may be effectively utilized, thereby the effect of miniaturization is achieved.

Please refer to FIG. 41, FIG. 42 and FIG. 43, according to some embodiments of the present disclosure, the movable part frame 5-21 may not overlap the first magnetic element 5-31 when viewed along the first axis 5-AX1.

According to some embodiments of the present disclosure, the movable part frame 5-21 may not overlap the second magnetic element 5-32 when viewed along the first axis 5-AX1.

According to some embodiments of the present disclosure, the movable part frame 5-21 may overlap the third magnetic element 5-33 when viewed along the first axis 5-AX1.

According to some embodiments of the present disclosure, the movable part frame 5-21 may overlap the fourth magnetic element 5-34 when viewed along the first axis 5-AX1.

As shown in FIG. 41, FIG. 42 and FIG. 43, according to some embodiments of the present disclosure, the movable part frame 5-21 may not overlap the first magnetic element 5-31 when viewed along the second axis 5-AX2.

According to some embodiments of the present disclosure, the movable part frame 5-21 may not overlap the second magnetic element 5-32 when viewed along the second axis 5-AX2.

According to some embodiments of the present disclosure, the movable part frame 5-21 may not overlap the third magnetic element 5-33 when viewed along the second axis 5-AX2.

According to some embodiments of the present disclosure, the movable part frame 5-21 may not overlap the fourth magnetic element 5-34 when viewed along the second axis 5-AX2.

Please refer to FIG. 41, FIG. 42 and FIG. 43, according to some embodiments of the present disclosure, the movable part frame 5-21 may overlap the first magnetic element 5-31 when viewed along the third axis 5-AX3.

According to some embodiments of the present disclosure, the movable part frame 5-21 may overlap the second magnetic element 5-32 when viewed along the third axis 5-AX3.

According to some embodiments of the present disclosure, the movable part frame 5-21 may overlap the third magnetic element 5-33 when viewed along the third axis 5-AX3.

According to some embodiments of the present disclosure, the movable part frame 5-21 may overlap the fourth magnetic element 5-34 when viewed along the third axis 5-AX3.

In this way, the internal space of the optical element driving mechanism 5-100 may be effectively utilized, thereby the effect of miniaturization is achieved.

According to some embodiments of the present disclosure, the movable part frame 5-21 may move relative to the fixed part 5-10 in a first movement range.

According to some embodiments of the present disclosure, when the movable part frame 5-21 is located at any position in the first movement range, the movable part 5-20 may not be in contact with the first magnetic element 5-31 when viewed along the second axis 5-AX2.

According to some embodiments of the present disclosure, when the movable part frame 5-21 is located at any position of the first movement range, the movable part 5-20 may not be in contact with the second magnetic element 5-32 when viewed along the second axis 5-AX2.

According to some embodiments of the present disclosure, when the movable part frame 5-21 is located at any position of the first movement range, the movable part 5-20 may not be in contact with the third magnetic element 5-33 when viewed along the second axis 5-AX2.

According to some embodiments of the present disclosure, when the movable part frame 5-21 is located at any position of the first movement range, the movable part 5-20 may not be in contact with the fourth magnetic element 5-34 when viewed along the second axis 5-AX2.

In this way, the movable range of the movable part 5-20 may be increased, and the internal space of the optical element driving mechanism 5-100 may be effectively utilized.

Please refer to FIG. 41, FIG. 42 and FIG. 43, according to some embodiments of the present disclosure, the driving assembly 5-30 may be electrically connected to the circuit assembly 5-60 through the first electrical connection element 5-38.

According to some embodiments of the present disclosure, the driving assembly 5-30 may be electrically connected to the circuit assembly 5-60 through the second electrical connection element 5-39.

For example, the first coil assembly 5-35 and the second coil assembly 5-36 of the driving assembly 5-30 may be electrically connected to the circuit assembly 5-60 through the first electrical connection element 5-38.

For example, the first coil assembly 5-35 and the second coil assembly 5-36 of the driving assembly 5-30 may be electrically connected to the circuit assembly 5-60 via the second electrical connection element 5-39.

According to some embodiments of the present disclosure, the circuit assembly 5-60 may be used for electrical connection with external circuits.

According to some embodiments of the present disclosure, the circuit assembly 5-60 may be circuit boards. According to some embodiments of the present disclosure, the circuit assembly 5-60 may be fixedly disposed on the base 5-12 of the fixed part 5-10.

According to some embodiments of the present disclosure, the circuit assembly 5-60 may be a circuit embedded in the outer frame 5-11 or the base 5-12 of the fixed part 5-10.

According to some embodiments of the present disclosure, the first electrical connection element 5-38 may be flexible. According to some embodiments of the present disclosure, the first electrical connection element 5-38 may be wires or springs.

According to some embodiments of the present disclosure, the first buffering element 5-71 may be disposed at the junction of the first electrical connection element 5-38 and the fixed part 5-10.

According to some embodiments of the present disclosure, the first buffering element 5-71 may be disposed at the junction of the second electrical connection element 5-39 and the fixed part 5-10.

According to some embodiments of the present disclosure, the first buffering element 5-71 may be made of a resin material. According to some embodiments of the present disclosure, the first buffering element 5-71 may be a gel.

According to some embodiments of the present disclosure, the first buffering element 5-71 may be flexible. According to some embodiments of the present disclosure, the first buffering element 5-71 may be in direct contact with the first electrical connection element 5-38.

According to some embodiments of the present disclosure, the first buffering element 5-71 may be in direct contact with the circuit assembly 5-60.

According to some embodiments of the present disclosure, the first buffering element 5-71 may be in direct contact with the outer frame 5-11 or the base 5-12 of the fixed part 5-10.

According to some embodiments of the present disclosure, the second buffering element 5-72 may be disposed at the junction of the first electrical connection element 5-38 and the movable part 5-20.

According to some embodiments of the present disclosure, the second buffering element 5-72 may be disposed at the junction of the second electrical connection element 5-39 and the movable part 5-20.

According to some embodiments of the present disclosure, the second buffering element 5-72 may be made of a resin material. According to some embodiments of the present disclosure, the second buffering element 5-72 may be a gel.

According to some embodiments of the present disclosure, the second buffering element 5-72 may be flexible. According to some embodiments of the present disclosure, the second buffering element 5-72 may be in direct contact with the first electrical connection element 5-38.

According to some embodiments of the present disclosure, the second buffering element 5-72 may be in direct contact with the first coil assembly 5-35. According to some embodiments of the present disclosure, the second buffering element 5-72 may be in direct contact with the second coil assembly 5-36. According to some embodiments of the present disclosure, the second buffering element 5-72 may be in direct contact with the movable part 5-20.

According to some embodiments of the present disclosure, the second buffering element 5-72 may be in direct contact with the driving assembly substrate 5-37. According to some embodiments of the present disclosure, the second buffering element 5-72 may be in direct contact with the movable part frame 5-21.

According to some embodiments of the present disclosure, the first electrical connection element 5-38 and the second electrical connection element 5-39 may be located at opposite sides of the optical element 5-OE when viewed along the second axis 5-AX2.

According to some embodiments of the present disclosure, the first electrical connection element 5-38 and the second electrical connection element 5-39 may be symmetrically when viewed along the second axis 5-AX2.

According to some embodiments of the present disclosure, the first electrical connection element 5-38 and the second electrical connection element 5-39 may be mirror-symmetrical when viewed along the second axis 5-AX2.

According to some embodiments of the present disclosure, the first electrical connection element 5-38 and the second electrical connection element 5-39 may be point-symmetrical when viewed along the second axis 5-AX2.

According to some embodiments of the present disclosure, the first electrical connection element 5-38 may be located at a corner of the optical element driving mechanism 5-100 with a polygonal structure when viewed along the second axis 5-AX2.

According to some embodiments of the present disclosure, the second electrical connection element 5-39 may be located at a corner of the optical element driving mechanism 5-100 with a polygonal structure when viewed along the second axis 5-AX2.

In general, the driving assembly of the optical element driving mechanism of the embodiment of the present disclosure may effectively drive the optical element to move along the first rotation axis, thereby making the operation of the optical element driving mechanism smoother. Moreover, the optical element driving mechanism of the embodiment of the present disclosure may avoid the magnetic interference of the driving assembly, thereby facilitating the driving of the optical element. In addition, the internal space of the optical element driving mechanism may be effectively used, thereby the effect of miniaturization is achieved. Furthermore, the optical element driving mechanism of the embodiment of the present disclosure may effectively prevent the first coil assembly and the second coil assembly from being short-circuited with each other, thereby improving the reliability of the optical element driving mechanism.

In addition, the optical element driving mechanism of the embodiment of the present disclosure may effectively avoid the interaction of the driving forces, thereby making the operation of the optical element driving mechanism smoother. Furthermore, the optical element driving mechanism of the embodiment of the present disclosure may facilitate the assembly of the optical element driving mechanism, thereby reducing the manufacturing cost of the optical element driving mechanism. In addition, the optical element driving mechanism of the embodiment of the present disclosure may make the driving assembly more stable, thereby improving the reliability of the optical element driving mechanism.

Although embodiments of the present disclosure and their advantages have been described in detail, it should be understood that various changes, substitutions and alterations may be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, comprising:
a movable part, for connecting an optical element;
a fixed part, wherein the movable part is movable relative to the fixed part;
a driving assembly, comprising a driving magnetic and a drive coil, for driving the movable part to move relative to the fixed part; and
a first supporting assembly, wherein the movable part is movable relative to the fixed part through the support of the first supporting assembly,
wherein the first supporting assembly is at least partially located between the movable part and the fixed part,
wherein the first supporting assembly comprises:
a first supporting element, having an elongated shape, and extending along a first axis;
a first accommodating structure, having a recessed structure, and accommodating the first supporting element;
a fourth intermediate element, corresponding to the first supporting element;
a fourth intermediate element groove, wherein the fourth intermediate element is located in the fourth intermediate element groove;
wherein the fourth intermediate element at least partially overlaps the first supporting element when viewed along the first axis,
wherein the fourth intermediate element groove is formed in the first accommodating structure,
wherein the fourth intermediate element is in direct contact with the first supporting element,
wherein the first supporting element is movable relative to the fourth intermediate element.

2. The optical element driving mechanism as claimed in claim 1, wherein the first supporting assembly comprises:
- a first intermediate element, corresponding to the first supporting element, wherein the first intermediate element is located in the first accommodating structure; and
- a first connecting element, in direct contact with the first intermediate element and a first intermediate element groove supporting surface,
- wherein the first connecting element is disposed in the first accommodating structure,
- wherein the first intermediate element is fixedly connected to the first intermediate element groove supporting surface,
- wherein the first intermediate element has a curved surface structure,
- wherein the first intermediate element has a spherical structure.

3. The optical element driving mechanism as claimed in claim 2, wherein the first intermediate element is in direct contact with the first supporting element,
- wherein the first supporting element is movable relative to the first intermediate element,
- wherein in a second axis that is perpendicular to the first axis, the maximum dimension of the first intermediate element is different from the maximum dimension of the first supporting element,
- wherein the second axis is perpendicular to the first intermediate element groove supporting surface,
- wherein in the second axis, the maximum dimension of the first intermediate element is greater than the maximum dimension of the first supporting element,
- wherein the first intermediate element does not overlap the first supporting element when viewed along the first axis.

4. The optical element driving mechanism as claimed in claim 3, wherein the first supporting assembly further comprises:
- a second intermediate element, corresponding to the first supporting element;
- a second intermediate element groove, wherein the second intermediate element is located in the second intermediate element groove;
- a second connecting element, in direct contact with the second intermediate element and a second intermediate element groove supporting surface of the second intermediate element groove; and
- a second intermediate element groove surface, formed in the second intermediate element groove and corresponding to the second intermediate element,
- wherein the alignment direction of the center of the first intermediate element and the center of the second intermediate element is not parallel to the first axis,
- wherein the alignment direction of the center of the first intermediate element and the center of the second intermediate element is perpendicular to the first axis,
- wherein the second intermediate element groove has a recessed structure, and the second intermediate element groove is adjacent to the first accommodating structure,
- wherein the second intermediate element groove is formed in the first accommodating structure,
- wherein the second connecting element is disposed in the second intermediate element groove.

5. The optical element driving mechanism as claimed in claim 4, wherein the first intermediate element groove supporting surface is not parallel to the second intermediate element groove supporting surface,
- wherein the first intermediate element groove supporting surface with a planar structure is perpendicular to the second intermediate element groove supporting surface with a planar structure,
- wherein the second intermediate element is fixedly connected to the second intermediate element groove supporting surface,
- wherein the second intermediate element has a curved surface structure,
- wherein the second intermediate element has a spherical structure,
- wherein in the second axis, the maximum dimension of the second intermediate element is different from the maximum dimension of the first intermediate element,
- wherein in the second axis, the maximum dimension of the second intermediate element is different from the maximum dimension of the first supporting element,
- wherein in the second axis, the maximum dimension of the second intermediate element is greater than the maximum dimension of the first supporting element.

6. The optical element driving mechanism as claimed in claim 5, wherein the second intermediate element is in direct contact with the first supporting element,
- wherein the first supporting element is movable relative to the second intermediate element,
- wherein the second intermediate element does not overlap the first supporting element when viewed along the first axis,
- wherein the second intermediate element groove surface with a planar structure is not parallel to the second intermediate element groove supporting surface,
- wherein the shortest distance between the second intermediate element and the second intermediate element groove surface is different from the shortest distance between the second intermediate element and the second intermediate element groove supporting surface.

7. The optical element driving mechanism as claimed in claim 6, wherein the shortest distance between the second intermediate element and the second intermediate element groove surface is greater than the shortest distance between the second intermediate element and the second intermediate element groove supporting surface,
- wherein the second intermediate element groove surface and the first intermediate element groove supporting surface are facing in the same direction.

8. The optical element driving mechanism as claimed in claim 5, wherein the first supporting assembly further comprises:
- a third intermediate element, corresponding to the first supporting element;
- a third intermediate element groove, wherein the third intermediate element is located in the third intermediate element groove; and
- a third connecting element, in direct contact with the third intermediate element and a third intermediate element groove supporting surface of the third intermediate element groove,
- wherein the alignment direction of the center of the first intermediate element and the center of the third intermediate element is not parallel to the first axis,
- wherein the alignment direction of the center of the first intermediate element and the center of the third intermediate element is perpendicular to the first axis,
- wherein the alignment direction of the center of the first intermediate element and the center of the third intermediate element is not parallel to the alignment direction of the center of the second intermediate element and the center of the third intermediate element, wherein the alignment direction of the center of the first intermediate element and the center of the third intermediate element is not perpendicular to the alignment direction of the center of the second intermediate element and the center of the third intermediate element, wherein the shortest distance between the center of the first intermediate element and the center of the third intermediate element is different from the shortest distance between the center of the second intermediate element and the center of the third intermediate element.

9. The optical element driving mechanism as claimed in claim 8, wherein the shortest distance between the center of the first intermediate element and the center of the third intermediate element is greater than the shortest distance between the center of the second intermediate element and the center of the third intermediate element, wherein the third intermediate element groove has a recessed structure, and the third intermediate element groove is adjacent to the first accommodating structure, wherein the third intermediate element groove is formed in the first accommodating structure, wherein the third connecting element is disposed in the third intermediate element groove, wherein the third intermediate element groove supporting surface is not parallel to the first intermediate element groove supporting surface, wherein the third intermediate element groove supporting surface with a planar structure is perpendicular to the first intermediate element groove supporting surface, wherein the third intermediate element groove supporting surface and the second intermediate element groove supporting surface are facing opposite directions, wherein the third intermediate element is fixedly connected to the third intermediate element groove supporting surface, wherein the third intermediate element has a curved surface structure, wherein the third intermediate element has a spherical structure, wherein in the second axis, the maximum dimension of the third intermediate element is different from the maximum dimension of the first intermediate element, wherein in the second axis, the maximum dimension of the third intermediate element is the same as the maximum dimension of the second intermediate element, wherein the third intermediate element is in direct contact with the first supporting element, wherein the first supporting element is movable relative to the third intermediate element, wherein the third intermediate element does not overlap the first supporting element when viewed along the first axis.

10. The optical element driving mechanism as claimed in claim 5, wherein the first supporting assembly further comprises:

a fourth connecting element, in direct contact with the fourth intermediate element and a fourth intermediate element groove supporting surface of the fourth intermediate element groove; and a first stopping surface, corresponding to the first supporting element, wherein the fourth intermediate element groove has a recessed structure, and the fourth intermediate element groove is adjacent to the first accommodating structure, wherein the fourth connecting element is disposed in the fourth intermediate element groove, wherein the fourth intermediate element groove supporting surface is not parallel to the first intermediate element groove supporting surface, wherein the fourth intermediate element groove supporting surface with a planar structure is perpendicular to the first intermediate element groove supporting surface, wherein the fourth intermediate element groove supporting surface is not parallel to the second intermediate element groove supporting surface, wherein the fourth intermediate element groove supporting surface is perpendicular to the second intermediate element groove supporting surface, wherein the first stopping surface at least partially overlaps the first supporting element when viewed along the first axis, wherein the first stopping surface is located between the first accommodating structure and the fourth intermediate element groove.

11. The optical element driving mechanism as claimed in claim 10, wherein in the first axis, the shortest distance between the first stopping surface and the fourth intermediate element groove supporting surface is different from the maximum dimension of the fourth intermediate element, wherein in the first axis, the shortest distance between the first stopping surface and the fourth intermediate element groove supporting surface is shorter than the maximum dimension of the fourth intermediate element, wherein the fourth intermediate element is fixedly connected to the fourth intermediate element groove supporting surface, wherein the fourth intermediate element has a curved surface structure, wherein the fourth intermediate element has a spherical structure, wherein in the second axis, the maximum dimension of the fourth intermediate element is different from the maximum dimension of the first intermediate element, wherein in the second axis, the maximum dimension of the fourth intermediate element is different from the maximum dimension of the second intermediate element.

12. The optical element driving mechanism as claimed in claim 11, wherein the first supporting assembly further comprises:

a second accommodating structure, having a recessed structure, and accommodating the first supporting element;

an eighth intermediate element, corresponding to the first supporting element;

an eighth intermediate element groove, wherein the eighth intermediate element is located in the eighth intermediate element groove;

an eighth connecting element, in direct contact with the eighth intermediate element and an eighth intermediate element groove supporting surface of the eighth intermediate element groove; and a second stopping surface, corresponding to the first supporting element, wherein the first supporting element is located between the first accommodating structure and the second accommodating structure, wherein the eighth intermediate element at least partially overlaps the first supporting element when viewed along the first axis.

13. The optical element driving mechanism as claimed in claim 12, wherein the eighth intermediate element groove has a recessed structure, and the eighth intermediate element groove is adjacent to the second accommodating structure, wherein the eighth intermediate element groove is formed in the second accommodating structure, wherein the eighth connecting element is disposed in the eighth intermediate element groove, wherein the eighth intermediate element groove supporting surface is not parallel to the first intermediate element groove supporting surface, wherein the eighth intermediate element groove supporting surface with a planar structure is perpendicular to the first intermediate element groove supporting surface.

14. The optical element driving mechanism as claimed in claim 13, wherein the eighth intermediate element groove supporting surface is not parallel to the second intermediate element groove supporting surface, wherein the eighth intermediate element groove supporting surface is perpendicular to the second intermediate element groove supporting surface, wherein the second stopping surface at least partially overlaps the first supporting element when viewed along the first axis, wherein the second stopping surface is located between the second accommodating structure and the eighth intermediate element groove.

15. The optical element driving mechanism as claimed in claim 14, wherein in the first axis, the shortest distance between the second stopping surface and the eighth intermediate element groove supporting surface is different from the maximum dimension of the eighth intermediate element, wherein in the first axis, the shortest distance between the second stopping surface and the eighth intermediate element groove supporting surface is greater than the maximum dimension of the eighth intermediate element, wherein in the first axis, the shortest distance between the second stopping surface and the eighth intermediate element groove supporting surface is different from the shortest distance between the first stopping surface and the fourth intermediate element groove supporting surface, wherein in the first axis, the shortest distance between the second stopping surface and the eighth intermediate element groove supporting surface is greater than the shortest distance between the first stopping surface and the fourth intermediate element groove supporting surface, wherein in the first axis, the shortest distance between the first supporting element and the fourth intermediate element groove supporting surface is 0.1 mm greater than the maximum dimension of the fourth intermediate element, wherein in the first axis, the shortest distance between the first supporting element and the eighth intermediate element groove supporting surface is 0.1 mm greater than the maximum dimension of the eighth intermediate element.

16. The optical element driving mechanism as claimed in claim 5, wherein the first supporting assembly further comprises:

a fourth connecting element, in direct contact with the fourth intermediate element and a fourth intermediate element groove supporting surface of the fourth intermediate element groove; and a second intermediate element groove second supporting surface, formed in the second intermediate element groove and corresponding to the second intermediate element, wherein the fourth intermediate element groove has a recessed structure, and the fourth intermediate element groove is adjacent to the first accommodating structure, wherein the fourth connecting element is disposed in the fourth intermediate element groove, wherein the fourth intermediate element groove supporting surface is not parallel to the first intermediate element groove supporting surface, wherein the fourth intermediate element groove supporting surface with a planar structure is perpendicular to the first intermediate element groove supporting surface, wherein the fourth intermediate element groove supporting surface is not parallel to the second intermediate element groove supporting surface, wherein the fourth intermediate element groove supporting surface is perpendicular to the second intermediate element groove supporting surface, wherein the second intermediate element groove second supporting surface and the fourth intermediate element groove supporting surface are facing in the same direction.

17. The optical element driving mechanism as claimed in claim 16, wherein in the first axis, the shortest distance between the second intermediate element groove second supporting surface and the fourth intermediate element groove supporting surface is greater than the maximum dimension of the fourth intermediate element, wherein the fourth intermediate element is fixedly connected to the fourth intermediate element groove supporting surface, wherein the fourth intermediate element has a curved surface structure, wherein the fourth intermediate element has a spherical structure, wherein in the second axis, the maximum dimension of the fourth intermediate element is the same as the maximum dimension of the first intermediate element.

18. The optical element driving mechanism as claimed in claim 17, wherein the first supporting assembly further comprises:

a second accommodating structure, having a recessed structure, and accommodating the first supporting element;

an eighth intermediate element, corresponding to the first supporting element;

an eighth intermediate element groove, wherein the eighth intermediate element is located in the eighth intermediate element groove; and an eighth connecting element, in direct contact with the eighth intermediate element and an eighth intermediate element groove supporting surface of the eighth intermediate element groove, wherein the first supporting element is located between the first accommodating structure and the second accommodating structure, wherein the eighth intermediate element at least partially overlaps the first supporting element when viewed along the first axis, wherein the eighth intermediate element groove has a recessed structure, and the eighth intermediate element groove is adjacent to the second accommodating structure, wherein the eighth intermediate element groove is formed in the second accommodating structure, wherein the eighth connecting element is disposed in the groove of the eighth intermediate element.

19. The optical element driving mechanism as claimed in claim 18, wherein the eighth intermediate element groove supporting surface is not parallel to the first intermediate element groove supporting surface, wherein the eighth intermediate element groove supporting surface with a planar structure is perpendicular to the first intermediate element groove supporting surface, wherein the eighth intermediate element groove supporting surface is not parallel to the second intermediate element groove supporting surface, wherein the eighth intermediate element groove supporting surface is perpendicular to the second intermediate element groove supporting surface.

20. The optical element driving mechanism as claimed in claim 19, wherein in the first axis, the shortest distance between the first supporting element and the fourth intermediate element groove supporting surface is 0.1 mm greater than the maximum dimension of the fourth intermediate element, wherein in the first axis, the shortest distance between the first supporting element and the eighth intermediate element groove supporting surface is 0.1 mm greater than the maximum dimension of the eighth intermediate element.

* * * * *